United States Patent
Lubin et al.

(10) Patent No.: US 6,654,504 B2
(45) Date of Patent: Nov. 25, 2003

(54) METHOD AND APPARATUS FOR ASSESSING THE VISIBILITY OF DIFFERENCES BETWEEN TWO SIGNAL SEQUENCES

(75) Inventors: Jeffrey Lubin, Pennington, NJ (US); Michael Henry Brill, Morrisville, PA (US)

(73) Assignee: Sarnoff Corporation, Princeton, NJ (US)

(*) Notice: Subject to any disclaimer, the term of this patent is extended or adjusted under 35 U.S.C. 154(b) by 38 days.

(21) Appl. No.: 09/962,550

(22) Filed: Sep. 25, 2001

(65) Prior Publication Data

US 2002/0031277 A1 Mar. 14, 2002

Related U.S. Application Data

(60) Division of application No. 09/512,412, filed on Feb. 24, 2000, now Pat. No. 6,360,022, and a continuation-in-part of application No. 09/055,076, filed on Apr. 3, 1998, now Pat. No. 6,137,904.
(60) Provisional application No. 60/121,543, filed on Feb. 25, 1999, provisional application No. 60/043,050, filed on Apr. 4, 1997, and provisional application No. 60/073,435, filed on Feb. 2, 1998.

(51) Int. Cl.$^7$ ................................................ H04N 7/12
(52) U.S. Cl. ...................................... 382/254; 382/260
(58) Field of Search .......................... 382/254, 159–160, 382/260–269, 217–219

(56) References Cited

U.S. PATENT DOCUMENTS

| | | | |
|---|---|---|---|
| 4,058,828 A | 11/1977 | Ladd | 358/535 |
| 4,719,503 A | 1/1988 | Craver et al. | 358/12 |
| 4,849,810 A * | 7/1989 | Ericsson | 375/240.12 |
| 5,053,861 A | 10/1991 | Tsai et al. | 358/13 |
| 5,150,209 A * | 9/1992 | Baker et al. | 375/240.02 |
| 5,155,594 A | 10/1992 | Bernstein et al. | 358/136 |
| 5,394,483 A | 2/1995 | Daly | 382/270 |
| 5,463,702 A | 10/1995 | Trueblood | 382/239 |
| 5,517,581 A | 5/1996 | Johnston et al. | 382/232 |
| 5,734,432 A | 3/1998 | Netravali et al. | 348/417 |
| 5,909,516 A | 6/1999 | Lubin | 382/260 |
| 5,974,159 A | 10/1999 | Lubin | 382/106 |
| 6,173,084 B1 * | 1/2001 | Aach et al. | 382/260 |
| 6,360,022 B1 * | 3/2002 | Lubin et al. | 382/260 |
| 6,454,410 B1 * | 9/2002 | Berger et al. | 351/206 |
| 2002/0031277 A1 * | 3/2002 | Lubin et al. | 382/254 |

OTHER PUBLICATIONS

PCT International Search Report, Application No. PCT/US00/05010, Jul. 11, 2000.

* cited by examiner

Primary Examiner—Thomas D. Lee
Assistant Examiner—Stephen Brinich
(74) Attorney, Agent, or Firm—William J. Burke

(57) ABSTRACT

A method and apparatus for assessing the visibility of differences between two input signal sequences, e.g., image sequences is disclosed. The apparatus comprises a perceptual metric generator having an input signal processing section, a luminance processing section, a chrominance processing section and a perceptual metric generating section. The luminance processing section simultaneously processes at least two image fields, so as to provide spatio-temporal channels whose calibration is independent of pure-spatial and pure-temporal channels.

31 Claims, 27 Drawing Sheets

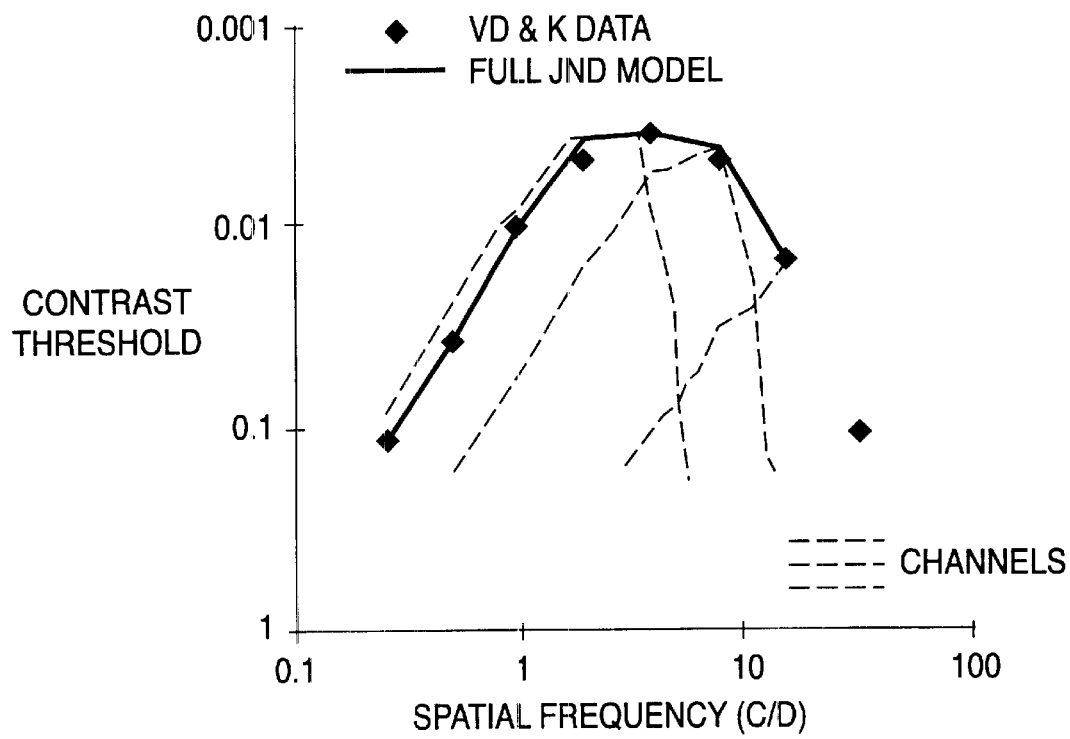
FIG. 10 LUMINANCE SPATIAL SENSITIVITY
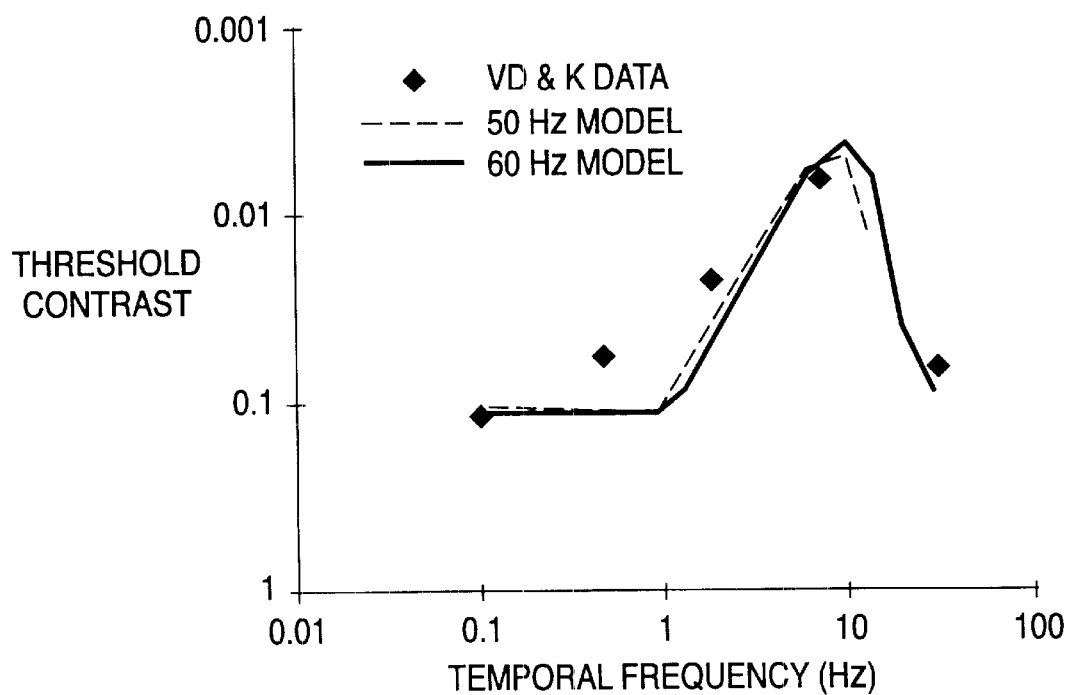
FIG. 11 LUMINANCE TEMPORAL SENSITIVITY

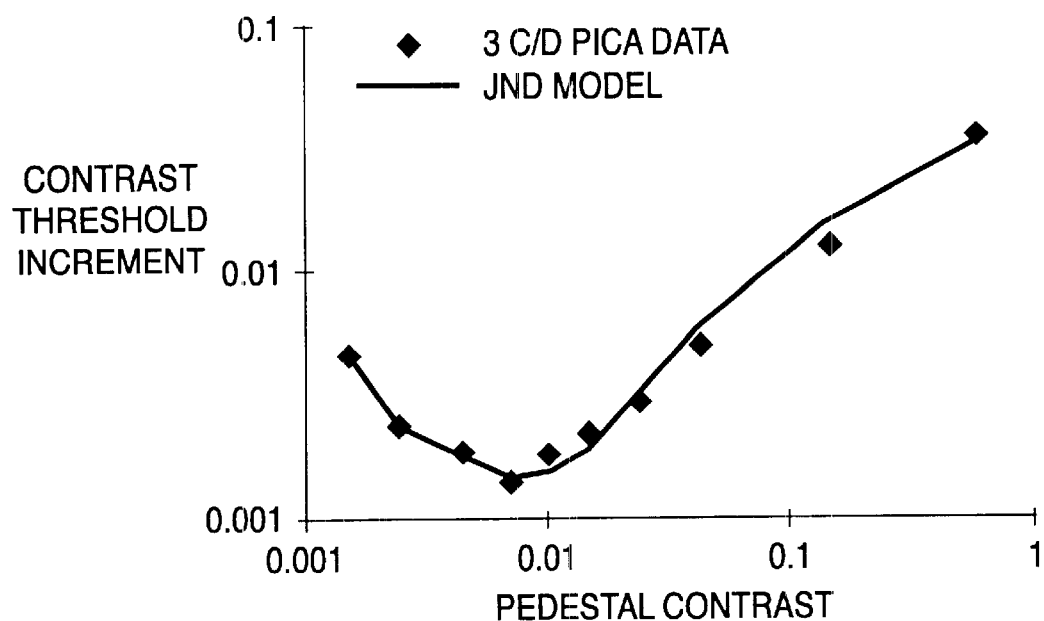
FIG. 12 LUMINANCE CONTRAST DISCRIMINATION
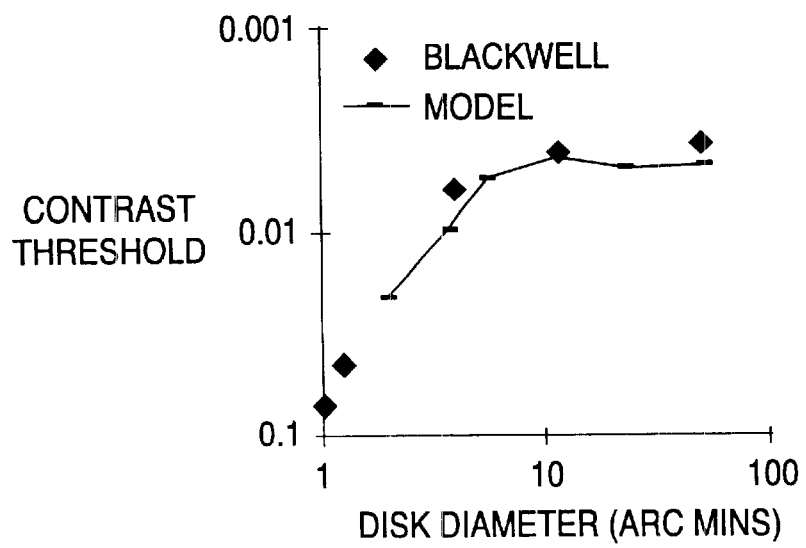
FIG. 13 DISK DETECTION

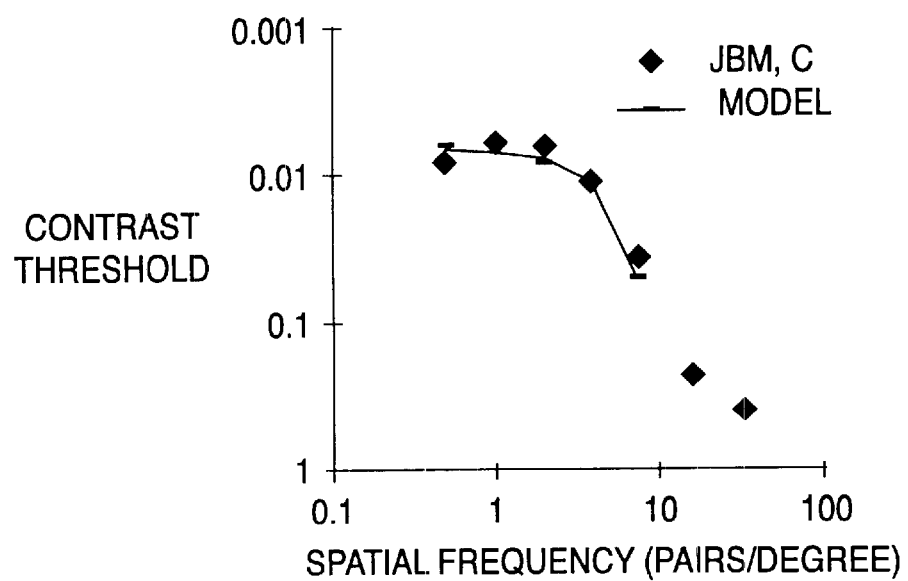
FIG. 14 CHECKERBOARD DETECTION
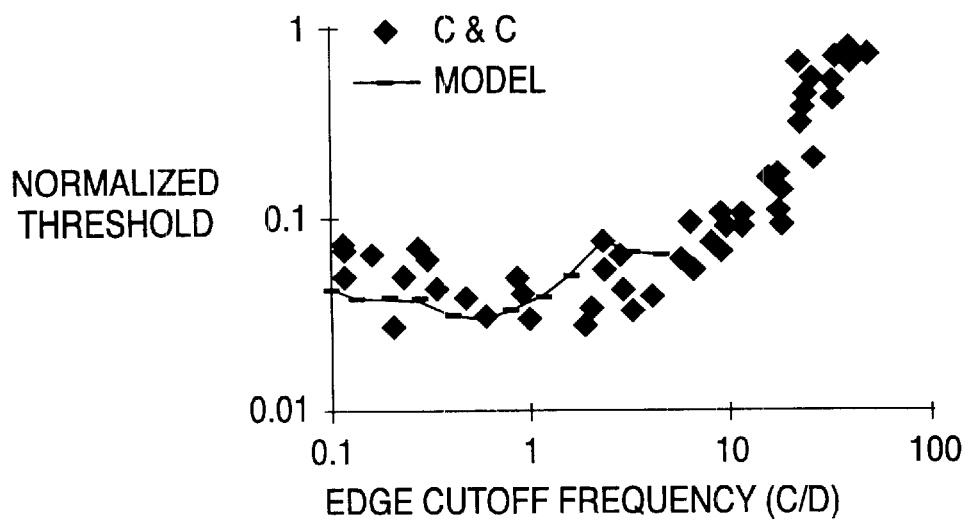
FIG. 15 EDGE SHARPNESS DISCRIMINATION

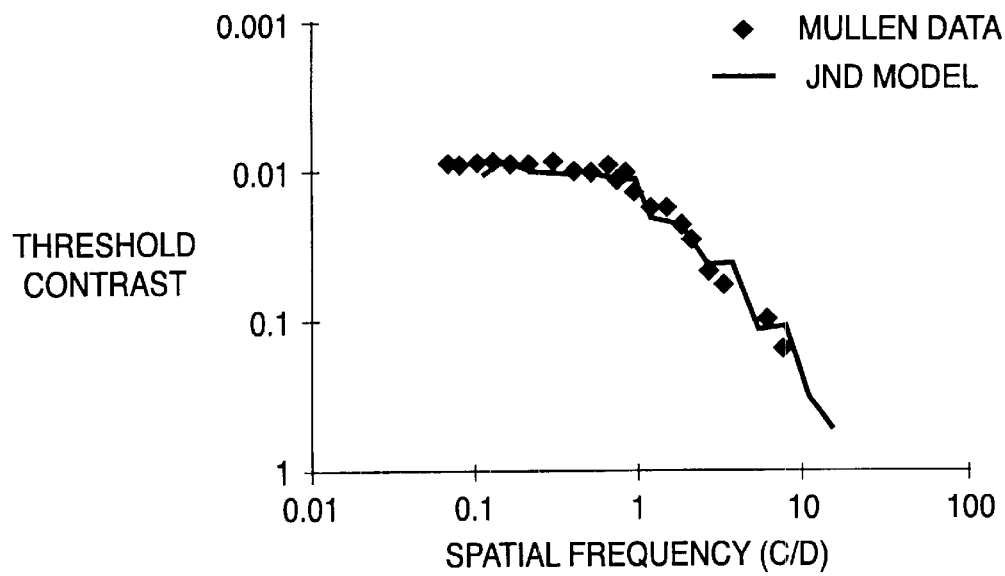
FIG. 16 CHROMINANCE SPATIAL SENSITIVITY
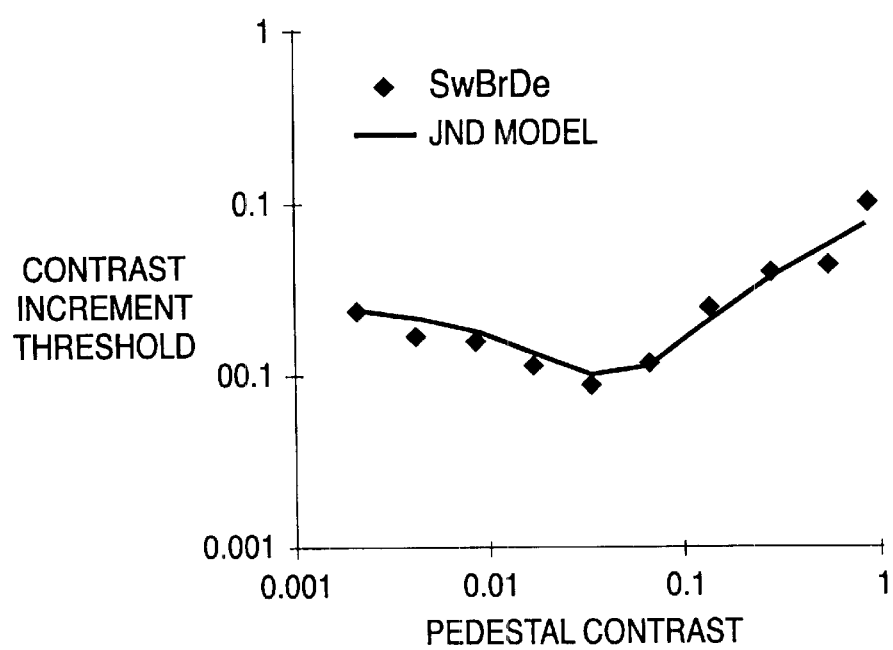
FIG. 17 CHROMINANCE CONTRAST DISCRIMINATION

FIG. 26

METHOD AND APPARATUS FOR ASSESSING THE VISIBILITY OF DIFFERENCES BETWEEN TWO SIGNAL SEQUENCES

This is a divisional application of application Ser. No. 09/512,412 filed on Feb. 24, 2000, (U.S. Pat. No. 6,360, 022), that claims the benefit of U.S. Provisional Application No. 60/121,543 filed on Feb. 25, 1999 and is also a continuation-in-part application of U.S. patent application Ser. No. 09/055,076 filed Apr. 3, 1998 (U.S. Pat. No. 6,137,904), which claims the benefit of U.S. Provisional Applications No. 60/043,050 filed Apr. 4, 1997, and No. 60/073,435 filed Feb. 2, 1998, where all of the above applications are herein incorporated by reference.

The present invention relates to an apparatus and concomitant method for evaluating and improving the performance of signal processing systems. More particularly, this invention relates to a method and apparatus that assesses the visibility of differences between two signal sequences.

BACKGROUND OF THE INVENTION

Designers of signal processing systems, e.g., imaging systems, often assess the performance of their designs in terms of physical parameters such as contrast, resolution and/or bit-rate efficiency in compression/decompression (codec) processes. While these parameters can be easily measured, they may not be accurate gauges for evaluating performance. The reason is that end users of imaging systems are generally more concerned with the subjective visual performance such as the visibility of artifacts or distortions and in some cases, the enhancement of these image features which may reveal information such as the existence of a tumor in an image, e.g., a MRI (Magnetic Resonance Imaging) image or a CAT (Computer-Assisted Tomography) scan image.

For example, an input image can be processed using two different codec algorithms to produce two different codec images. If the measure of codec image fidelity is based purely on parameters such as performing mean squared error (MSE) calculations on both codec images without considering the psychophysical properties of human vision, the codec image with a lower MSE value may actually contain more noticeable distortions than that of a codec image with a higher MSE value.

Therefore, a need exists in the art for a method and apparatus for assessing the effects of physical parameters on the subjective performance of a signal processing system, e.g., an imaging system. Specifically, a need exists for a method and apparatus for assessing the visibility of differences between two sequences of time-varying visual images.

SUMMARY OF THE INVENTION

The present invention is a method and apparatus for assessing the visibility of differences between two input signal sequences, e.g., image sequences. The apparatus comprises a perceptual metric generator having an input signal processing section, a luminance processing section, a chrominance processing section and a perceptual metric generating section.

The input signal processing section transforms input signals into psychophysically defined quantities, e.g., luminance components and chrominance components. The luminance processing section processes the luminance components into a luminance perceptual metric, while the chrominance processing section processes the chrominance components into a chrominance perceptual metric. Finally, the perceptual metric generating section correlates the luminance perceptual metric with the chrominance perceptual metric into a unified perceptual image metric, e.g., a just-noticeable-difference (JND) map.

The JND map is produced using independent spatial and temporal channels to process the input signals. To enhance the performance of the apparatus, channels having spatio-temporal filters are used to respond to point or line flicker within the signals. Specifically, filtering is performed over multiple image fields to simulate visual response to line flicker without altering response to pure spatial or temporal signals.

BRIEF DESCRIPTION OF THE DRAWINGS

The teachings of the present invention can be readily understood by considering the following detailed description in conjunction with the accompanying drawings, in which:

FIG. 10 is a graph illustrating Luminance Spatial Sensitivity data;

FIG. 11 is a graph illustrating Luminance Temporal Sensitivity data;

FIG. 12 is a graph illustrating Luminance Contrast Discrimination data;

FIG. 13 is a graph illustrating Disk Detection data;

FIG. 14 is a graph illustrating Checkerboard Detection data;

FIG. 15 is a graph illustrating Edge Sharpness Discrimination data;

FIG. 16 is a graph illustrating Chrominance Spatial Sensitivity data;

FIG. 17 is a graph illustrating Chrominance Contrast Discrimination data;

FIG. 26 illustrates a block diagram of a chrominance processing section for processing half-height images;

DETAILED DESCRIPTION

Figure 1:
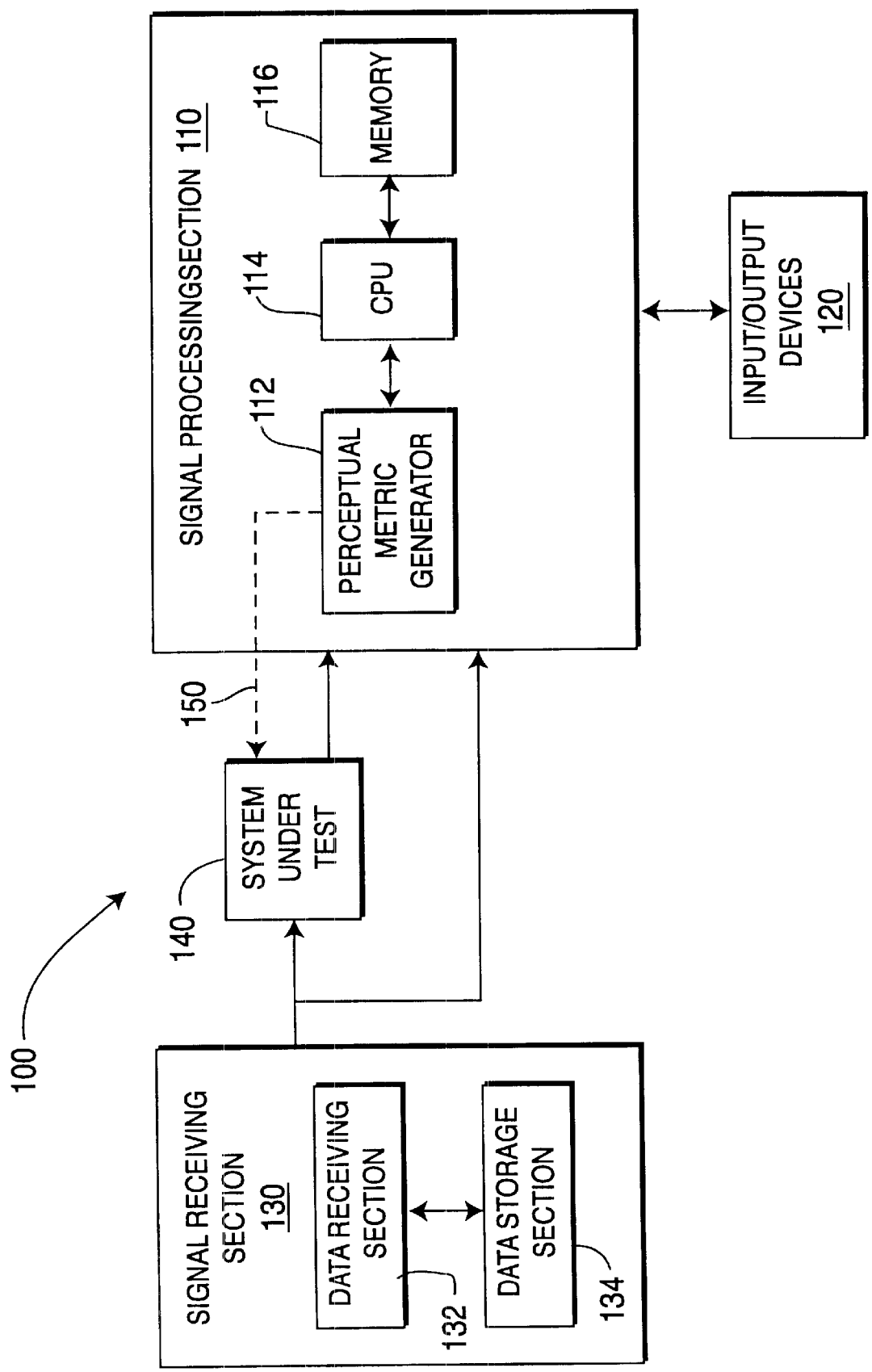
FIG. 1 illustrates a block diagram of a signal processing system of the present invention.

FIG. 1 depicts a signal processing system 100 that utilizes the present invention. The signal processing system consists of a signal receiving section 130, a signal processing section 110, input/output devices 120 and a system under test 140.

Signal receiving section 130 serves to receive input data signals, such as sequences of images from imaging devices or other time-varying signals such as audio signals from microphones or recorded media. Thus, although the present invention is described below with regard to images, it should be understood that the present invention can be applied to other input signals as discussed above.

Signal receiving section 130 includes a data receiving section 132 and a data storage section 134. Data receiving section 130 may include a number of devices such as a modem and an analog-to-digital converter. A modem is a well-known device that comprises a modulator and a demodulator for sending and receiving binary data over a telephone line or other communication channel, while an analog-to-digital converter converts analog signals into a digital form. Hence, signal receiving section 130 may receive input signals "on-line" or in "real-time" and, if necessary, convert them to a digital form. As such, section 130 may receive signals from one or more devices such as a computer, a camera, a video recorder or various medical imaging devices.

The data storage section 134 serves to store input signals received by data receiving section 132. Data storage section 134 contains one or more devices such as a disk drive, semiconductor memory or other storage media. These storage devices provide a method for applying a delay to the input signals or to simply store the input signals for subsequent processing.

In the preferred embodiment, the signal processing section 110 comprises a general purpose computer having a perceptual metric generator (or otherwise known as a visual discrimination measure (VDM)) 112, a central processing unit (CPU) 114 and a memory 116 to facilitate image processing. The perceptual metric generator 112 can be a physical apparatus constructed from various filters or a processor which is coupled to the CPU through a communication channel. Alternatively, the perceptual metric generator 112 can be implemented as a software application, which is recalled from an input/output device 120 or from the memory 116 and executed by the CPU of the signal processing section. As such, the perceptual metric generator of the present invention can be stored on a computer readable medium.

The signal processing section 110 is also coupled to a plurality of input and output devices 120 such as a keyboard, a mouse, a video monitor or storage devices including but not limited to magnetic and optical drives, diskettes or tapes, e.g., a hard disk drive or a compact disk drive. The input devices serve to provide inputs (control signals and data) to the signal processing section for processing the input images, while the output devices serve to display or record the results, e.g., displaying a perceptual metric on a display.

The signal processing system 100 using the perceptual metric generator 112 is able to predict the perceptual ratings that human subjects will assign to two signal sequences, e.g., a degraded color-image sequence relative to its non-degraded counterpart. The perceptual metric generator 112 assesses the visibility of differences between two sequences or streams of input images and produces several difference estimates, including a single metric of perceptual differences between the sequences. These differences are quantified in units of the modeled human just-noticeable difference (JND) metric. This metric can be expressed as a JND value, a JND map or a probability prediction. In turn, the CPU may utilize the JND image metric to optimize various processes including, but not limited to, digital image compression, image quality measurement and target detection.

To illustrate, an input image sequence passes through two different paths or channels to a signal processing system 100. The input image sequence passes directly to the signal processing section without processing on one path (the reference channel or reference image sequence), while the same input image sequence passes on another path through a system under test 140, where the image sequence is processed in some form (the channel under test or test image sequence). The signal processing system 100 generates a perceptual metric that measures the differences between the two image sequences. The distortion generated by the system under test 140 is often incurred for economic reason, e.g., the system under test 140 can be an audio or video encoder. In fact, the system under test 140 can be any number of devices or systems, e.g., a decoder, a transmission channel itself, an audio or video recorder, a scanner, a display or a transmitter. Thus, signal processing system 100 can be employed to evaluate the subjective quality of a test image sequence relative to a reference image sequence, thereby providing information as to the performance of an encoding process, a decoding process, the distortion of a transmission channel or any "system under test". Through the use of the perceptual metric generator 112, evaluation of the subjective quality of the test image relative to the reference sequence can be performed without the use of a human observer.

Finally, the perceptual metric can be used to modify or control the parameters of a system under test via path 150. For example, the parameters of an encoder can be modified to produce an encoded image that has an improved perceptual ratings, e.g., less noticeable distortion when the encoded image is decoded. Furthermore, although the system under test 140 is illustrated as a separate device, those skilled in the art will realize that a system under test can be implemented as a software implementation residing in the memory 116 of the signal processing section, e.g., a video encoding method.

Figure 2:
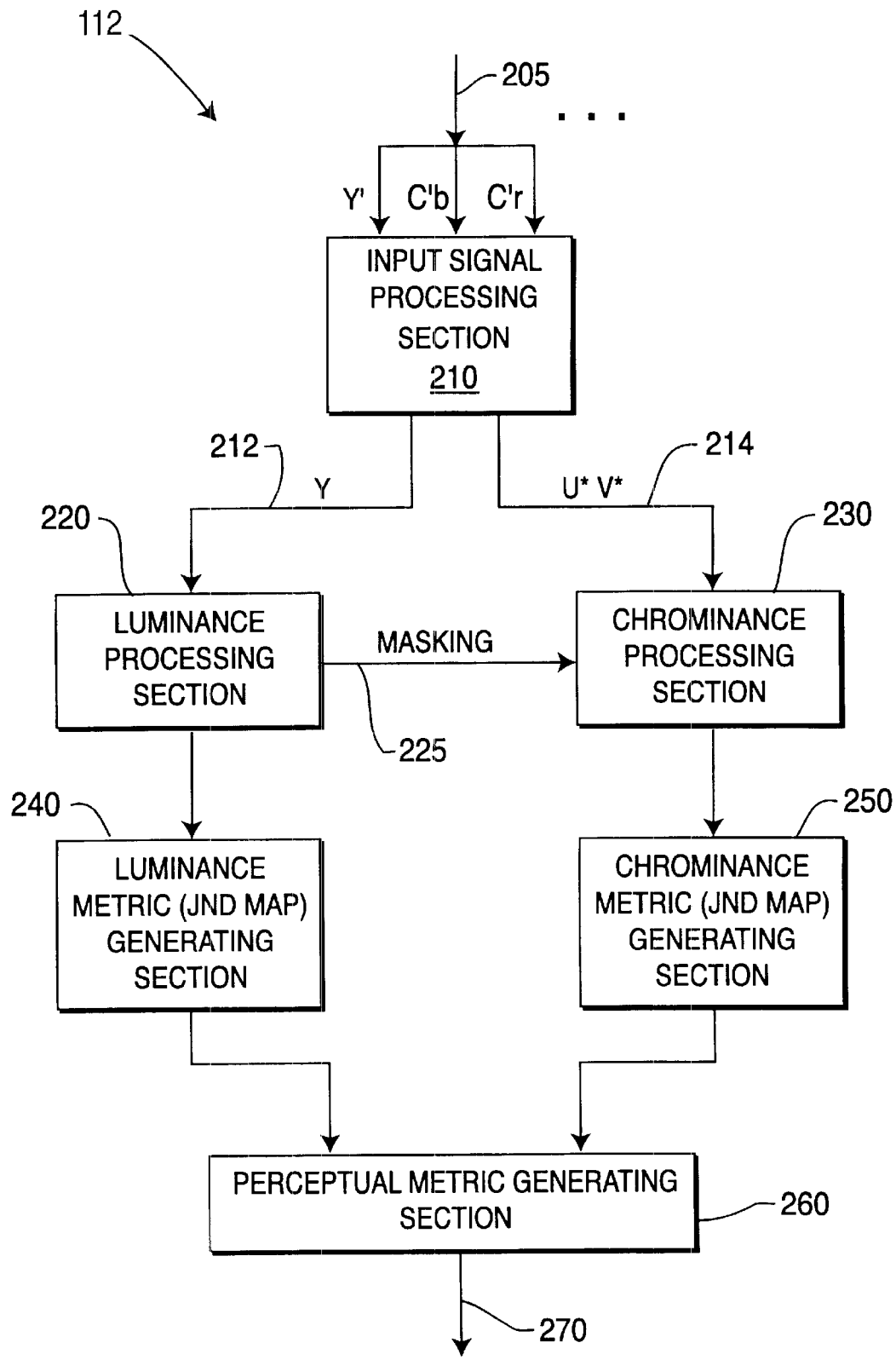
FIG. 2 illustrates a block diagram of the perceptual metric generator.

FIG. 2 illustrates a simplified block diagram of the perceptual metric generator 112. In the preferred embodiment, the perceptual metric generator comprises an input signal processing section 210, a luminance processing section 220, a chrominance processing section 230, a luminance metric generating section 240, a chrominance metric generating section 250 and a perceptual metric generating section 260.

The input signal processing section transforms input signals 205 into psychophysically defined quantities, e.g., luminance components and chrominance components for image signals. The input signals are two image sequences of arbitrary length. Although only one input signal is illustrated in FIG. 2, it should be understood that the input signal processing section can process more than one input signal simultaneously. The purpose of the input signal processing section 210 is to transform input image signals to light outputs, and then to transform these light outputs to psychophysically defined quantities that separately characterize luminance and chrominance.

More specifically, for each field of each input sequence, there are three data sets, labeled Y', $C_b'$, and $C_r'$ at the top of FIG. 2, derived, e.g., from a D1 tape. In turn, Y, $C_b$, $C_r$ data are then transformed to R', G', and B' electron-gun voltages that give rise to the displayed pixel values. In the input signal processing section, R', G', B' voltages undergo further processing to transform them to a luminance and two chromatic images that are passed to subsequent processing stages or sections.

The luminance processing section 220 accepts two images (test and reference) of luminances Y, expressed as fractions of the maximum luminance of the display. These outputs are passed to luminance metric generating section 240, where a luminance JND map is generated. The JND map is an image whose gray levels are proportional to the number of JNDs between the test and reference image at the corresponding pixel location.

Similarly, the chrominance processing section 230 processes the chrominance components of the input signals into a chrominance perceptual metric. Namely, the chrominance processing section 230 accepts two images (test and reference) of chrominance based on the CIE L*u*v* uniform-color space, (occurs for each of the chrominance images u* and v*), and expressed as fractions of the maximum chrominance of the display. In turn, outputs of u* and v* processing are received and combined by the chrominance metric generating section 250 to produce the chrominance JND map.

Furthermore, both chrominance and luminance processing are influenced by inputs from the luminance channel called "masking" via path 225, which render perceived differences more or less visible depending on the structure of the luminance images. Masking (self or cross) generally refers to a reduction of sensitivity in the presence information in a channel or a neighboring channel.

The chrominance, luminance and combined luma-chroma JND maps are each available as output to the perceptual metric generating section 260, together with a small number of summary measures derived from these maps. Whereas the single JND value (JND summaries) output is useful to model an observer's overall rating of the distortions in a test sequence, the JND maps give a more detailed view of the location and severity of the artifacts. In turn, the perceptual metric generating section 260 correlates the luminance perceptual metric with the chrominance perceptual metric into a unified perceptual image metric 270, e.g., an overall just-noticeable-difference (JND) map.

It should be noted that two basic assumptions underlie the present invention. First, each pixel is "square" and subtends 0.03 degrees of viewing angle. This number was derived from a screen height of 480 pixels, and a viewing distance of four screen-heights (the closest viewing distance prescribed by the "Rec. 500" standard). When the present perceptual metric generator is compared with human perception at longer viewing distances than four screen heights, the perceptual metric generator may overestimate the human's sensitivity to spatial details. Thus, in the absence of hard constraints on viewing distance, the perceptual metric generator is adjusted to be as sensitive as possible within the recommendations of the "Rec 500". However, the sensitivity of the perceptual metric generator can be adjusted for a particular application.

Second, the perceptual metric generator applies to screen luminances of 0.01–100 ft-L, (for which overall sensitivity was calibrated), but with greatest accuracy at about 20 ft-L (for which all spatiotemporal frequencies were calibrated). It is also assumed that changing luminance incurs proportional sensitivity changes at all spatiotemporal frequencies, and this assumption is less important near 20 ft-L, where additional calibration occurred. Calibration and experimental data are presented below.

The processing sections illustrated in FIG. 2 are now described in more detail below with reference to FIGS. 3, 4, 5, 6 and 7.

Figure 3:
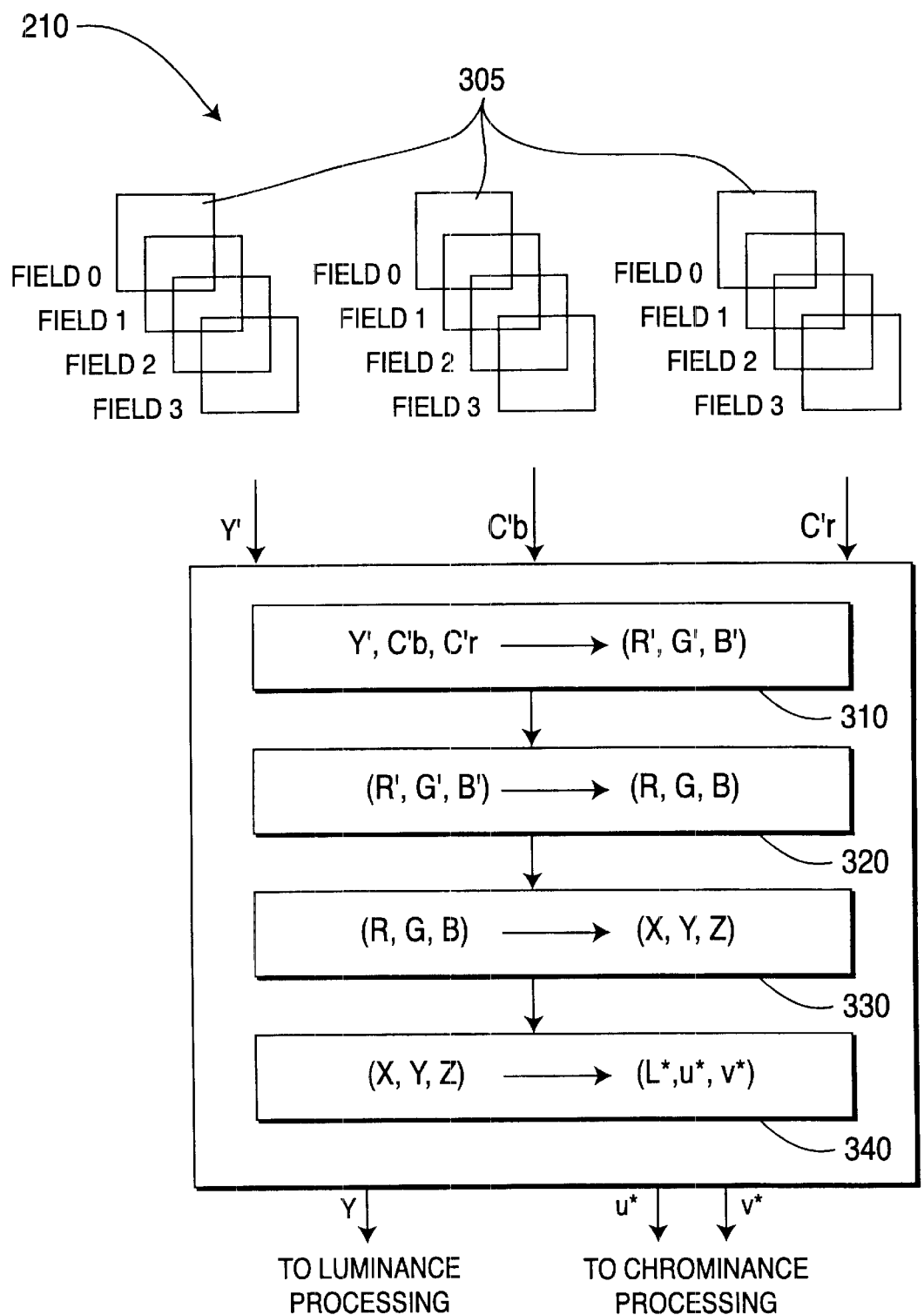
FIG. 3 illustrates a block diagram of the input signal processing section.

FIG. 3 illustrates a block diagram of the input signal processing section 210. In the preferred embodiment, each input signal is processed in a set of four fields 305. Thus, the stack of four fields labeled Y', $C_b'$, $C_r'$ at the top of FIG. 3 indicates a set of four consecutive fields from either a test or reference image sequence. However, the present invention is not limited to such implementation and other field grouping methods can be used.

Multiple transformations are included in the input signal processing section 210. In brief, the input signal processing section 210 transforms Y', $C_b'$, $C_r'$ video input signals first to electron-gun voltages, then to luminance values of three phosphors, and finally into psychophysical variables that separate into luminance and chrominance components. The tristimulus value Y, which is computed below, replaces the "model intensity value" used before chrominance processing. In addition, chrominance components u* and v* are generated, pixel by pixel, according to CIE uniform-color specifications.

It should be noted that the input signal processing section 210 can be implemented optionally, if the input signal is already in an acceptable uniform-color space. For example, the input signal may have been previously processed into the proper format and saved onto a storage device, e.g., magnetic or optical drives and disks. Furthermore, it should be noted that although the present invention is implemented with pixels mapped into CIELUV, an international-standard uniform-color space, the present invention can be implemented and adapted to process input signals that are mapped into other spaces.

The first processing stage 310 transforms Y', $C_b'$, $C_r'$ data, to R', G', B' gun voltages. More specifically, the steps outlined below describe the transformation from Y', $C'_b$, $C'_r$ image frames to R', G', B' voltage signals that drive a CRT display. Here, the apostrophe indicates that the input signals have been gamma-precorrected at the encoder. Namely, these signals, after transformation, can drive a CRT display device whose voltage-current transfer function can be closely approximated by a gamma nonlinearity.

It is assumed that the input digital images are in 4:2:2 format: full resolution on the luminance correlate Y', and half-resolution horizontally for the chrominance correlates $C'_b$ and $C'_r$, where Y', $C'_b$, $C'_r$ data are assumed to be stored in the order specified in ANSI/SMPTE Std. 125M-1992, i.e., $C'_{b0}$, $Y'_0$, $C'_{r0}$, $Y'_1$, $C'_{b1}$, $Y'_2$, $C'_{r1}$, $Y'_3$, ..., $C'_{bn/2-1}$, $Y'_{n-1}$, $C'_{rn/2-1}$, $Y'_{n-2}$, ....

In the steps enumerated below, there are two embodiments or alternatives for chrominance upsampling and three embodiments or alternatives for matrix conversion from Y' $C'_b$ $C'_r$ to R' G' B'. These alternatives cover various common requirements, e.g., decoding requirements that might be encountered in various applications.

More specifically, in the first chrominance upsampling embodiment, the Y' $C'_b$ $C'_r$ arrays from a single frame are received, where the $C'_b$ and $C'_r$ arrays are expanded to the full resolution of the Y' image. The $C'_b$ and $C'_r$ arrays are initially at half-resolution horizontally, and are then up-sampled to create the full-resolution fields. Namely, the alternate $C'_b$, $C'_r$ pixels on a row are assigned to the even-numbered $Y'_i$ in the data stream. Then, the $C'_b$, $C'_r$ pair associated with the even-numbered $Y'_i$, are computed either (i) by replication or (ii) by averaging with its neighbors.

In the second chrominance upsampling embodiment, the full-resolution Y', $C'_b$, $C'_r$ arrays are parceled into two fields. In the case of Y', the first field contains the odd lines of the Y' array, and the second field contains the even lines of the Y' array. Identical processing is performed on $C'_b$ and $C'_r$ arrays to produce the first and second $C'_b$ and $C'_r$ fields.

In matrix conversion of Y' $C'_b$ $C'_r$ to R' G' B', the corresponding Y' $C'_b$ $C'_r$ values are converted to the gun input values R', G', B' for each pixel in each of the two fields. The Y' $C'_b$ $C'_r$ values are taken to be related to the R'G'B' values by one of the following three alternative equations. The first two equations can be found in *Video Demystified*, by Keith Jack, HighText, San Diego, 1996 (Ch. 3, p. 40–42. Equation (3) corresponds to Equation 9.9 in *A Technical Introduction to Digital Video*, by C. A. Poynton, p. 176 Wiley, 1996. ($C_b$ was substituted for U and $C_r$ was substituted for V) In the preferred embodiment, equation (2) is selected as the default, which should be use unless measurement of a display of interest indicates otherwise.

$$\begin{bmatrix} R' \\ G' \\ B' \end{bmatrix} = \begin{bmatrix} 1 & 0 & 1.140 \\ 1 & -0.394 & -0.581 \\ 1 & 2.032 & 0 \end{bmatrix} \left[ \begin{pmatrix} Y' \\ C'_b \\ C'_r \end{pmatrix} - \begin{pmatrix} 0 \\ 128 \\ 128 \end{pmatrix} \right] \quad (1)$$

or $$\begin{bmatrix} R' \\ G' \\ B' \end{bmatrix} = \begin{bmatrix} 1 & 0 & 1.371 \\ 1 & -0.336 & -0.698 \\ 1 & 1.732 & 0 \end{bmatrix} \left[ \begin{pmatrix} Y' \\ C'_b \\ C'_r \end{pmatrix} - \begin{pmatrix} 0 \\ 128 \\ 128 \end{pmatrix} \right] \quad (2)$$

or $$\begin{bmatrix} R' \\ G' \\ B' \end{bmatrix} = \frac{1}{256} \begin{bmatrix} 256 & 0 & 350.901 \\ 256 & -86.132 & -178.738 \\ 256 & 443.506 & 0 \end{bmatrix} \left[ \begin{pmatrix} Y' \\ C'_b \\ C'_r \end{pmatrix} - \begin{pmatrix} 16 \\ 128 \\ 128 \end{pmatrix} \right] \quad (3)$$

or $$\begin{bmatrix} R' \\ G' \\ B' \end{bmatrix} = \frac{1}{256} \begin{bmatrix} 298.082 & 0 & 25.064 \\ 298.082 & -100.291 & -208.120 \\ 298.082 & 516.411 & 0 \end{bmatrix} \left[ \begin{pmatrix} Y' \\ C'_b \\ C'_r \end{pmatrix} - \begin{pmatrix} 16 \\ 128 \\ 128 \end{pmatrix} \right] \quad (3a)$$

The R', G', and B' arrays are then received by the second processing stage 320 in the input signal processing section 210. The second processing stage 320 applies a point-nonlinearity to each R', G', B' image. This second processing stage models the transfer of the R', G', B' gun voltages into intensities (R, G, B) of the display (fractions of maximum luminance). The nonlinearity also performs clipping at low luminances in each plane by the display.

More specifically, the conversion between (R', G', B') and (R, G, B) contains two parts, one of which transforms each pixel value independently and one of which performs a spatial filtering on the transformed pixel values. The two parts are described below.

Pixel-value Transformation

First, the fraction of maximum luminance R corresponding to input R' is computed for each pixel. Similarly, the fractional luminances G and B are computed from inputs G', B'. The maximum luminance from each gun is assumed to correspond to the input value 255. The following equations describe the transformation from (R', G', B') to (R, G, B):

$$R = \left[ \frac{\max(R', t_d)}{255} \right]^\gamma, \quad (4)$$

$$G = \left[ \frac{\max(G', t_d)}{255} \right]^\gamma,$$

$$B = \left[ \frac{\max(B', t_d)}{255} \right]^\gamma.$$

The default threshold value $t_d$ is selected to be 16 to correspond with the black level of the display, and γ defaults to 2.5.

The value of 16 for $t_d$ is selected to provide the display with a dynamic range of $(255/16)^{2.5}$ which is approximately 1000:1. This dynamic range is relatively large, and may not be necessary where the ambient illumination is approximately 1% of the maximum display white. Therefore, the physical fidelity can be maintained even if the perceptual generator employs the value 40 as a black level instead of the value 16, which still provides a 100:1 dynamic range. In fact, a lower dynamic range will produce a saving in computational cycles, i.e., saving one or two bits in the processing.

Two observations about the display are discussed below. The first observation involves the dependence on absolute screen luminance. The predictions of the perceptual metric generator implicitly apply only to the luminance levels for which the perceptual metric generator was calibrated.

For typical calibration data (J. J. Koenderink and A. J. van Doorn, "Spatiotemporal contrast detection threshold surface is bimodal," *Optics Letters* 4, 32–34 (1979)), the retinal illuminance was 200 trolands, using a default pupil of diameter 2 mm. This implies a screen luminance of 63.66 cd/m², or 18.58 ft-L. The calibration luminance is comparable to the luminances of the displays used in the subjective rating tests. For example, although the maximum-white luminances of two experiments were 71 and 97 ft-L, the luminances at pixel value 128 were 15 and 21 ft-L, respectively. Taking these values into account and the fact that the perceptual metric generator's overall sensitivity was calibrated from 0.01 to 100 ft-L (using data of F. L. van Nes, J. J. Koenderink, H. Nas, and M. A. Bouman, "Spatiotemporal modulation transfer in the human eye," *J. Opt. Soc. Am.* 57, 1082–1088 (1967)), it can be concluded that the perceptual metric generator applies to screen luminances from approximately 20 to 100 ft-L.

The second observation involves the relationship of Equation (4) to other models. An offset voltage $t_d$ (e.g., from a grid setting between cathode and TV screen) can be used to transform Equation (4) into the model advanced by Poynton (C. A. Poynton, "Gamma" and its disguises: The nonlinear mappings of intensity in perception, CRTs, Film, and Video, *SMPTE Journal,* December 1993, pp. 1099–1108) where R=k[R'+b]$^\gamma$ (and similarly for G and B). One obtains Poynton's model by defining a new voltage R"=R'-$t_d$. Hence R=k[R''+$t_d$]$^\gamma$, and similarly for G and B. By writing Equation (4) rather than the equation of Poynton, it is assumed that an offset voltage is –$t_d$. It is also assumed that there is no ambient illumination.

In the presence of ambient illumination c, the voltage offset becomes negligible, and Equation (4) becomes approximately equivalent to the model advanced by Meyer ("The importance of gun balancing in monitor calibration," in *Perceiving, Measuring, and Using Color* (M. Brill, ed.), Proc. SPIE, Vol. 1250, pp. 69–79 (1990)), namely R=kR''$^\gamma$+c. Similar expressions result for G and B. If ambient illumination is present, then Equation (4) can be replaced by the model of Meyer, with k=(1/255)$^\gamma$ and c=0.01.

The present perceptual metric generator provides three options for specifying the vertical representation of (R, G, B) images, for each frame (in progressive images) and for odd and even fields (in interlaced images).

Option 1. Frame

Images are full-height and contain one progressively scanned image.

Option 2. Full-height Interlace

Half-height images are interspersed with blank lines and become full-height, as they are in an interlaced screen. Blank lines are subsequently filled by interpolation as described below.

Option 3. Half-height Interlace

Half-height images are processed directly.

The first two options are more faithful to video image structure, whereas the third option has the advantage of reducing processing time and memory requirements by 50%. Luminance and chrominance processing are identical for options 1 and 2 since both options operate on full-height images. These three options are described in detail below.

Spatial Pre-filtering

Spatial pre-processing is not required for the above options 1 and 3. However, there is spatial pre-filtering associated with the full-height interlace option 2.

To accommodate the spread of light from line to inter-line pixels in a field, the R, G, and B field images are also subjected to a line interpolation process. Four different methods of interpolation are illustrated below, but the present invention is not limited to these interpolation methods. In each method, an entire frame is read, and then each pixel on the lines belonging to the inactive field are replaced with values computed from the pixels immediately above and below. For methods (3) and (4), the computation also uses pixel values from the inactive field.

Let $P_{inactive}$ denote an inactive line pixel to be interpolated, and $P_{above}$ and $P_{below}$ denote the active line pixels above and below $P_{inactive}$, respectively. The four methods are:

$$\text{Average } P_{inactive} \leftarrow \frac{(P_{above} + P_{below})}{2} \quad (1)$$

$$\text{Duplicate } P_{inactive} \leftarrow \begin{cases} P_{above} & \text{if first line active} \\ P_{below} & \text{otherwise} \end{cases} \quad (2)$$

$$\text{Hybrid average } P_{inactive} \leftarrow \frac{P_{inactive}}{2} + \frac{(P_{above} + P_{below})}{4} \quad (3)$$

Median $P_{inactive} \leftarrow$ median($P_{inactive}, P_{above}, P_{below}$)
Method (1) average is the default.

Returning to FIG. 3, following the nonlinearity process, the third processing stage 330 models vertical electron-beam spot spread into interline locations by replacing the interline values in fields R, G, B by interpolated values from above and below. Then, the vector (R,G,B) at each pixel in the field is subjected to a linear transformation (which depends on the display phosphors) to CIE 1931 tristimulus coordinates (X, Y, Z). The luminance component Y of this vector is passed to luminance processing section 220 as discussed above.

More specifically, the CIE 1931 tristimulus values X, Y, and Z are computed for each pixel, given the fractional luminance values R, G, B. This process requires the following inputs which are display device dependent: the chromaticity coordinates ($x_r$, $y_r$), ($x_g$, $y_g$), ($x_b$, $y_b$) of the three phosphors, and the chromaticity of the monitor white point ($x_w$, $y_w$).

The white point is selected as corresponding to Illuminant D65, such that ($x_w$, $y_w$)=(0.3128, 0.3292) (see G. Wyszecki and W. S. Stiles, *Color Science*, 2nd ed., Wiley, 1982, p. 761). The values ($x_r$, $y_r$)=(0.6245, 0.3581), ($x_g$, $y_g$)=(0.2032, 0.716), and ($x_b$, $y_b$)=(0.1465, 0.0549) for the red, green and blue phosphors, respectively, correspond to currently available phosphors that closely approximate NTSC phosphors. However, Table 1 below illustrates other display phosphor coordinate (phosphor primary chromaticity) options. ITU-R BT.709 (Rec. 709) is the default.

TABLE 1

Display phosphor coordinate options

| Source | ($x_r$, $y_r$) | ($x_g$, $y_g$) | ($x_b$, $y_b$) |
| --- | --- | --- | --- |
| ITU-R BT.709 (SMPTE274M) | (0.640, 0.330) | (0.300, 0.600) | (0.150, 0.060) |
| SMPTE 240M | (0.630, 0.340) | (0.310, 0.595) | (0.155, 0.070) |
| EBU | (0.640, 0.330) | (0.290, 0.600) | (0.150, 0.060) |

Using the above parameter values, the values X, Y, Z of the pixel are given by the following equations:

$$\begin{bmatrix} X \\ Y \\ Z \end{bmatrix} = \begin{bmatrix} \frac{x_r}{y_r} Y_{0r} & \frac{x_g}{y_g} Y_{0g} & \frac{x_b}{y_b} Y_{0b} \\ Y_{0r} & Y_{0g} & Y_{0b} \\ \frac{z_r}{y_r} Y_{0r} & \frac{z_g}{y_g} Y_{0g} & \frac{z_b}{y_b} Y_{0b} \end{bmatrix} \begin{bmatrix} R \\ G \\ B \end{bmatrix} \quad (5)$$

where, $z_r$=(1-$x_r$-$y_r$), zg=(1-xg-yg), $z_b$=(1-$x_b$-$y_b$), and the values $Y_{0r}$, $Y_{0g}$, $Y_{0b}$ are given by $$\begin{bmatrix} Y_{0r} \\ Y_{0g} \\ Y_{0b} \end{bmatrix} = \begin{bmatrix} \frac{x_r}{y_r} & \frac{x_g}{y_g} & \frac{x_b}{y_b} \\ 1 & 1 & 1 \\ \frac{z_r}{y_r} & \frac{z_g}{y_g} & \frac{z_b}{y_b} \end{bmatrix}^{-1} \begin{bmatrix} \frac{x_w}{y_w} \\ 1 \\ \frac{z_w}{y_w} \end{bmatrix}, \quad (6)$$

where $z_w$=(1-$x_w$-y) (See D. Post, Colorimetric measurement, calibration, and characterization of self-luminous displays, in *Color in Electronic Displays*, H. Widdel and D. L. Post (eds), Plenum Press, 1992, p. 306)

The tristimulus values $X_n$, $Y_n$, $Z_n$ of the white point of the device are also needed. These values correspond to the chromaticity ($x_w$, $y_w$) and are such that, at full phosphor activation (R'=G'=B'=255), Y=1. Thus, the tristimulus values for the white point are ($X_n$, $Y_n$, $Z_n$)=($x_w/y_w$, 1, $z_w/y_w$).

As an optional final stage in deriving the values X, Y, Z, an adjustment can be made to accommodate an assumed ambient light due to veiling reflection from the display screen. This adjustment takes the form:

$$\begin{bmatrix} X \\ Y \\ Z \end{bmatrix} \leftarrow \begin{bmatrix} X \\ Y \\ Z \end{bmatrix} + \left(\frac{L_a}{L_{max}}\right) \begin{bmatrix} X_n \\ Y_n \\ Z_n \end{bmatrix}. \quad (6a)$$

Here, two user-specifiable parameters, $L_{max}$ and $L_a$, are introduced and assigned default values. $L_{max}$, the maximum luminance of the display, is set to 100 cd/m² to correspond to commercial displays. The veiling luminance, $L_a$, is set to 5 cd/m², consistent with measured screen values under Rec 500 conditions.

The chromaticity of the ambient light is assumed to be the same as that of the display white point. It should be noted that in the luminance—only implementation option, which does not compute the neutral point $(X_n, Y_n, Z_n)$, the adjustment:

$$Y \leftarrow Y + \frac{L_a}{L_{max}} \quad (6b)$$

is made instead of Equation (6a). This is equivalent to the Y component of Equation (6a) because $Y_n$ is always 1. It should also be noted that the quantity $L_{max}*Y$ is the luminance of the display in cd/m².

Returning to FIG. 3, to ensure (at each pixel) approximate perceptual uniformity of the color space to isoluminant color differences, the individual pixels are mapped into CIELUV, an international-standard uniform-color space (see Wyszecki and Stiles, 1982) in the fourth processing stage 340. The chrominance components u*, v* of this space are passed to the chrominance processing section 230.

More specifically, the X, Y, Z values, pixel-by-pixel, is transformed to the 1976 CIELUV uniform-color system (Wyszecki and Stiles, 1982, p. 165):

$$L^* = 116\left(\frac{Y}{Y_n}\right)^{\frac{1}{3}} - 16 \quad \text{for } \frac{Y}{Y_n} > 0.008856 \quad (7)$$

$$L^* = 903.3\left(\frac{Y}{Y_n}\right) \quad \text{for } \frac{Y}{Y_n} \le 0.008856$$

$$u^* = 13L^*(u'-u'_n) \quad (8)$$

$$v^* = 13L^*(v'-v'_n) \quad (9)$$

where, $$u' = \frac{4X}{(X+15Y+3Z)} \quad (10)$$

$$v' = \frac{9Y}{(X+15Y+3Z)} \quad (11)$$

$$u'_n = \frac{4X_n}{(X_n+15Y_n+3Z_n)} \quad (12)$$

$$v'_n = \frac{9Y_n}{(X_n+15Y_n+3Z_n)} \quad (13)$$

It should be noted that the coordinate L* is not passed to the luminance processing section 220. L* is used only in computing the chrominance coordinates u* and v*. Consequently, only u* and v* images are saved for further processing.

Figure 4:
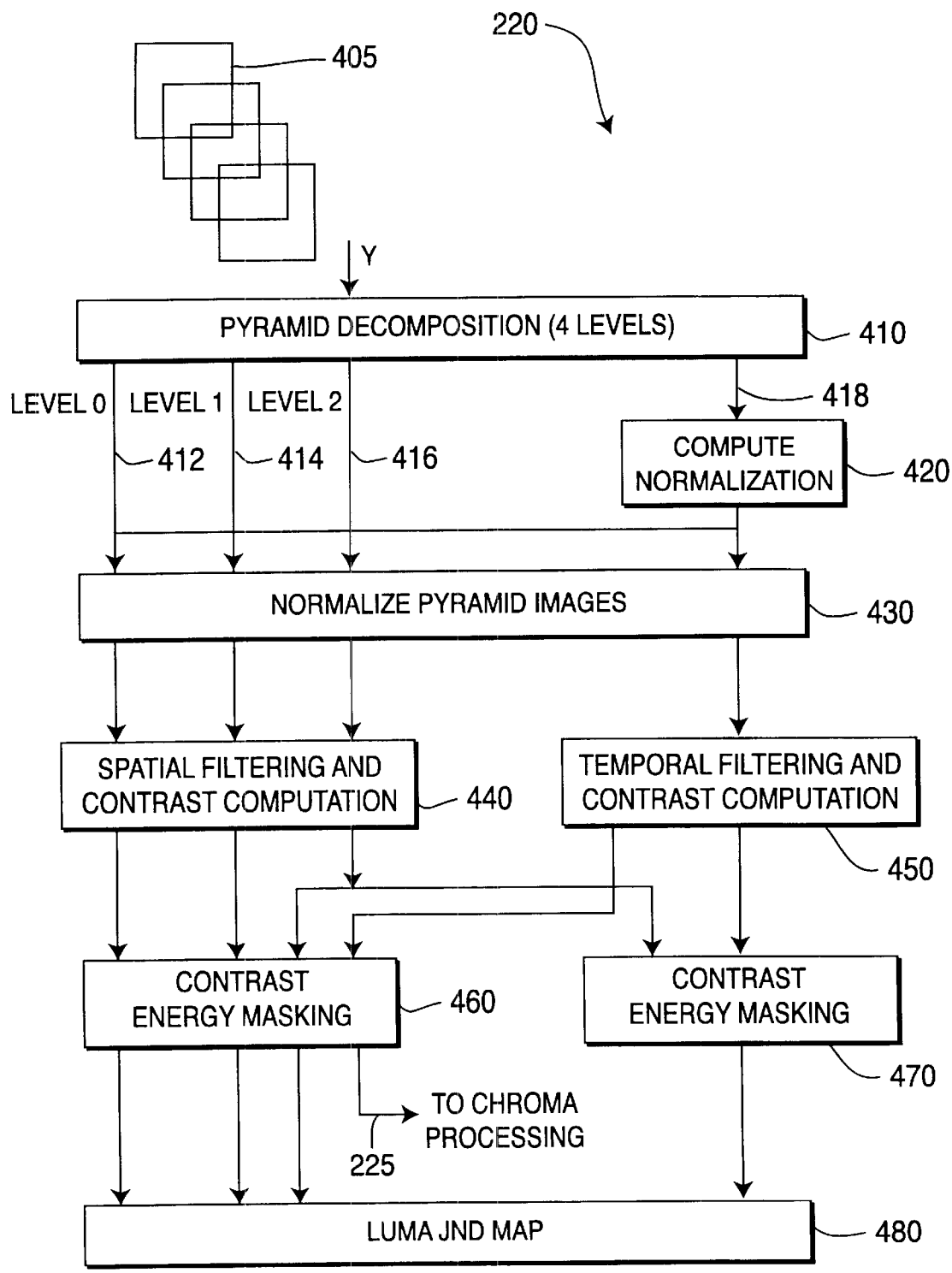
FIG. 4 illustrates a block diagram of the luminance processing section.

FIG. 4 illustrates a block diagram of the luminance processing section 220. FIG. 4 can be perceived as a flowchart of luminance processing steps or as a block diagram of a plurality of hardware components for performing such luminance processing steps, e.g., filters, various circuit components and/or application specific integrated circuits (ASIC).

Referring to FIG. 4, each luminance field is filtered and down-sampled in a four-level Gaussian pyramid 410, in order to model the psychophysically and physiologically observed decomposition of incoming visual signals into different spatial-frequency bands 412–418. After the decomposition, subsequent optional processing can be performed, e.g., oriented filtering, applied at each pyramid level.

Next, a non-linear operation 430 is performed immediately following the pyramid decomposition. This stage is a gain-setting operation (normalization) based on a time-dependent windowed average (across fields) of the maximum luminance within the coarsest pyramid level. This normalization sets the overall gain of the perceptual metric generator and models effects such as the loss of visual sensitivity after a transition from a bright to a dark scene.

It should be noted that an intermediate normalization process 420 is performed to derive an intermediate value $I_{norm}$. The $I_{norm}$ value is employed to scale each of the four pyramid levels as discussed below.

After normalization, the lowest-resolution pyramid image 418 is subjected to temporal filtering and contrast computation 450, and the other three levels 412–416 are subjected to spatial filtering and contrast computation 440. In each case, the contrast is a local difference of pixel values divided by a local sum, appropriately scaled. In the formulation of the perceptual metric generator, this established the definition of "1 JND", which is passed on to subsequent stages of the perceptual metric generator. (Calibration iteratively revises the 1-JND interpretation at intermediate perceptual metric generator stages, which is discussed below). In each case, the contrast is squared to produce what is known as the contrast energy. The algebraic sign of the contrast is preserved for reattachment just prior to image comparison (JND map computation).

The next stages 460 and 470 (contrast-energy masking) constitute a further gain-setting operation in which each oriented response (contrast energy) is divided by a function of all the contrast energies. This combined attenuation of each response by other local responses is included to model visual "masking" effects such as the decrease in sensitivity to distortions in "busy" image areas. At this stage of the perceptual metric generator, temporal structure (flicker) is made to mask spatial differences, and spatial structure is also made to mask temporal differences. Luminance masking is also applied on the chrominance side, as discussed below.

The masked contrast energies (together with the contrast signs) are used to produce the luminance JND map 480. In brief, the luminance JND map is produced by: 1) separating each image into positive and negative components (half-wave rectification); 2) performing local pooling (averaging and downsampling, to model the local spatial summation observed in psychophysical experiments); 3) evaluating the absolute image differences channel by channel; 4) thresholding (coring); 5) raising the cored image differences to a power; and 6) up-sampling to the same resolution (which will be half the resolution of the original image due to the pooling stage).

Figure 19:
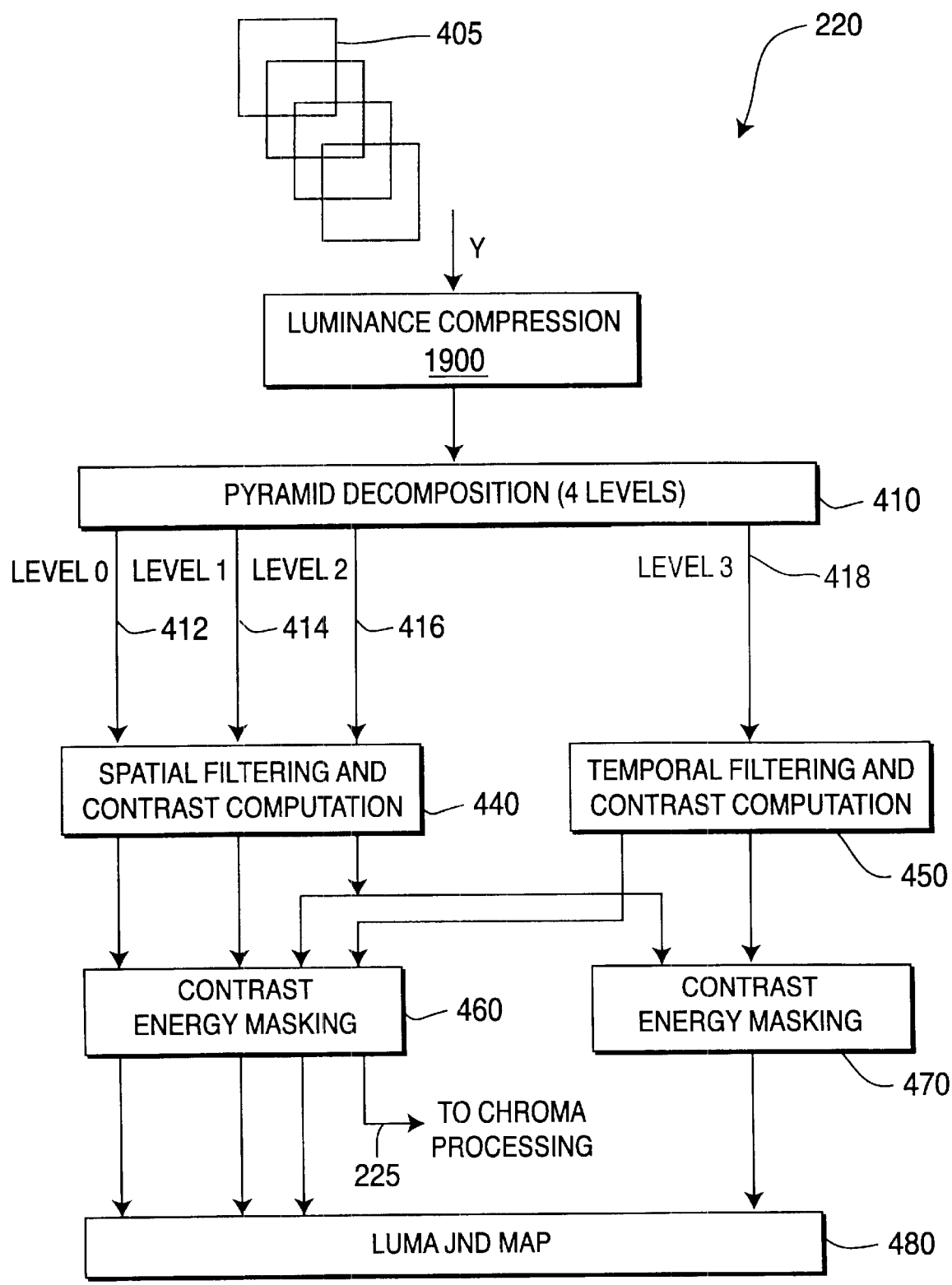
FIG. 19 illustrates a block diagram of an alternate embodiment of the luminance processing section.

FIG. 19 illustrates a block diagram of an alternate embodiment of the luminance processing section 220. More specifically, the normalization stages 420 and 430 of FIG. 4 are replaced with a luminance compression stage 1900. In brief, each luminance value in the input signal is first subjected to a compressive nonlinearity, which is described below in detail. Other stages in FIG. 19 are similar to those in FIG. 4. As such, the description of these similar stages are provided above. For dissimilar stages, a detail description of the luminance processing section of FIG. 19 is provided below with reference to FIG. 20.

In general, the luminance processing section of FIG. 19 is the preferred embodiment. However, since these two embodiments exhibit different characteristics, their performance may differ under different applications. For example, it has been observed that the luminance processing section of FIG. 4 performs well at higher dynamic ranges, e.g., 10-bit input images versus a lower dynamic range.

Figure 5:
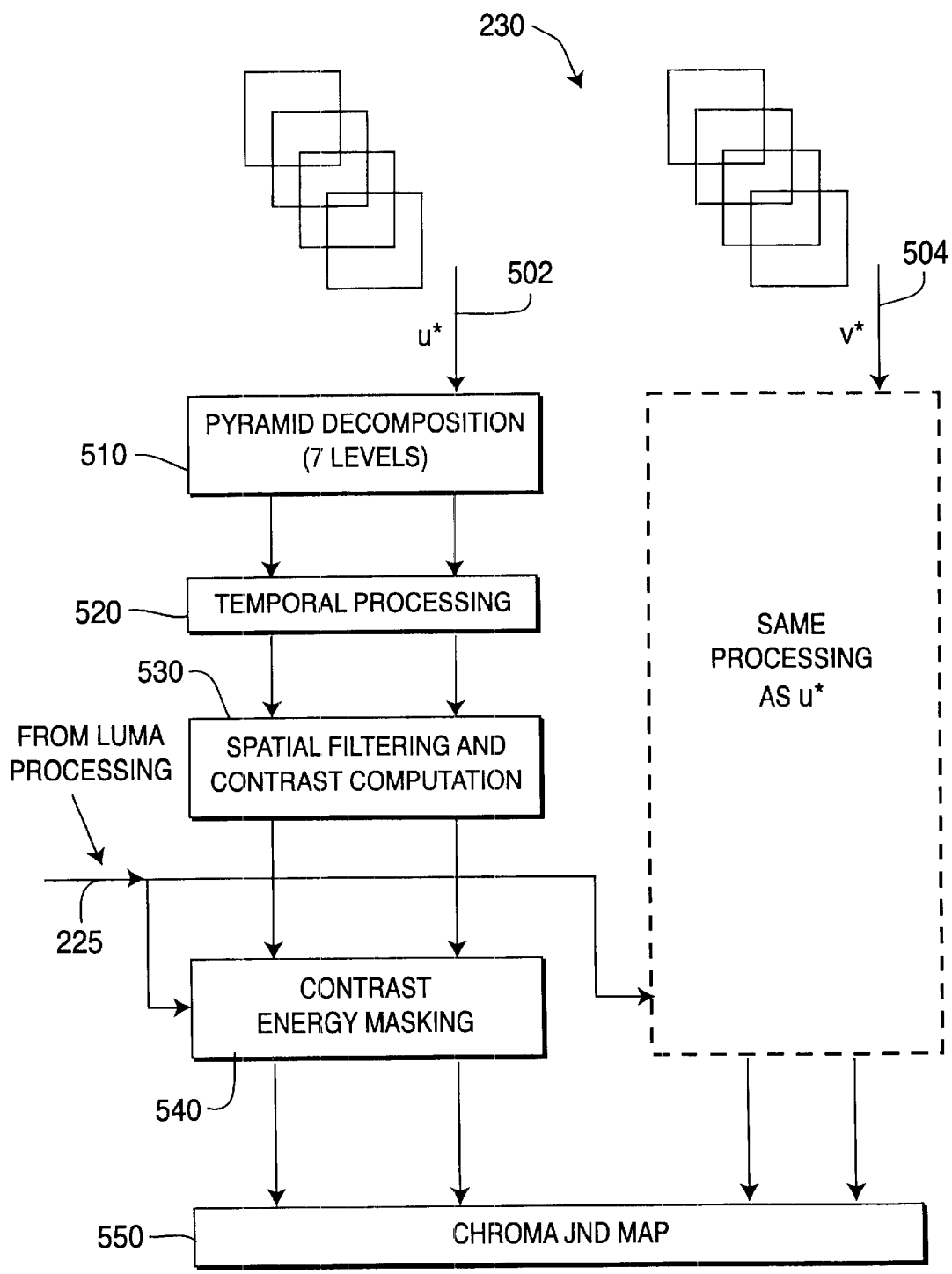
FIG. 5 illustrates a block diagram of the chrominance processing section.

FIG. 5 illustrates a block diagram of the chrominance processing section 230. FIG. 5 can be perceived as a flowchart of chrominance processing steps or as a block diagram of a plurality of hardware components for performing such chrominance processing steps, e.g., filters, various circuit components and/or application specific integrated circuits (ASIC). Chrominance processing parallels luminance processing in several aspects. Intra-image differences of chrominance (u* 502 and v* 504) of the CIELUV space are used to define the detection thresholds for the chrominance operation, in analogy to the way the Michelson contrast (and Weber's law) is used to define the detection threshold in the luminance processing section. Also, in analogy with the luminance operation, the chromatic "contrasts" defined by u* and v* differences are subjected to a masking operation. A transducer nonlinearity makes the discrimination of a contrast increment between one image and another depend on the contrast energy that is common to both images.

More specifically, FIG. 5 shows, as in the luminance processing section, each chrominance component u* 502, v* 504 being subjected to a pyramid decomposition process 510. However, whereas luminance processing implements a four pyramid level decomposition in the preferred embodiment, chrominance processing is implemented with seven (7) levels. This implementation addresses the empirical fact that chromatic channels are sensitive to far lower spatial frequencies than luminance channels (K. T. Mullen, "The contrast sensitivity of human colour vision to red-green and blue-yellow chromatic gratings," J. Physiol. 359, 381–400, 1985). Furthermore, such decomposition takes into account the intuitive fact that color differences can be observed in large, uniform regions.

Next, to reflect the inherent insensitivity of the chrominance channels to flicker, temporal processing 520 is accomplished by averaging over four image fields.

Then, spatial filtering by a Laplacian kernel 530 is performed on u* and v*. This operation produces a color difference in u*, v*, which (by definition of the uniform color space) is metrically connected to just-noticeable color differences. A value of 1 at this stage is taken to mean a single JND has been achieved, in analogy to the role of Weber's-law-based contrast in the luminance channel. (As in the case of luminance processing, the 1-JND chrominance unit must undergo reinterpretation during calibration.)

This color difference value is weighted, squared and passed (with the contrast algebraic sign) to the contrast-energy-masking stage 540. The masking stage performs the same function as in the luminance processing section. The operation is somewhat simpler, since it receives input only from the luminance channels and from the chrominance channel whose difference is being evaluated. Finally, the masked contrast energies are processed exactly as in the luminance processing section to produce a chrominance JND map in stage 550.

For each field in the video-sequence comparison, the luminance and chrominance JND maps are first reduced to single-number summaries, namely luminance and chrominance JND values. In each case, the reduction from map to number is done by summing all pixel values through a Minkowski addition. Then, the luminance and chrominance JND numbers are then combined, again via a Minkowski addition, to produce the JND estimate for the field being processed by the perceptual metric generating section 260. A single performance measure 270 for many fields of a video sequence is determined by adding, in the Minkowski sense, the JND estimates for each field.

Figure 6A:
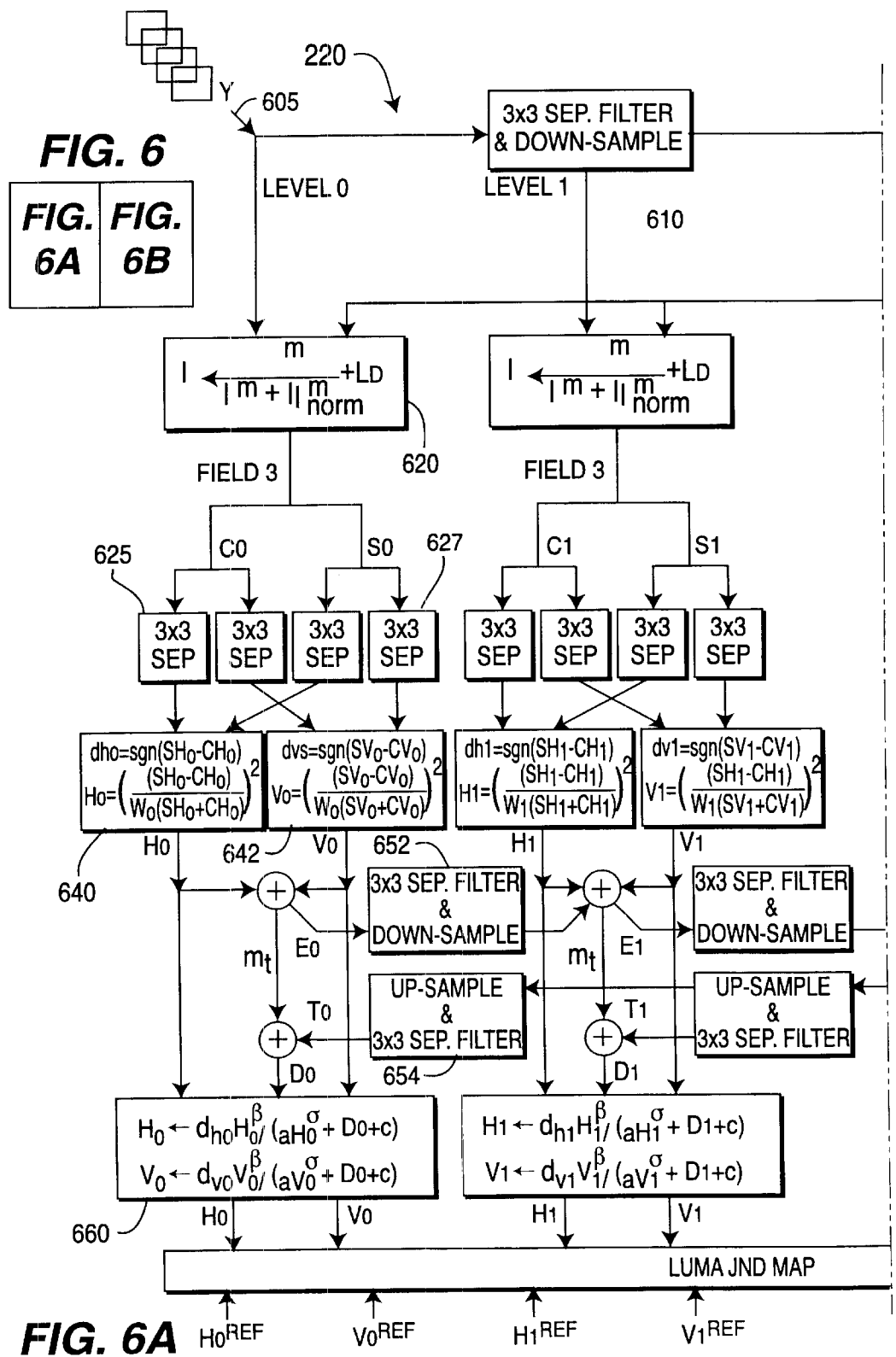
FIG. 6 illustrates a detailed block diagram of the luminance processing section.
Figure 6B:
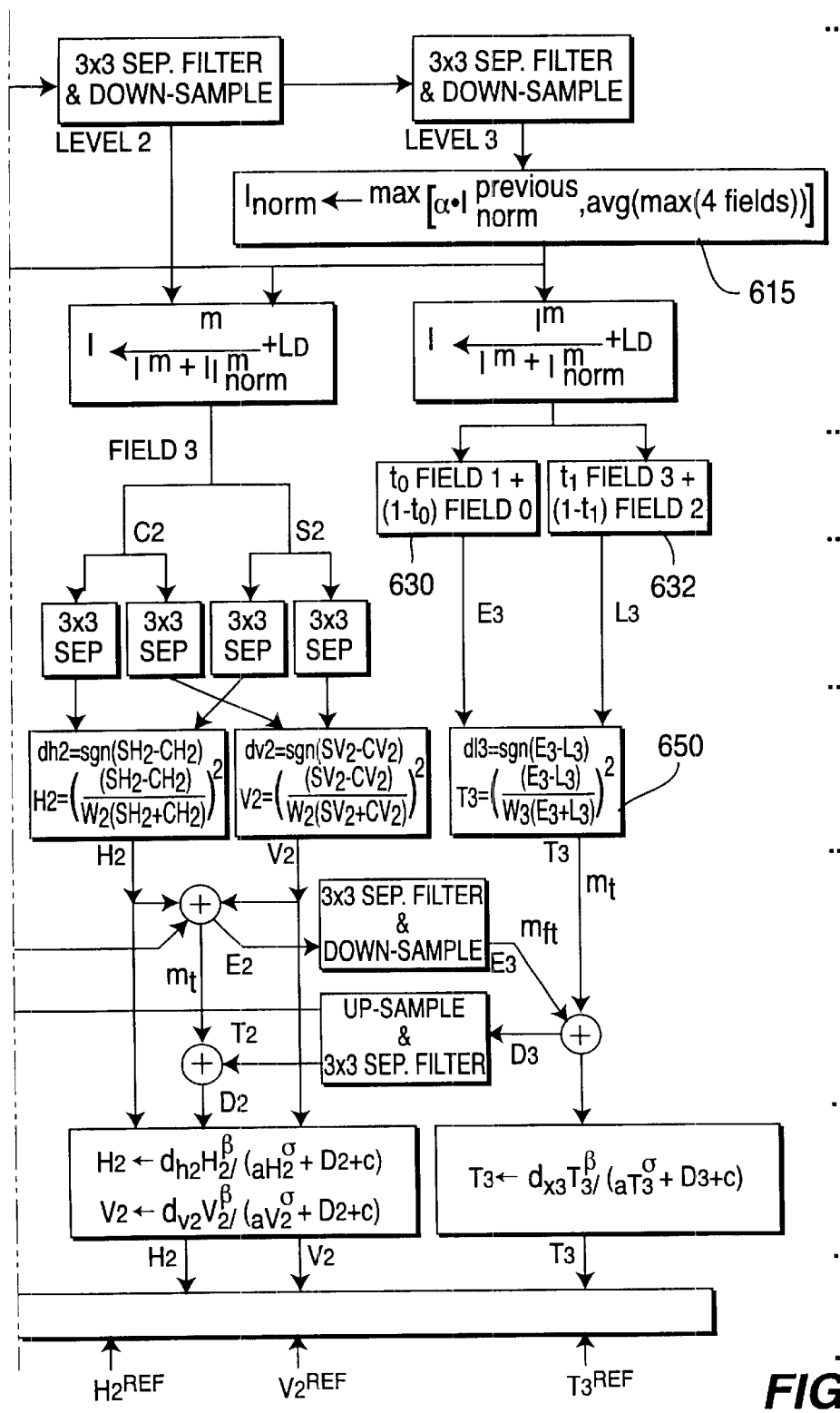

FIG. 6 illustrates a detailed block diagram of the luminance processing section 220 of FIG. 4. Input test and reference field images are denoted by $I_k$ and $I^{ref}_k$, respectively (k=0, 1, 2, 3). Pixel values in $I_k$ and $I^{ref}_k$ are denoted by $I_k(i,j)$ and $I^{ref}_k(i,j)$, respectively. These values are the Y tristimulus values 605 computed in input signal processing section 210. Only the fields $I_k$ are discussed below, since $I^{ref}_k$ processing is identical. It should be noted that k=3 denotes the most recent field in a 4-field sequence.

Spatial decomposition at four resolution levels is accomplished through a computationally efficient method called pyramid processing or pyramid decomposition, which smears and downsamples the image by a factor of 2 at each successively coarser level of resolution. The original, full-resolution image is called the zeroth level (level 0) of the pyramid, $G_0=I_3(i,j)$. Subsequent levels, at lower resolutions, are obtained by an operation called REDUCE. Namely, a three-tap low-pass filter 610 with weights (1,2,1)/4 is applied to $G_0$ sequentially in each direction of the image to generate a blurred image. The resulting image is then subsampled by a factor of 2 (every other pixel is removed) to create the next level, $G_1$.

Denoting fds1( ) as the operation of filtering and downsampling by one pyramid level, the REDUCE process can be represented as $$G_{i+1}=fds1(G_i), \text{ for } i=1, 2, 3. \tag{13a}$$

The REDUCE process is applied recursively to each new level (as described by P. J. Burt and E. H. Adelson, "The Laplacian pyramid as a compact image code," IEEE Transactions on Communications, COM-31, 532–540 (1983), Conversely, an operation EXPAND is defined that upsamples and filters by the same 3×3 kernel. This operation is denoted by usf1( ), and appears below.

The fds1 and usf1 filter kernels in each direction (horizontal and vertical) are $k_d$ [1,2,1] and $k_u$ [1,2,1], respectively, where constants $k_d$ and $k_u$ are chosen so that uniform-field values are conserved. For fds1, the constant is $k_d$=0.25, and for ufs1, the constant is $k_u$=0.5 (because of the zeros in the upsampled image). To implement usf1 as an in-place operation, the kernel is replaced by the equivalent linear interpolation to replace the zero values. However, for conceptual simplicity, it can be referred to as an "upsample-filter."

Next, normalization is applied, where an intermediate value (denoted by $I_{lvl3}$) is computed by averaging four values, the maximum pixel values in the Level 3 images for each field (k=0,1,2,3). This step mitigates the effect of outliers in the full resolution (Level 0) image by the smoothing inherent in the pyramid decomposition process. $I_{lvl3}$ is then compared with a decremented value of the normalization factor, $I_{norm}$, used in the previous epoch (k=2). $I_{norm}$ for the current epoch (k=3) is set equal to the larger of these two values. Images for all 4 pyramid levels for the latest field are then scaled by using this new value of $I_{norm}$, and subjected to a saturating nonlinearity.

The following equations describe this process. If the pyramid levels from above are $I_{3,l}(i,j)$, where 3 and l denote the latest field and pyramid level, respectively, then $$I_{3,l}(i,j) \leftarrow \frac{I_{3,l}(i,j)^m}{I_{3,l}(i,j)^m + I_{norm}^m} + L_D, \tag{14}$$

(620) where $I_{norm} = \max[\alpha I_{norm}^{(\prime)}, I_{lvl3}]$ 615, $I_{norm}^{(\prime)}$ is the value of $I_{norm}$ used in the previous epoch to normalize the field-3 pyramid levels, m defaults to 2, and $$I_{lvl3} = \frac{1}{4}\sum_{k=0}^{3}\max_{i,j}[I_{k,3}(i,j)], \text{ and } \alpha = \left(\frac{1}{2}\right)^{\left(\frac{\Delta t}{t_{half}}\right)}. \tag{15}$$

$\Delta t$ is the reciprocal of the field frequency, and $t_{half}=\frac{1}{2}$ is related to the adaptation rate of the human visual system following removal of a bright stimulus. Values of a for 50 and 60 Hz, respectively, are 0.9727 and 0.9772. The constant $L_D$ represents a residual visual response (noise) that exists in the absence of light, and defaults to a value of 0.01. The saturating nonlinearity in Equation (14) is derived from physiologically based models (see Shapley and Enroth-Cugell, 1984).

Oriented spatial filters (center and surround) are applied to the level 0, 1, and 2 images for field 3. In contrast, a temporal filter is applied to the lowest resolution level (level 3). Namely, the first and last pairs of fields are combined linearly into Early and Late images, respectively.

The center and surround filters 625 and 627 are separable 3×3 filters and yield all combinations of orientation: Center Vertical (CV), Center Horizontal (CH), Surround Vertical (SV), and Surround Horizontal (SH). The filter kernels are as follows:

$$CH = \begin{bmatrix} 0 & 0 & 0 \\ 2 & 4 & 2 \\ 0 & 0 & 0 \end{bmatrix}; SH = \begin{bmatrix} 1 & 2 & 1 \\ 0 & 0 & 0 \\ 1 & 2 & 1 \end{bmatrix}; CV = \begin{bmatrix} 0 & 2 & 0 \\ 0 & 4 & 0 \\ 0 & 2 & 0 \end{bmatrix}; SV = \begin{bmatrix} 1 & 0 & 1 \\ 2 & 0 & 2 \\ 1 & 0 & 1 \end{bmatrix}. \tag{16}$$

The level 3 Early 630 and Late 632 images are, respectively, $$E_3 = t_e I_{3,1}(i,j) + (1-t_e)I_{3,0}(i,j), \tag{17}$$

$$L_3 = t_l I_{3,3}(i,j) + (1-t_l)I_{3,2}(i,j). \tag{18}$$

The constants $t_e$ and $t_l$ for 60 Hz are 0.5161 and 0.4848, respectively, and for 50 Hz are 0.70 and 0.30, respectively.

Inputs for the contrast computation are the center and surround images $CV_i$, $CH_i$, $SV_i$, and $SH_i$ (i=0,1,2 for pyramid levels 0, 1, and 2), and the Early and Late images $E_3$ and $L_3$ (for pyramid level 3). The equation used to compute the contrast ratio is analogous to the Michelson contrast. For the horizontal and vertical orientations, the respective contrasts, pixel-by-pixel, are:

$$\frac{(SH_i - CH_i)}{w_i(CH_i + SH_i)}, \text{ and } \frac{(SV_i - CV_i)}{w_i(CV_i + SV_i)}. \tag{19}$$

Similarly, the contrast ratio for the temporal component is:

$$\frac{(E_3 - L_3)}{w_3(E_3 + L_3)}. \tag{20}$$

The values of $w_i$ for i=0,1,2,3, as determined by calibration with psychophysical test data, are 0.015, 0.0022, 0.0015, and 0.003, respectively.

Horizontal and vertical contrast-energy images 640 and 642 are computed by squaring the pixel values defined by the two preceding equations, thus obtaining:

$$H_i = \left(\frac{(SH_i - CH_i)}{w_i(CH_i + SH_i)}\right)^2, V_i = \left(\frac{(SV_i - CV_i)}{w_i(CV_i + SV_i)}\right)^2, \tag{21}$$

$i = 0, 1, 2,$ and

Similarly, the temporal contrast-energy image 650 is computed by squaring the pixel values:

$$T_3 = \left(\frac{(E_3 - L_3)}{w_3(E_3 + L_3)}\right)^2. \tag{22}$$

The algebraic sign of each contrast ratio pixel value prior to squaring is retained for later use.

Contrast-energy masking is a nonlinear function applied to each of the contrast energies or images computed with equations 21 and 22. The masking operation models the effect of spatiotemporal structure in the reference image sequence on the discrimination of distortion in the test image sequence.

For example, a test and a reference image differ by a low-amplitude spatial sine wave. It is known (Nachmias and Sansbury, 1974) that this difference is more visible when both images have in common a mid-contrast sine wave of the same spatial frequency, than if both images contain a uniform field. However, if the contrast of the common sine wave is too great, the image difference becomes less visible. It is also the case that sine waves of other spatial frequencies can have an effect on the visibility of the contrast difference. This behavior can be modeled by a nonlinearity that is sigmoid at low contrast energies, and an increasing power function for high contrast energies. Furthermore, the following criteria can be observed approximately in human vision. Each channel masks itself, high spatial frequencies mask low ones (but not the reverse), and temporal flicker masks spatial contrast sensitivity (and also the reverse). The foregoing spatial filtering can be enhanced to respond in a visually faithful way to point or line flicker by processing information from multiple image fields (e.g., two image fields), without disturbing the response to pure-spatial or pure-temporal images.

Generalizing Eq. 19, the invention defines pyramids CH2, SH2, CV2, and SV2 as the result of applying the kernels CH, SH, CV, and SV (respectively) defined by Eq. 16 to the image pyramids for field 2, and pyramids CH3, SH3, CV3, and SV3 as the result of applying the kernels CH, SH, CV, and SV (respectively) defined by Eq. 16 to the image pyramids for field 3.

Figure 28:
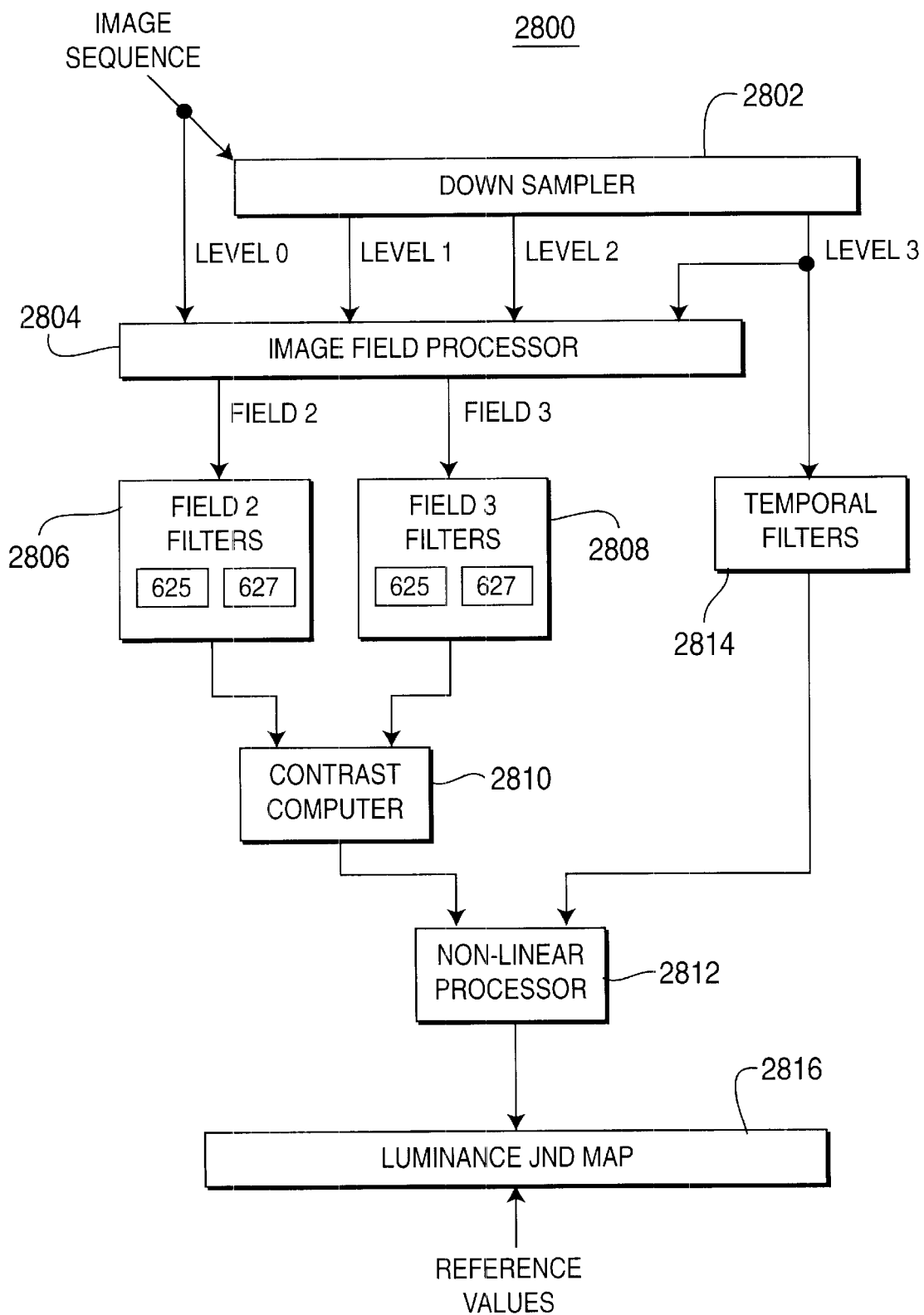
FIG. 28 depicts a block diagram of an alternative embodiment of the luminance processing section.

As depicted in the block diagram of FIG. 28, the invention applies all these operators to, for example, the last two fields (stored as pyramids) of the four-field image sequence. Prior to application of the operators, the image sequence is downsampled using downsampler 2802. The pyramid levels are then processed in an image field processor such 2804 that the field 2 and field 3 information is separately produced. Each field is respectively filtered by field 2 filters 2806 and field 3 filters 2808, i.e., the foregoing operators are applied using filters 625 and 627 as described with respect to FIG. 6.

More specifically, in a manner exactly the same as Eq. 19, for pyramid level i=0, 1, 2, the alternative embodiment 2800 uses a contrast computer 2810 to perform a contrast comparison using information from the two fields by defining oriented contrasts $$H_i = \frac{(SH3_i - CH3_i - SH2_i + CH2_i)}{wST_i(SH3_i + CH3_i + SH2_i + CH2_i)}$$

$$V_i = \frac{(SV3_i - CV3_i - SV2_i + CV2_i)}{wST_i(SV3_i + CV3_i + SV2_i + CV2_i)}$$

The contrast information is further processed by a nonlinear processor 2812. The processor 2812 processes both the output of the temporal filters 2814 (which operate as discussed with respect to FIG. 6) and the contrast information to produce information that is used to generate a luminance JND map 2816. The process used to produce the JND map is described below.

The multiple field process is calibrated on the data of Koenderink and van Doorn (1979) to find the new coefficients $wST_i$. Note that all these contrasts are zero for any stimulus that has either pure spatial or pure temporal variations.

Lastly, the invention incorporates the same formalism for masking as is already used on the other spatial channels.

In response to these properties of human vision, the following form of the nonlinearity (applied pixel by pixel) 660 is applied:

$$T(y, D_i) = \frac{d_y y^\beta}{a y^\sigma + D_i + c} \qquad (23)$$

Here, y is the contrast energy to be masked: spatial, $H_i$ or $V_i$ (Equation (21)) or temporal ($T_3$) (Equation (22)). The quantity $D_i$ refers (pixel by pixel) to an image that depends on the pyramid level i to which y belongs. Quantities $\beta$, $\sigma$, a, and c were found by perceptual metric generator calibration to be 1.17, 1.00, 0.0757, and 0.4753, respectively, and $d_y$ is the algebraic sign that was inherent in contrast y before it was squared.

Computation of $D_i$ requires both pyramid construction (filtering and downsampling) and pyramid reconstruction (filtering and upsampling). This computation of $D_i$ is illustrated in FIG. 6. First, $E_0$ is computed as the sum of $H_0$ and $V_0$. This sum is filtered, downsampled by stage 652, and added to $H_1+V_1$ to give $E_1$. Next, $E_1$ is further filtered, downsampled, and added to $H_2+V_2$ to give $E_2$. In turn, $E_2$ is further filtered and downsampled to give $E_3$. Meanwhile, the image of temporal contrasts $T_3$ is multiplied by $m_t$, and added to $m_{ft} E_3$ to produce a sum which is denoted $D_3$.

In turn, $D_3$ is upsampled and filtered by stage 654 repeatedly to produce $T_2$, $T_1$, and $T_0$. Finally, the images $D_i$ are defined as $D_i = m_f E_i + T_i$, i=0,1,2,. Here, $m_f$ is determined by calibration to be equal to 0.001, $m_{ft}$ is set equal to 0.0005, and $m_t$ is set equal to 0.05. The filtering, down-sampling and upsampling steps, are identical to those previously discussed.

The above processing illustrates that the higher spatial frequencies mask the lower ones (since $D_i$ are influenced by pyramid levels less than or equal to i), and the temporal channel is masked by all the spatial channels. This masking operation is generally in accord with psychophysical observation. The quantities $D_i$, i=0,1,2, also mask chrominance contrasts (but not the reverse) as discussed below.

Figure 20A:
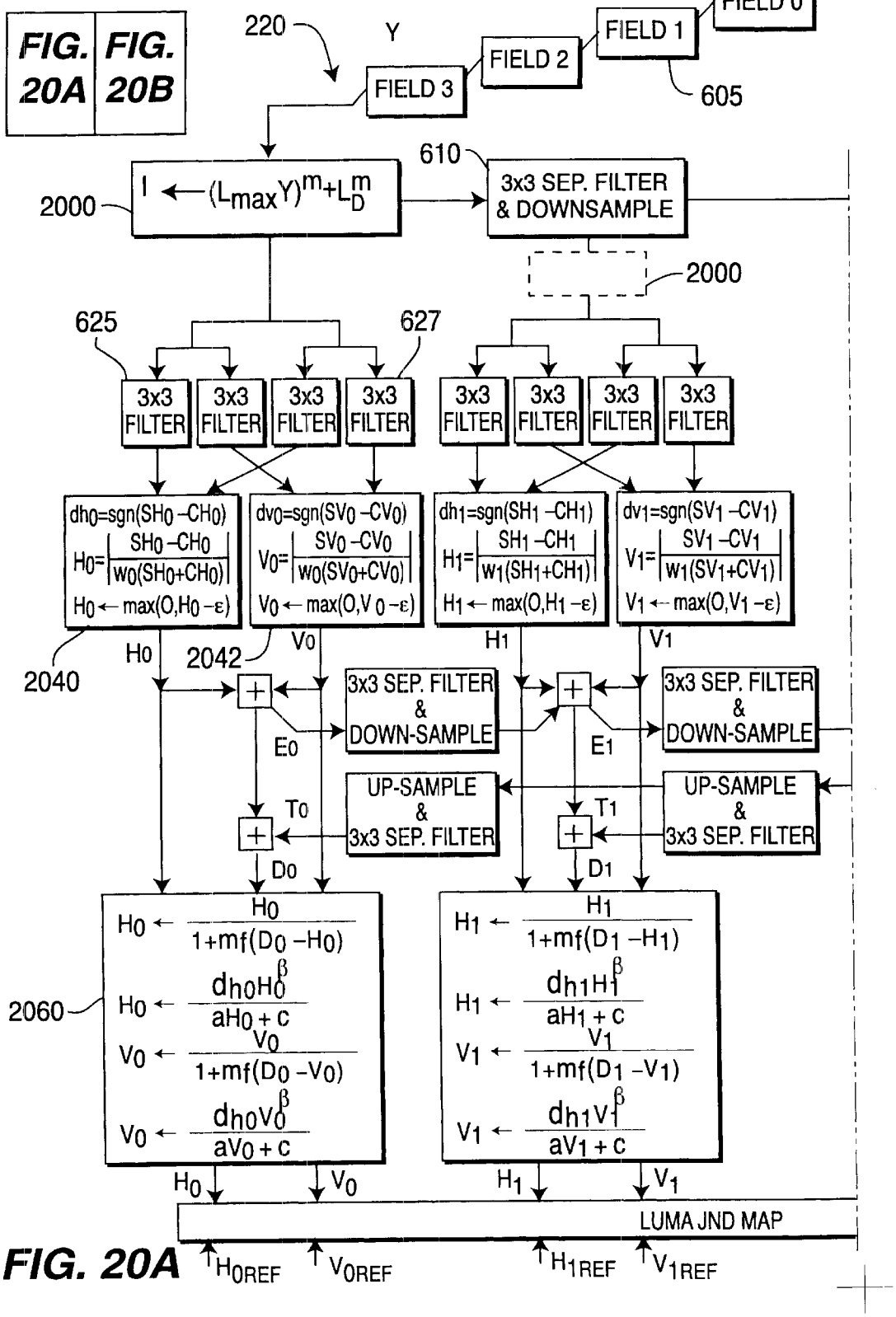
FIG. 20 illustrates a detailed block diagram of the alternate embodiment of the luminance processing section of FIG. 19.
Figure 20B:
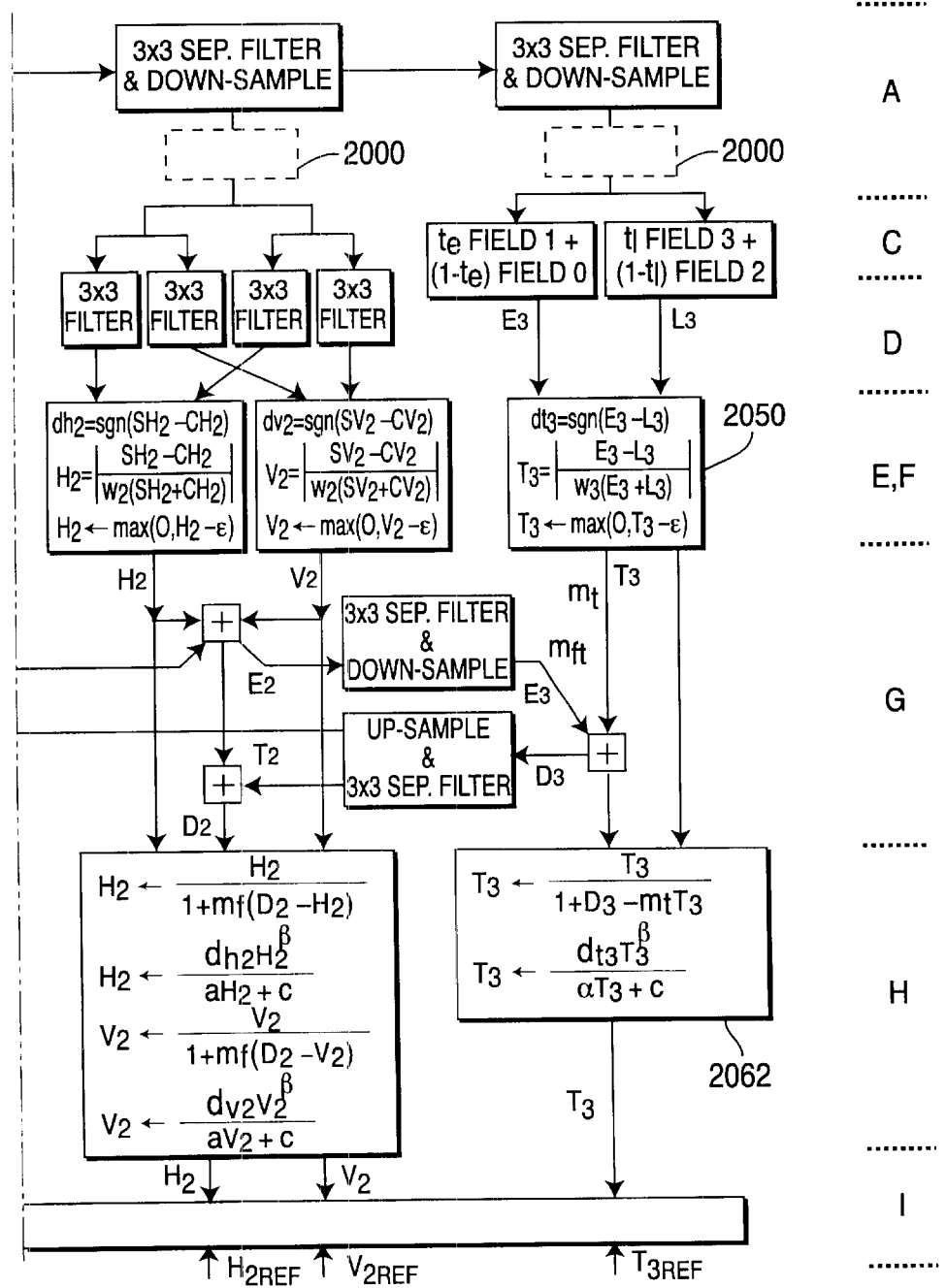

FIG. 20 illustrates a detailed block diagram of the alternate embodiment of the luminance processing section 220 of FIG. 19. Since the luminance processing section of FIG. 19 contains many similar stages to that of the luminance processing section of FIG. 6, a description is provided below only for the dissimilar stages.

One significant difference is the replacement of the normalization stages of FIG. 6 with a luminance compression (compressive nonlinearity) stage 2000 in FIG. 20. Namely, the nonlinearity comprises a decelerating power function offset by a constant. Let the relative-luminance array from the latest field be $Y_3(i,j)$, where 3 denotes the latest field. Then:

$$I_3(i, j) = [L_{max} Y_3(i, j)]^m + L_d^m. \qquad (23a)$$

$L_{max}$, the maximum luminance of the display, is set to 100 cd/m². The present function is calibrated with the contrast-sensitivity data at 8 c/deg. Thus, the adjustable parameters, m and $L_D$ are found to be 0.65 and 7.5 cd/m², respectively. Namely, the values of $L_d$ and m were chosen so as to match contrast detection data at luminance levels from 0.01 to 100 ft-L (van Nes and Bouman, 1967). In other words, equation (23a) allows one to calibrate against an absolute luminance, e.g., changing the maximum luminance of the display will affect the total luminance output. Another way to view equation (23a) is that it allows the perceptual metric generator to incorporate a luminance-dependent contrast-sensitivity function.

Alternatively, additional the luminance compression stages 2000 (shown in dashed boxes in FIG. 20) can be inserted at each pyramid level to allow the present perceptual metric generator to model the contrast sensitivity as a function of both luminance and spatial frequency. Otherwise, implementing one luminance compression stage 2000 with only two parameters will be insufficient to model other spatial frequencies.

More specifically, after pyramid decomposition of each luminance image, a nonlinearity is applied to each pyramid level k. Then, for pyramid level k, the compression nonlinearity is given by $$L_3(i,j;k)=[L_{max}Y_3(i,j;k)+L_a]^{m(k)}+L_D(k)^{m(k)}, \qquad (23b)$$

where again m(k) and $L_D(k)$ are chosen so as to match contrast detection at luminance levels from 0.01 to 100 ft-L (van Nes et al., 1967). The value $L_a$ is an offset for ambient screen illumination (set to 5 cd/M² based on screen measurements), and $L_{max}$ is the maximum luminance of the display (which generally is about 100 cd/m²).

The data to calibrate equation (23b) are tabulated below:

| $I_0$(td) | $f_s$(c/deg) | $C_m$ |
|---|---|---|
| 8500.00 | 0.500000 | 1.46780E-02 |
| 850.000 | 0.500000 | 1.46780E-02 |
| 85.0000 | 0.500000 | 1.46780E-02 |

-continued

| $I_0$(td) | $f_s$(c/deg) | $C_m$ |
|---|---|---|
| 8.50000 | 0.500000 | 1.46780E-02 |
| 0.85000 | 0.500000 | 1.46780E-02 |
| 0.08500 | 0.500000 | 1.67028E-02 |
| 8500.00 | 4.00000 | 2.61016E-03 |
| 850.000 | 4.00000 | 2.61016E-03 |
| 85.0000 | 4.00000 | 2.61016E-03 |
| 8.50000 | 4.00000 | 4.15551E-03 |
| 0.85000 | 4.00000 | 1.31409E-02 |
| 0.08500 | 4.00000 | 4.15551E-03 |
| 8500.00 | 8.00000 | 2.61016E-03 |
| 850.000 | 8.00000 | 2.61016E-03 |
| 85.0000 | 8.00000 | 2.61016E-03 |
| 8.50000 | 8.00000 | 6.71363E-03 |
| 0.85000 | 8.00000 | 2.12304E-02 |
| 0.08500 | 8.00000 | 6.71363E-02 |
| 8500.00 | 16.0000 | 3.83119E-03 |
| 850.000 | 16.0000 | 3.83119E-03 |
| 85.0000 | 16.0000 | 4.57394E-03 |
| 8.50000 | 16.0000 | 1.44641E-02 |
| 0.85000 | 16.0000 | 4.57394E-02 |
| 0.08500 | 16.0000 | 0.144641 |
| 8500.00 | 24.0000 | 6.81292E-03 |
| 850.000 | 24.0000 | 6.81292E-03 |
| 85.0000 | 24.0000 | 1.44641E-02 |
| 8.50000 | 24.0000 | 4.57394E-02 |
| 0.85000 | 24.0000 | 0.144641 |
| 0.08500 | 24.0000 | 0.457394 |
| 8500.00 | 32.0000 | 1.21153E-02 |
| 850.000 | 32.0000 | 1.21153E-02 |
| 85.0000 | 32.0000 | 2.97023E-02 |
| 8.50000 | 32.0000 | 9.39270E-02 |
| 0.85000 | 32.0000 | 0.297023 |
| 0.08500 | 32.0000 | 0.939270 |
| 8500.00 | 40.0000 | 3.16228E-02 |
| 850.000 | 40.0000 | 3.16228E-02 |
| 85.0000 | 40.0000 | 8.95277E-02 |
| 8.50000 | 40.0000 | 0.283111 |
| 0.85000 | 40.0000 | 0.89527 |
| 8500.00 | 48.0000 | 7.49894E-02 |
| 850.000 | 48.0000 | 8.13375E-02 |
| 85.0000 | 48.0000 | 0.257212 |
| 8.50000 | 48.0000 | 0.813374 |

Each contrast modulation $C_m$ in the above table is the experimental value that resulted in just-discriminable contrast of the sine wave of spatial frequency $f_s$ and retinal illuminance $I_0$. It should be noted that since a 2-mm artificial pupil is used in the calibration, the retinal illuminance values ($I_0$ in trolands) are multiplied by $\pi$ to retrieve the luminance values (L in cd/m$^2$). A good starting point for calibration is to use for all the m(k) and $L_D$(k) the default values for 8 c/deg sine-wave detection, for which the proper exponent m is 0.65, and the proper value of $L_D$ is 7.5 cd/m$^2$.

The luminance spatial and temporal filtering are identical for both perceptual metric generators of FIG. 6 and FIG. 20. However, luminance contrast computation for the perceptual metric generator of FIG. 20 is achieved without the square operation. The stages 640, 642 and 650 are replaced by stages 2040, 2042 and 2050 in FIG. 20.

More specifically, contrast-response images are computed as clipped versions of the absolute values of the quantities defined by the above equations (19) and (20). These quantities are computed as:

$$H_i = \max\left(0, \left|\frac{(SH_i - CH_i)}{w_i(CH_i + SH_i)}\right| - \varepsilon\right), \quad (23c)$$

$$V_i = \max\left(0, \left|\frac{(SV_i - CV_i)}{w_i(CV_i + SV_i)}\right| - \varepsilon\right)$$

$i = 0, 1, 2$, and $$T_3 = \max\left(0, \left|\frac{(E_3 - L_3)}{w_3(E_3 + L_3)}\right| - \varepsilon\right), \text{ where } \varepsilon = 0.75. \quad (23d)$$

The algebraic sign of each contrast ratio pixel value prior to the absolute-value operation must also be retained for later use.

Another significant difference between the perceptual metric generators of FIG. 6 and FIG. 20 is the implementation of the contrast energy masking. Unlike FIG. 6, the perceptual metric generators of FIG. 20 implements contrast energy masking 2060 in two separate stages: a cross masking stage and a self masking stage for each of the horizontal and vertical channels (See FIG. 20). Self masking reduces sensitivity in the presence of information within a current channel, whereas cross masking reduces sensitivity in the presence of information in a neighboring channel. In fact, the order of these two separate masking stages can be inverted. These contrast energy masking stages have the following forms:

$$T(y, D_i) = \frac{d_y z_i^\beta}{a z_i + c}, \text{ (self masking)} \quad (23e)$$

where, $$z_i = \frac{y}{[1 + m_f(D_i - y)]} \text{ for } i = 0, 1, 2, \text{ and}$$

$$z_3 = \frac{y}{(1 + D_3 + m_t y)} \text{(cross masking)}.$$

Here, y is the contrast to be masked: spatial, $H_i$ or $V_i$ (Equation (23c)) or temporal ($T_3$) (Equation (24d)). The quantity $D_i$ refers (pixel by pixel) to an image that depends on the pyramid level i to which y belongs. Quantities b, a, c, $m_f$, and $m_t$ were found by model calibration to be 1.4, 3/32, 5/32, 10/1024, and 50, respectively. $d_y$ is the algebraic sign of contrast y that is saved before taking the absolute value.

Computation of $D_i$ is similar to that of FIG. 6 as discussed above. Namely, fds1( ) denotes a 3×3 filtering followed by downsampling by one pyramid level, and usf1( ) denotes upsampling by one pyramid level followed by a 3×3 filtering. First, array $E_0$ is computed as:

$$E_0 = H_0 + V_0. \quad (23f)$$

Then, for i=1, 2, the arrays $E_i$ are computed recursively:

$$E_i = H_i + V_i + fds1(E_{i-1}), \text{ for } i=1,2. \quad (23g)$$

$$E_3 = fds1(E_2) \quad (23h)$$

The arrays $E_i$ are then combined with the temporal contrast image $T_3$ and images $T_i$ to give the contrast denominator arrays $D_i$, as follows:

$$D_3 = m_t T_3 + m_{fl} fds1(E_2), \quad (23i)$$

$$T_2 = usf1(D_3), T_i = usf1(T_{i+1}), \text{ for } i=1,0,$$

and $$D_i = E_i + T_i, \text{ for } i=0,1,2. \quad (23j)$$

Here, parameter $m_{fl}=3/64$, modulates the strength with which the temporal (flicker) luminance-channel is masked by all the spatial-luminance channels together; and parameter $m_t=50$, modulates the strength with which each of the spatial-luminance channels is masked by the temporal (flicker) luminance-channel.

Figure 7:
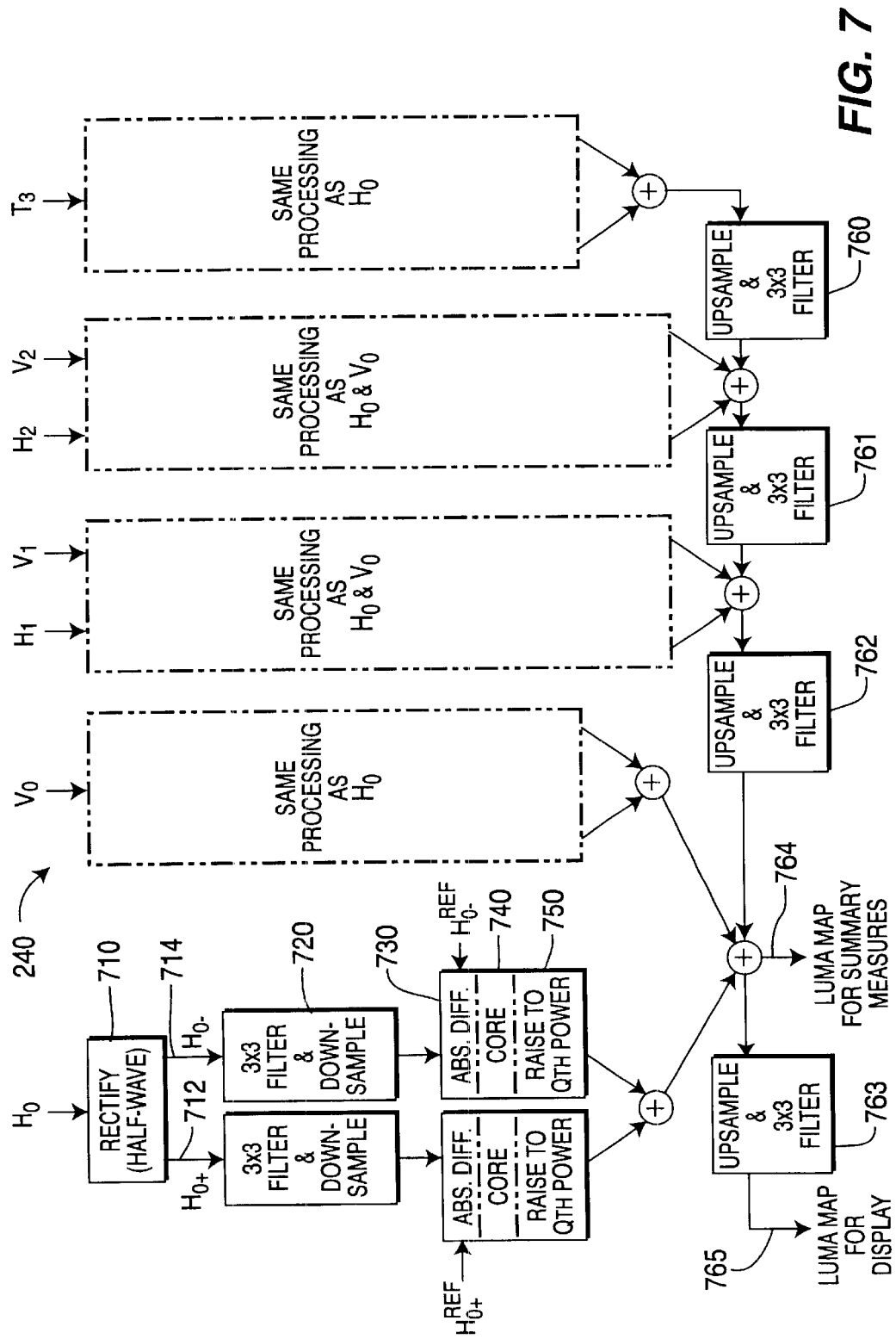
FIG. 7 illustrates a block diagram of the luminance metric generating section.

FIG. 7 illustrates a detailed block diagram of the luminance metric generating section 240. Again, FIG. 7 can be perceived as a flowchart of luminance metric generating steps or as a block diagram of the luminance metric generating section having a plurality of hardware components for performing such luminance metric generating steps, e.g., filters, various circuit components and/or application specific integrated circuits (ASIC). The construction described below applies to all the masked-contrast images generated in FIG. 6 above: the images in pyramids H and V (i.e., images $H_0$, $V_0$, $H_1$, $V_1$, $H_2$, and $V_2$), the image $T_3$ (having resolution at level 3), and the corresponding images derived from the reference sequence (denoted with superscript ref in FIG. 6 and FIG. 7).

The first four steps in the following process apply to the above images separately. In the following discussion X denotes any of these images derived from the test sequence, and by $X^{ref}$ the corresponding image derived from the reference sequence. Given this notation, the steps are as follows:

In step (or stage) 710, the image X is separated into two half-wave-rectified images, one for positive contrasts 712 and the other for negative contrasts 714. In the positive-contrast image (called $X_+$), the signs from the X contrast (separately stored as discussed above) are used to assign zeros to all pixels in $X_+$ that have negative contrasts. The opposite operation occurs in the negative-contrast image $X_-$.

In step (or stage) 720, for each image $X_+$ and $X_-$, a local pooling operation is performed by applying a 3×3 filter to convolve the image with a filter kernel of 0.25(1,2,1) horizontally and vertically.

Furthermore, in step 720, the resulting images are downsampled by a factor of 2 in each direction, to remove redundancy resulting from the pooling operation. The same processing as applied to X is performed for the corresponding reference image $X^{ref}$.

In step (or stage) 730, the absolute-difference images $|X_+-X_+^{ref}|$ and $|X_--X_-^{ref}|$ are computed pixel-by-pixel. The resulting images are JND maps.

In step (or stage) 740, a coring operation is performed on the JND maps. Namely, all values less than a threshold $t_c$ are set to zero. In the preferred embodiment, $t_c$ defaults to a value of 0.5.

In step (or stage) 750, the Q-th power of these images is determined. In the preferred embodiment, Q is a positive integer that defaults to a value of 2.

After this process has been completed for all pairs X, $X^{ref}$, summary measures are determined by repeatedly upsampling, filtering, and adding all the images up to the required level. This is accomplished as follows:

In step (or stage) 760, upsampling and filtering are applied to the level-3 images derived from $T_3$, $T_3^{ref}$ to derive a level-2 image.

In step (or stage) 761, upsampling and filtering are applied to the sum of the level-2 image from step 760 with the level-2 images derived from $H_2$, $H_2^{ref}$, $V_2$ and $V_2^{ref}$.

In step (or stage) 762, upsampling and filtering are applied to the sum of the level-2 image from step 761 with the level-2 images derived from $H_1$, $H_1^{ref}$, $V_1$ and $V_1^{ref}$.

In step (or stage) 763, upsampling and filtering are applied to the sum of the level-2 image from step 762 with the level-2 images derived from $H_0$, $H_0^{ref}$, $V_0$ and $V_0^{ref}$. The output on path 765 from step (or stage) 763 is a luminance JND map.

It should be noted that before the final processing step 763, the resulting image is half the resolution of the original image. Similarly, it should be noted that each pyramid-level index in this processing section refers to the pyramid level from which it was originally derived, which is twice the resolution of that associated with that level after filtering/downsampling.

It should also be noted that all images generated by the above repeated upsampling, filtering, and adding process are Q-th-power-JND images. The level-0 image is used in two fashions, where it is sent directly to summary processing on path 764, or upsampled and filtered in step 763 to the original image resolution for display purposes.

Figure 21:
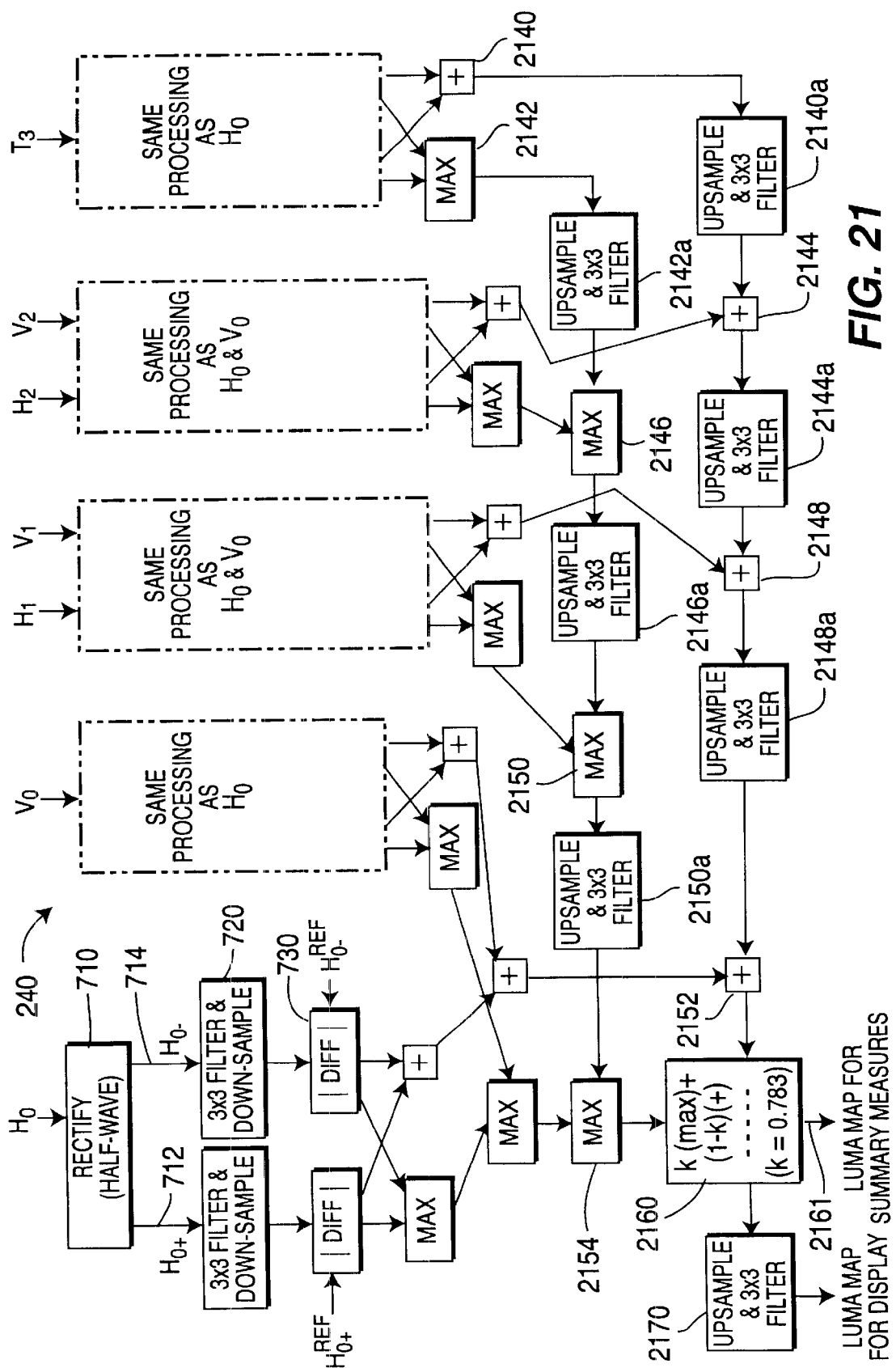
FIG. 21 illustrates a detailed block diagram of an alternate embodiment of the luminance metric generating section.

FIG. 21 illustrates a detailed block diagram of an alternate embodiment of the luminance metric generating section 240. Since the luminance metric generating of FIG. 21 contains many similar stages to that of the luminance metric generating of FIG. 7, a description is provided below only for the dissimilar stages.

More specifically, the "coring" stage 740 and "raise to a $Q^{th}$ power" stage 750 are replaced by a plurality of max and sum stages which maintain a running sum and a running maximum of the channel outputs. Since the process illustrated by FIG. 21 is the same as FIG. 7 up to stage 730, the process of FIG. 21 is now described starting from the point where the absolute-difference images $|X_+-X_+^{ref}|$ and $|X_--X_-^{ref}|$ have been determined.

Next, after the process has been completed for all pairs of X, $X^{ref}$, a running-sum image is initialized in stage 2140 to contain the sum of the level-3 images derived from $T_3$, $T_3^{ref}$. Similarly, a running-maximum image is initialized in stage 2142 to contain a running-maximum image as the point-by-point maximum of $|T_{3+}-T_{3+}^{ref}|$ and $|T_{3-}-T_{3-}^{ref}|$.

Next, the running-sum and running-maximum images are upsampled and filtered by stages 2140a and 2142a respectively, to comprise two level-2 images. The running-sum image is then updated by stage 2144 by adding to it the level-2 images derived from $H_2$, $H_2^{ref}$, $V_2$ and $V_2^{ref}$. Similarly, the running-maximum image is updated by stage 2146 by comparing it with the level-2 images derived from $H_2$, $H_2^{ref}$, $V_2$ and $V_2^{ref}$.

Next, the running-sum and running-maximum images are upsampled and filtered by stages 2144a and 2146a respectively, to comprise two level-1 images. The running-sum image is then updated by stage 2148 by adding to it the level-1 images derived from $H_1$, $H_1^{ref}$, $V_1$ and $V_1^{ref}$. Similarly, the running-maximum image is updated by stage 2150 by comparing it with the level-1 images derived from $H_1$, $H_1^{ref}$, $V_1$ and $V_1^{ref}$.

Next, the running-sum and running-maximum images are upsampled and filtered by stages 2148a and 2150a respectively, to comprise two level-0 images. The running-sum image is then updated by stage 2152 by adding to it the level-0 images derived from $H_0$, $H_0^{ref}$, $V_0$ and $V_0^{ref}$. Similarly, the running-maximum image is updated by stage 2154 by comparing it with the level-0 images derived from $H_0$, $H_0^{ref}$, $V_0$ and $V_0^{ref}$.

Finally, a point-by-point linear combination of the running-sum and running-max images is performed in stage 2160 to produce the luminance JND map in accordance with:

$$JND_L(i,j)=k_L \text{Running\_Max}(i,j)+(1-k_L) \text{Running\_Sum}(i,j). \quad (23k)$$

where $k_L=0.783$. The value for k is determined by approximating a Minkowski Q-norm. Given a value of Q and a number of images N to be brought together, the value $k_L=[N-N^{1/Q}]/[N-1]$ ensures that the approximate measure matches the Q-norm exactly when all the compared entries (at a pixel) are the same, and also when there is only one nonzero entry. In this case, N=14 (number of channels), and Q=2.

It should be noted that after this process, the resulting image is half the resolution of the original. Similarly, it should be noted that each pyramid-level index in this process refers to the pyramid level from which it was originally derived, which is twice the resolution of that associated with that level after filtering/downsampling.

Finally, it should be noted that all images generated by the repeated filtering/downsampling and adding/maxing process can be added with weights $k_L$ and $1-k_L$ to produce JND images. The level-0 image can be processed in two fashions, where the level-0 image is sent directly to JND summary processing via path 2161 or upsampled and filtered by stage 2170 to the original image resolution for display purposes.

In general, the luminance metric generating section of FIG. 21 is the preferred embodiment, whereas the luminance metric generating section of FIG. 7 is an alternate embodiment. One reason is that the max-sum method is computationally less expensive. Thus, if dynamic range in an integer implementation is desired, then the luminance metric generating section of FIG. 21 is preferred. Otherwise, if a floating point processor is employed, then the luminance metric generating section of FIG. 7 can also be used as well.

Half-height Luminance Processing

Since storage requirement and computational cycles are important processing issues, the present invention provides an alternate embodiment of a perceptual metric generator that is capable of processing half-height images, e.g., top and bottom fields of an interlace image. This embodiment reduces the amount of storage space necessary to store full-height images and at the same time, reduces the number of computational cycles.

Figure 22A:
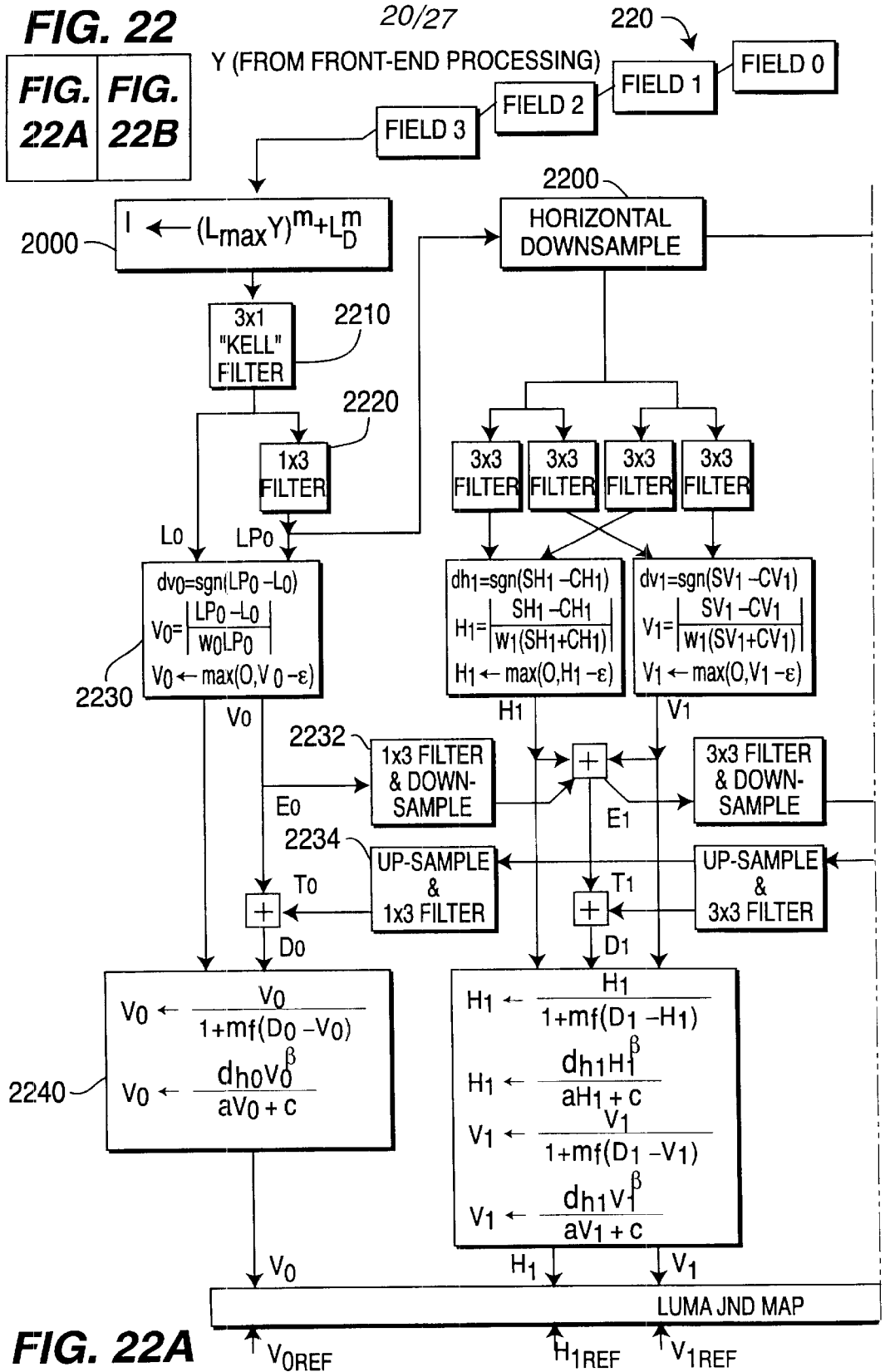
FIG. 22 illustrates a block diagram of a luminance processing section for processing half-height images.
Figure 22B:
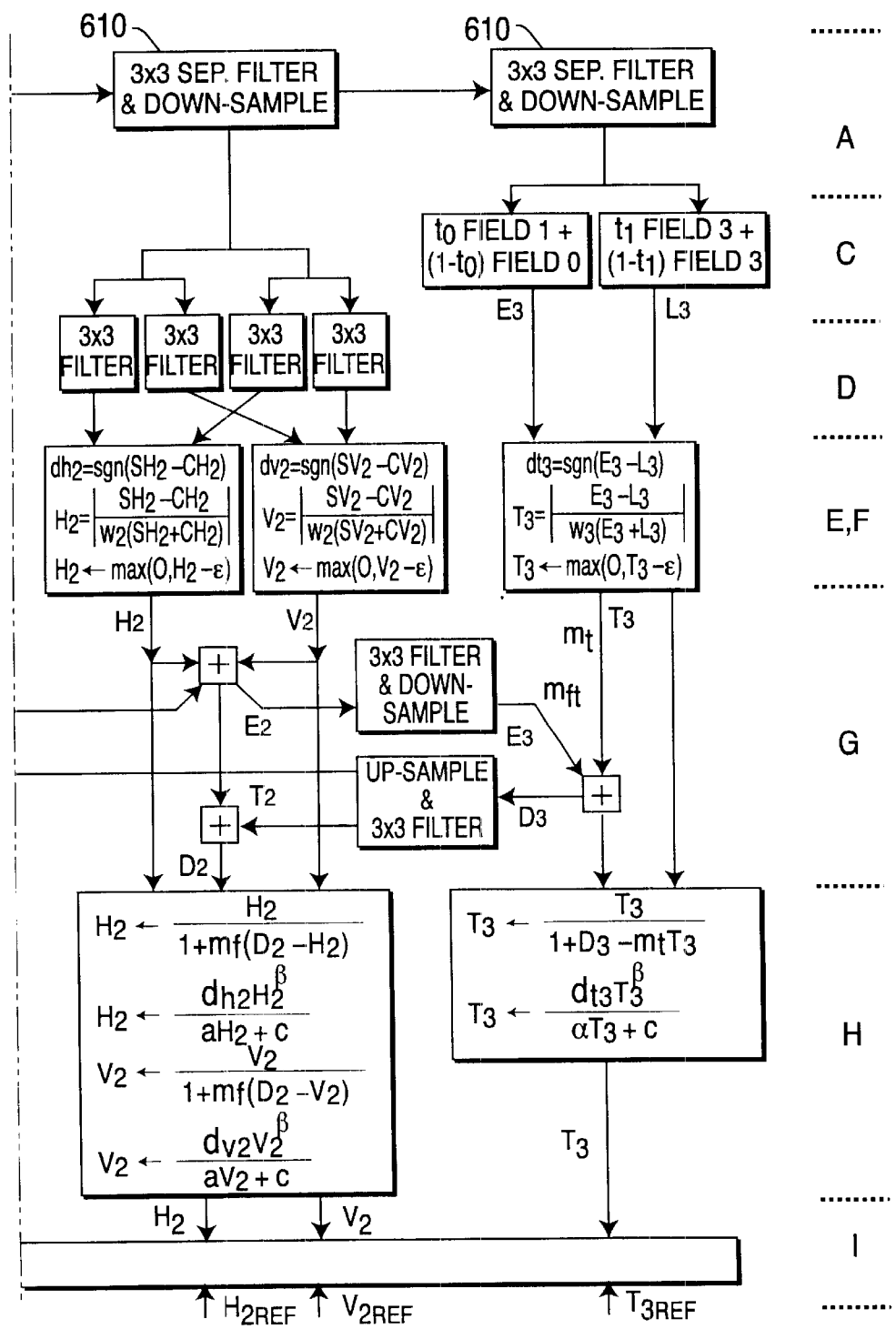
Figure 23:
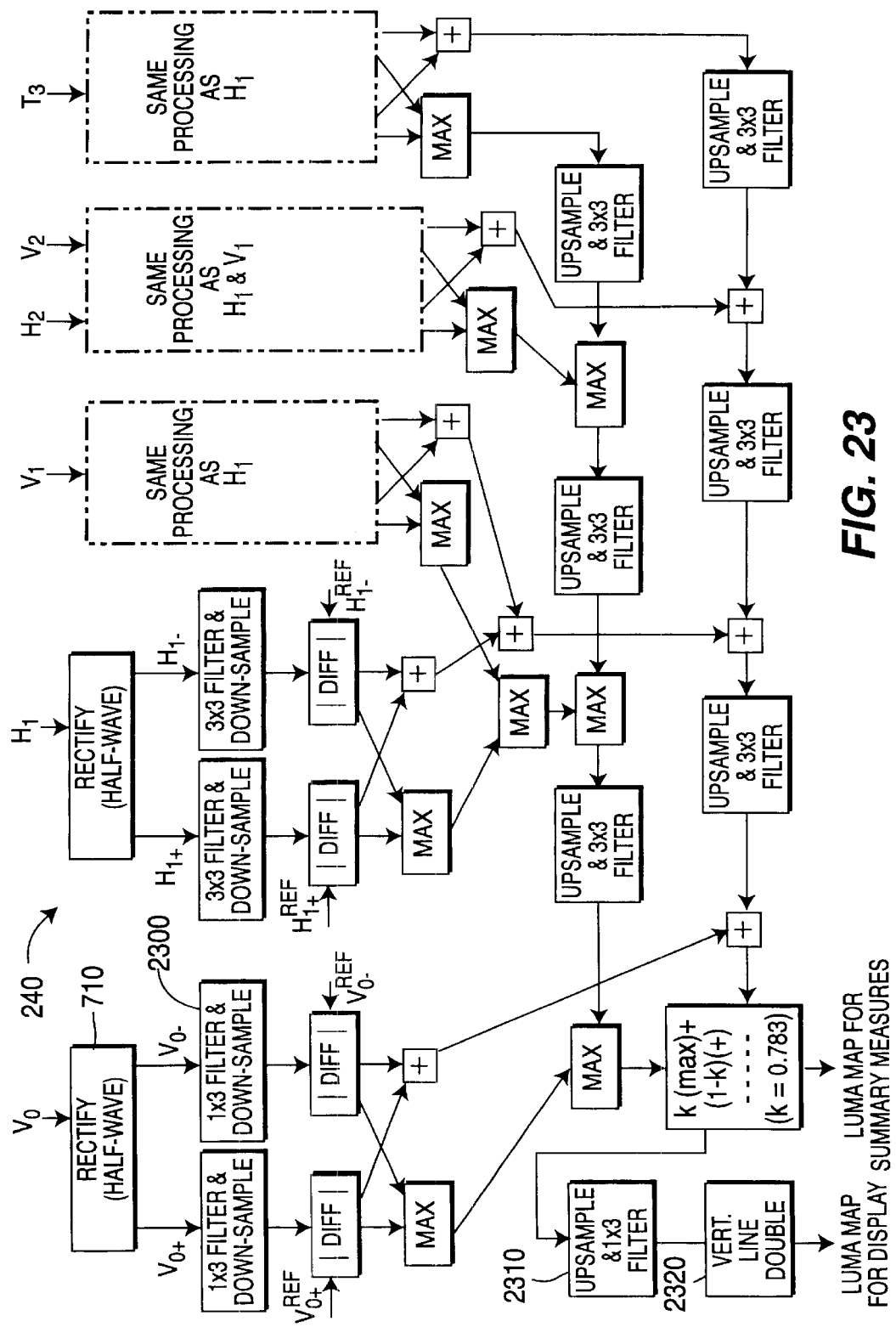
FIG. 23 illustrates a block diagram of a luminance metric generating section for processing half-height images.

If the half-height images are to be passed through directly without zero-filling to the true image height, then the above luminance processing section 220 must be modified to reflect that the inherent vertical resolution is only half the inherent horizontal resolution. FIG. 22 and FIG. 23 are block diagrams of luminance processing section and luminance metric generating section for processing half-height images.

Comparison between these diagrams (FIG. 22 and FIG. 23) and the corresponding diagrams for full-height interlace images (FIG. 20 and FIG. 21) reveal that many stages are identical. As such, the description below for FIG. 22 and FIG. 23 are limited to the differences between the two implementations.

First, the highest-resolution horizontal channel, $H_0$, is eliminated. Second, the highest resolution image is lowpass-filtered vertically (i.e., along columns) with a 3×1 "Kell" filter (a vertical filter) 2210 with weights (⅛, ¾, ⅛). This filter is an anti-aliasing filter in the vertical dimension for removing effect due to the fact that the lines are sampled in half the spatial frequency. Namely, it is a lowpass filter that blurs vertically. The resulting vertically filtered image, $L_0$, is then horizontally filtered with a 1×3 filter 2220 (kernel 0.25[1,2,1]). The resulting image, $LP_0$, is a horizontally low-passed version of $L_0$.

Next, $L_0$ and $LP_0$ are combined to produce a bandpass $(LP_0-L_0)$ divided by lowpass $(LP_0)$ oriented response analogous to the (S−C)/(S+C) responses of the other oriented channels.

In turn, image $LP_0$ (a half-height image of 720×240 pixels) is horizontally down-sampled in stage 2200 to a full height half-resolution image (360×240). At this point, the aspect ratio is such that processing on this image and throughout the remaining three pyramid levels can now continue as in the full-height options.

Next, down-sampling and up-sampling between the half-height images from Level 0 and the full height images of Level 1 is done with a 1×3 filtering/horizontal down-sampling by stage 2232 (labeled 1×3 filter & d.s.) and horizontal up-sampling (h.u.s.)/1×3 filtering by stage 2234, respectively. Horizontal down-sampling applies decimation by a factor of two in the horizontal dimension, i.e., throwing out every other column of the image. Horizontal up-sampling inserts a column of zeros between each two columns of the existing image. The filter kernel after upsampling is defined by 0.5 [1,2,1], for the reason noted above.

FIG. 23 illustrates a luminance metric generating section for processing half-height images. First, the highest-resolution horizontal channel, $H_0$, is not present. For the $V_0$ channel, a 1×3 filtering and horizontal down-sampling stage 2300 is provided to replace the 3×3 filtering and down-sampling stage as used in other channels.

Since the $H_0$ channel is missing, various parameters and the "pathway" of the running-maximum and running-sum are modified. For example, the value of N that determines k is changed to 12 from 14. The same value, k=0.783, is used for both full-height and half-height processing and is the average of the full-height and half-height constants computed from the equation given above.

Finally, as in the full-height embodiment, the luminance map for summary measures must be brought to full image resolution before it is displayed. Just prior to display, the final JND map is brought to full resolution in the horizontal direction, by upsampling and followed by 1×3filtering (kernel 0.5[1,2,1]) in stage 2310. In the vertical direction, line-doubling is performed in stage 2320.

It should be noted that, since each spatial filter has both horizontal and vertical spatial dependence, there are some differences in the half-height embodiment as compared to its full-height counterpart. However, it has been observed that the half-height embodiment will only exhibit slight perturbations in the correlations with subjective ratings. Thus, the non-interlace option can be employed as a viable and time-saving alternative to the interlace option.

Figure 8:
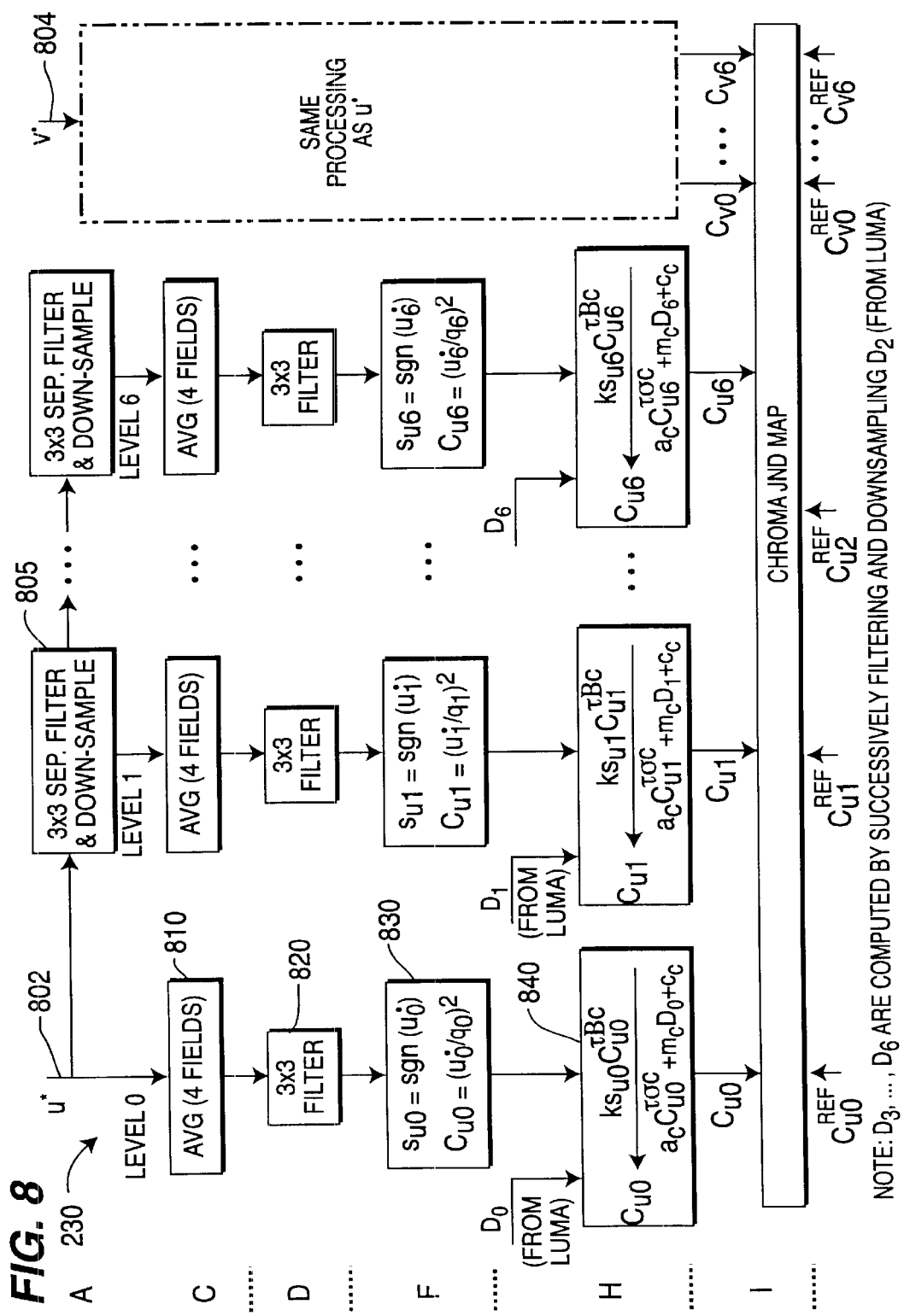
FIG. 8 illustrates a detailed block diagram of the chrominance processing section.

FIG. 8 illustrates a detailed block diagram of the chrominance processing section 230. Again, FIG. 8 can be perceived as a flowchart of chrominance processing steps or as a block diagram of the chrominance processing section having a plurality of hardware components for performing such chrominance processing steps, e.g., filters, various circuit components and/or application specific integrated circuits (ASIC). It should be noted that aside from the pyramid having levels 0, 1, 2, the chrominance processing section 230 computes pyramids with levels 0,1, . . . , 6 for both u* 802 and v* 804.

The spatial resolution of the chrominance channels (i.e., the resolution of the highest pyramid level) is chosen to be equal to that of luminance because the resolution is driven by the inter-pixel spacing, and not by the inter-receptor spacing. The inter-receptor spacing is 0.007 degrees of visual angle, and the inter-pixel spacing is 0.03 degrees— derived from a screen with 480 pixels in its height, viewed at four times its height. On the other hand, Morgan and Aiba (1985) found that red-green vernier acuity is reduced by a factor of three at isoluminance, a factor that is to be equated with three inter-receptor spacings for other kinds of acuity. Also, the resolution of the blue-yellow chromatic channel is limited by the fact that the visual system is tritanopic (blue blind) for lights subtending less than about 2' (or 0.033 deg.) of visual angle (see Wyszecki and Stiles, 1982, p. 571). The pixel resolution of 0.03 degrees of visual angle is very close to the largest of these values, such that it is appropriate to equate the pixel resolutions of luminance and chrominance channels.

The chrominance pyramid extends to level 6. This supports evidence that observers notice differences between large, spatially uniform fields of color. This effect can be addressed by using a spatially extended JND map. Quantitative evidence for contributions to the JND by such low spatial frequencies has been presented by Mullen (1985).

Returning to FIG. 8, similar to luminance processing, spatial decomposition at seven resolution levels is accomplished through pyramid decomposition, which smears and downsamples the image by a factor of 2 at each successively coarser level of resolution. The original, full-resolution image is called the zeroth level (level 0) of the pyramid. Subsequent levels, at lower resolutions, are obtained by an operation called REDUCE. Namely, a three-tap low-pass filter 805 with weights (1,2,1)/4 is applied to level 0 sequentially in each direction of the image to generate a blurred image. The resulting image is then subsampled by a factor of 2 (every other pixel is removed) to create the next level, level 1.

In step (or stage) 810, a four-field average is performed on the u* images for each resolution level, and also on the v* images, with tap weights (0.25, 0.25, 0.25, 0.25) ), i.e., let:

$$u_i \leftarrow \frac{1}{4}\sum_{j=0}^{3} u_i^j, v_i \leftarrow \frac{1}{4}\sum_{j=0}^{3} v_i^j, \tag{231}$$

where j is the field index. This averaging operation reflects the inherent low-pass temporal filtering of the color channels, and replaces the "early-late" processing of the temporal luminance channel.

In step (or stage) 820, a non-oriented Laplacian spatial filter 820 is applied to each of the u* and v* images. The filter has the following 3×3 kernel:

$$\frac{1}{4}\begin{bmatrix} 1 & 2 & 1 \\ 2 & -12 & 2 \\ 1 & 2 & 1 \end{bmatrix}, \tag{24}$$

chosen to have zero total weight and to respond with a maximum strength of 1 to any straight edge between two uniform areas with unit value difference between them. (The maximum response is attained by a horizontal or vertical edge.) This renders the u* and v* images into maps of chrominance difference, evaluated in uniform-color-space (JND) units.

In step (or stage) 830, contrast computation is performed directly on the u* and v* images resulting from step 820 as the chrominance contrast pyramids, to be interpreted analogously with the Michelson contrasts computed in the Luminance processing section. In an analogy with luminance contrasts, chrominance contrasts are computed via intra-image comparisons effected by Laplacian pyramids. Just as the Laplacian difference divided by a spatial average represents the Michelson contrast, which via Weber's law assumes a constant value at the 1-JND level (detection threshold), the Laplacian pyramid operating on u* and v* has a 1-JND interpretation. Similarly, this interpretation is modified in the course of calibration. The modification reflects the interaction of all parts of the present invention, and the fact that stimuli eliciting the 1-JND response are not simple in terms of the perceptual metric generator.

Furthermore in step (or stage) 830, the contrast pyramid images level-by-level, is divided by seven constants qi (i=0, . . . ,6), whose values are determined by calibration to be 1000, 125, 40, 12.5, 10, 10, 10, respectively. These constants are analogous to the quantities $w_i$ (i=0, . . . ,3) in the luminance processing section.

In step (or stage) 840, the squares of all the u* and v* contrasts are determined, but the algebraic signs are again preserved for later use. The sign preservation prevents the possibility of recording 0 JNDs between two different images because of the ambiguity of the sign loss in the squaring operation. The results are two chrominance square-contrast pyramids $C_u$, $C_v$.

In step (or stage) 850, contrast energy masking is performed. First, the denominator pyramid levels $D_m$ (m=0, 1, 2) are adopted directly from the Luminance processing section 220, without further alteration. However, for levels 3, . . . , 6, sequential filtering and downsampling of $D_2$ is performed using the same method as in the luminance processing, but without adding new terms. These $D_m$ values are used by in step 840 in the spirit of perturbation theory, in the sense that, since luminance is a more important determiner of JNDs, the effect of luminance on chrominance are presumed to be more important than the effect of chrominance on luminance. Namely, since luminance effects are expected to predominate over chrominance effects in most cases, the chrominance processing section can be viewed as a first-order perturbation on the luminance processing section. Therefore, the effects of luminance (the $D_m$) are modeled as masking chrominance, but not the reverse.

The masked chrominance contrast pyramid is generated by using the luminance-channel denominator pyramid $D_m$ and the same functional form that is used for the luminance transducer to mask the chrominance square-contrast pyramids, for all pyramid levels m=0, 1, 2:

$$C_{um} \leftarrow \frac{ks_{um}C_{um}^{\beta_c}}{a_c C_{um}^{\sigma_c} + m_c D_m + c_c}, \tag{25}$$

$$C_{vm} \leftarrow \frac{ks_{vm}C_{vm}^{\beta_c}}{a_c C_{vm}^{\sigma_c} + m_c D_m + c_c}. \tag{26}$$

It should be noted that the algebraic sign removed in step 830 is reattached through the factors $s_{um}$ and $s_{vm}$. This operation produces masked contrast pyramids for u* and v*. Calibration has determined the values $a_c$=0.15, $c_c$=0.3, k=0.7, $\sigma_c$=1.0, and $\beta_c$=1.17. Furthermore, setting $m_c$ to a value of 1 has produced sufficient performance in all calibrations and predictions.

Figure 24:
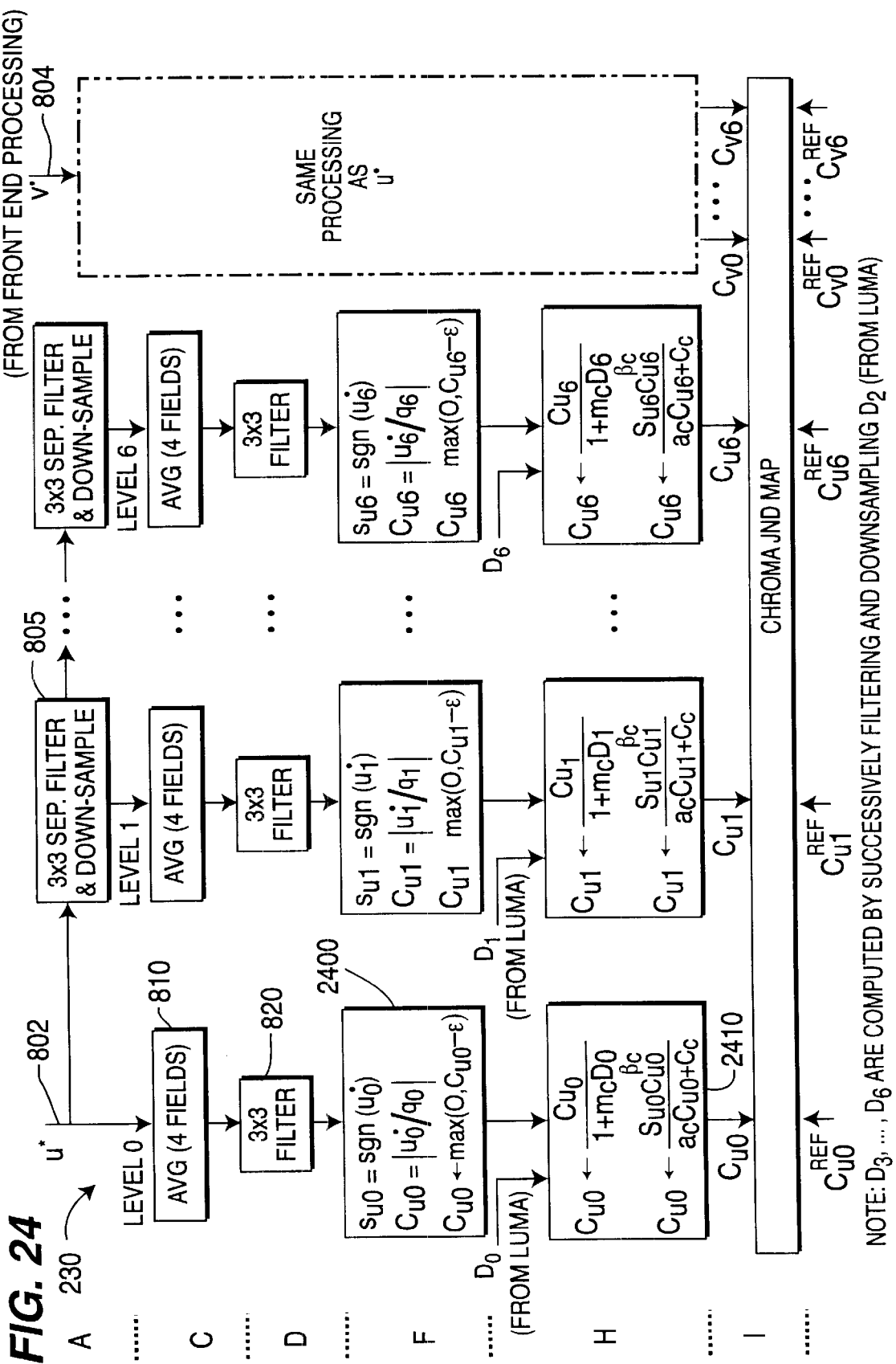
FIG. 24 illustrates a detailed block diagram of an alternate embodiment of the chrominance processing section.

FIG. 24 illustrates a detailed block diagram of an alternate embodiment of the chrominance processing section 230. Since the chrominance processing section of FIG. 24 contains many similar stages to that of the chrominance processing section of FIG. 8, a description is provided below only for the dissimilar stages.

The chrominance spatial and temporal filtering are identical for both perceptual metric generators of FIG. 8 and FIG. 24. However, chrominance contrast computation for the perceptual metric generator of FIG. 24 is achieved without the square operation. Namely, the stage 830 is replaced by stage 2400 in FIG. 24.

More specifically, in step (or stage) 830, the contrast pyramid images level-by-level, is divided by seven constants qi (i=0, . . . ,6), whose values are determined by calibration to be 384, 60, 24, 6, 4, 3, 3, respectively. It should be noted that these constants are different from those of FIG. 8. These constants are analogous to the quantities $w_i$ (i=0, ..., 3) in the luminance processing section.

Next, the clipped absolute values of all the $u_l$ and $v^*$ contrasts [where clip(x)=max(0, x−e)] are computed, where e=0.75. Again the algebraic signs are preserved and re-attached for later use. This prevents the possibility of recording 0 JNDs between two different images because of the ambiguity of the sign loss in the absolute-value operation. The results are two chrominance contrast pyramids $C_u$, $C_v$.

Another significant difference between the perceptual metric generators of FIG. 8 and FIG. 24 is the implementation of the contrast energy masking. Unlike FIG. 8, the perceptual metric generators of FIG. 24 implements contrast energy masking 2410 in two separate stages: a cross masking stage and a self masking stage for each of the horizontal and vertical channels (See FIG. 24). Self masking reduces sensitivity in the presence of information within a current channel, whereas cross masking reduces sensitivity in the presence of information in a neighboring channel. In fact, the order of these two separate masking stages can be inverted.

Use the luminance-channel denominator pyramid $D_m$ and the same functional form that is used for the luminance transducer to mask the chrominance contrast pyramids, for all pyramid levels m=0, ..., 6:

$$C_{um} \leftarrow \frac{s_{um} z_{um}^{\beta_c}}{a_c C_{um} + c_c}, \quad (26a)$$

$$\text{where } z_{um} = \frac{C_{um}}{(1 + m_c D_i)},$$

and $D_i$ is a filtered and downsampled version of $D_2$ when i>2. Similarly, $$C_{vm} \leftarrow \frac{s_{vm} z_{vm}^{\beta_c}}{a_c C_{vm} + c_c}. \quad (26b)$$

$$\text{where } z_{vm} = \frac{C_{vm}}{(1 + m_c D_i)}.$$

Note that the algebraic sign removed above has been reattached through the factors $s_{um}$ and $s_{vm}$. This produces masked contrast pyramids for $u_i$ and $v_i$. Calibration determines the values $a_c=\frac{1}{2}$, $c_c=\frac{1}{2}$, $\beta_c=1.4$, and $m_c=m_f=10/1024$. In general, the chrominance processing section of FIG. 24 is the preferred embodiment, whereas the chrominance processing section of FIG. 8 is an alternate embodiment.

Figure 9:
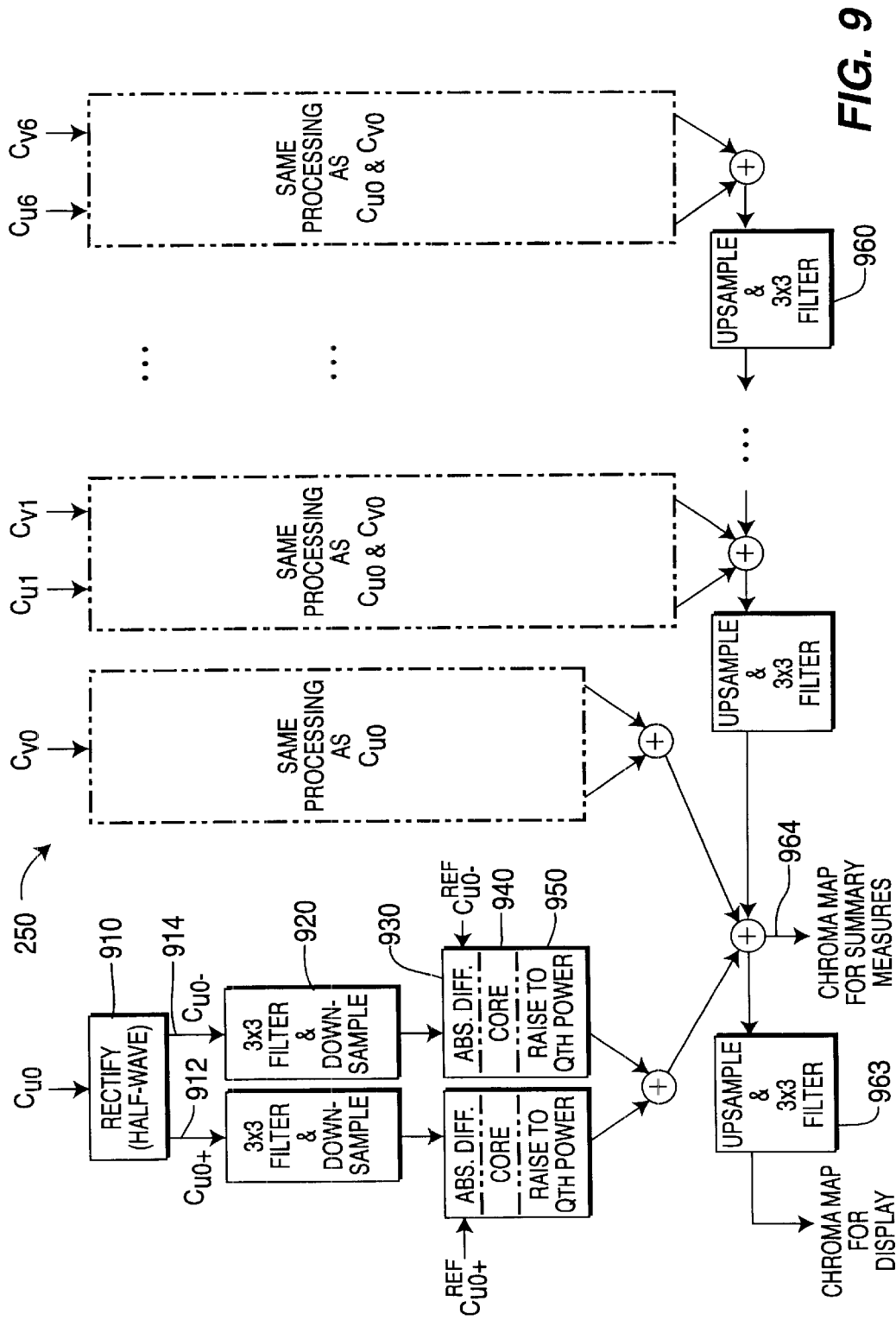
FIG. 9 illustrates a block diagram of the chrominance metric generating section.

FIG. 9 illustrates a block diagram of the chrominance metric generating section 250. Again, FIG. 9 can be perceived as a flowchart of 1 chrominance metric generating steps or as a block diagram of the chrominance metric generating section having a plurality of hardware components for performing such luminance metric generating steps, e.g., filters, various circuit components and/or application specific integrated circuits (ASIC). The construction of the chrominance JND map is analogous with the construction of the luminance JND map as discussed above with regard to FIG. 7. In the chrominance case, the process applies to all the masked-contrast chrominance images generated by stage 840 above: i.e., images $C_{u0}$, $C_{v0}$, ..., $C_{u6}$, $C_{v6}$, and the corresponding images derived from the reference sequence (denoted with superscript $^{ref}$ in FIG. 8 and FIG. 9).

The first four steps in the following process apply to the above images separately. In the following discussion X denotes any of these images derived from the test sequence, and by $X^{ref}$ the corresponding image derived from the reference sequence. Given this notation, the steps are as follows:

In step (or stage) 910, the image X is separated into two half-wave-rectified images, one for positive contrasts 912 and the other for negative contrasts 914. In the positive-contrast image (called $X_+$), the signs from the X contrast (separately stored as discussed above) are used to assign zeros to all pixels in $X_+$ that have negative contrasts. The opposite operation occurs in the negative-contrast image $X_-$.

In step (or stage) 920, for each image $X_+$ and $X_-$, a local pooling operation is performed by applying a 3×3 filter to convolve the image with a filter kernel of 0.5(1,2,1) horizontally and vertically.

Furthermore, in step 920, the resulting images are downsampled by a factor of 2 in each direction, to remove redundancy resulting from the pooling operation. The same processing as applied to X is performed for the corresponding reference image $X^{ref}$.

In step (or stage) 930, the absolute-difference images $|X_+-X_+^{ref}|$ and $|X_--X_-^{ref}|$ are computed pixel-by-pixel. The resulting images are JND maps.

In step (or stage) 940, a coring operation is performed on the JND maps. Namely, all values less than a threshold $t_c$ are set to zero. In the preferred embodiment, $t_c$ defaults to a value of 0.5.

In step (or stage) 950, the Q-th power of these images is determined. In the preferred embodiment, Q is a positive integer that defaults to a value of 2.

After this process has been completed for all pairs X, $X^{ref}$, summary measures are determined by repeatedly upsampling, filtering, and adding all the images up to the required level. This is accomplished as follows:

In step (or stage) 960, upsampling and filtering are applied to the level-6 images derived from $C_{u6}$, $C_{u6}^{ref}$, $C_{v6}$, $C_{v6}^{ref}$ to derive a level-5 image.

In the next step (or stage), upsampling and filtering are applied to the sum of the level-5 image from step 960 with the level-5 images derived from $C_{u5}$, $C_{u5}^{ref}$, $C_{v5}$, $C_{v5}^{ref}$. This process is continued through level 0.

Similar to the luminance processing, it should be noted that before the final processing step 963, the resulting image is half the resolution of the original image. Similarly, it should be noted that each pyramid-level index in this processing section refers to the pyramid level from which it was originally derived, which is twice the resolution of that associated with that level after filtering/downsampling.

It should also be noted that all images generated by the above repeated upsampling, filtering, and adding process are Q-th-power-JND images. The level-0 image is used in two fashions, where it is sent directly to summary processing on path 964, or upsampled and filtered in step 963 to the original image resolution for display purposes.

As previously discussed, the luminance and chrominance JND maps passed to the output summary step are Q-th-power-JND images, and are represented at half the resolution of the original image. This exploits the redundancy inherent in having performed pooling at each masked-contrast stage. Each of these half-resolution images can be reduced to a single JND performance measure by averaging all the pixels through a Minkowski addition:

$$JND_{luma} = \left[ N_P^{-1} \sum_{i,j} L_{JND}(i,j)^Q \right]^{\frac{1}{Q}}, \quad (27)$$

$$JND_{chroma} = \left[ N_P^{-1} \sum_{i,j} C_{JND}(i,j)^Q \right]^{\frac{1}{Q}}. \quad (28)$$

$N_P$ is the number of pixels in each JND map, $JND_{luminance}$ and $JND_{chrominance}$ are the summary measures, and $L_{JND}^Q$ and $C_{JND}^Q$ are the half-resolution maps from luminance and chrominance map construction, respectively. In each case, the sum is over all the pixels in the image. As stated previously, the value of the Minkowski exponent Q defaults to 2.

From the luminance and chrominance summary measures, a single performance measure for a field is computed by Minkowski addition, i.e., $$JND_{field} = \left[ JND_{luma}^Q + JND_{chroma}^Q \right]^{\frac{1}{Q}}, \quad (29)$$

where Q again defaults to 2.

A single performance measure, $JND_{field}$, for N fields of a video sequence by adding the JND values for each field, again in the sense of Minkowski. Q defaults to 2.

$$JND = \left[ \frac{1}{N} \sum_m JND_{field}^Q(m) \right]^{\frac{1}{Q}}. \quad (30)$$

Figure 25:
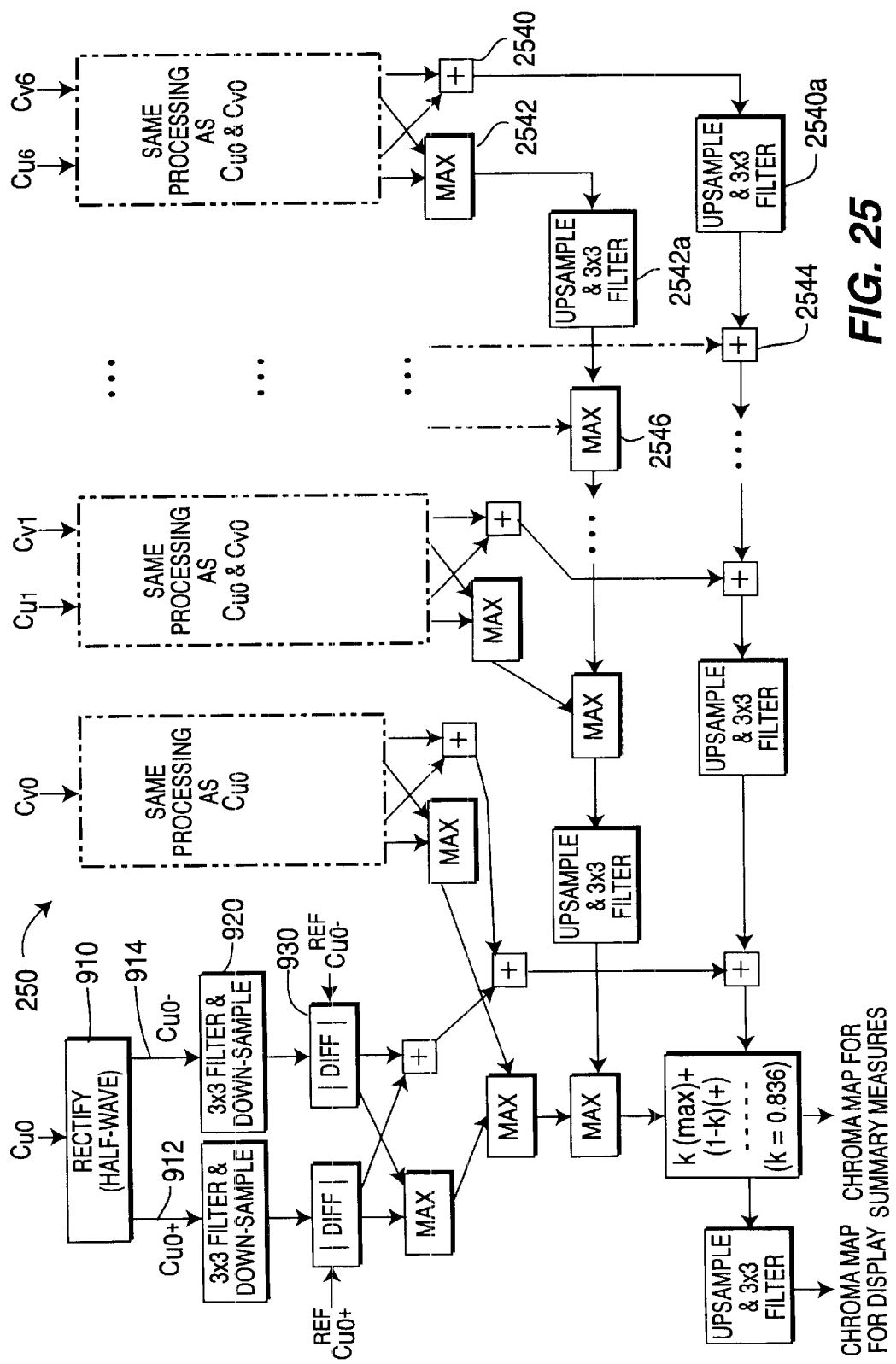
FIG. 25 illustrates a detailed block diagram of an alternate embodiment of the chrominance metric generating section.

FIG. 25 illustrates a detailed block diagram of an alternate embodiment of the chrominance metric generating section 250. Since the 1 chrominance metric generating of FIG. 25 contains many similar stages to that of the chrominance metric generating of FIG. 9, a description is provided below only for the dissimilar stages.

More specifically, the "coring" stage 940 and "raise to a $Q^{th}$ power" stage 950 are replaced by a plurality of max and sum stages which maintain a running sum and a running maximum of the channel outputs. Since the process illustrated by FIG. 25 is the same as FIG. 9 up to stage 930, the process of FIG. 25 is now described starting from the point where the absolute-difference images $|X_+ - X_+^{ref}|$ and $|X_- - X_-^{ref}|$ have been determined.

Next, after the process has been completed for all pairs of X, $X^{ref}$, a running-sum image is initialized in stage 2540 to contain the sum of the level-6 images derived from $C_{u6}$, $C_{u6}^{ref}$, $C_{v6}$, and $C_{v6}^{ref}$. Similarly, a running-maximum image is initialized in stage 2542 as the point-by-point maximum of these same images.

Next, the running-sum and running-maximum images are upsampled and filtered by stages 2540a and 2542a respectively, to comprise two level-5 images. The running-sum image is then updated by stage 2544 by adding to it the level-5 images derived from $C_{u5}$, $C_{u5}^{ref}$, $C_{v5}$, and $C_{v5}^{ref}$. Similarly, the running-maximum image is updated by stage 2546 by comparing it with the level-5 images derived from $C_{u5}$, $C_{u5}^{ref}$, $C_{v5}$, and $C_{v5}^{ref}$. This process is repeated down to the pyramid-level 0.

Finally, having performed the above steps, a point-by-point linear combination of the running-sum and running-max images is performed to produce the chrominance JND map:

$$JND_c(i,j) = k_c \text{Running\_Max}(i,j) + (1-k_c) \text{ Running\_Sum}(i,j), \quad (30a)$$

where $k_C = 0.836$. The value for $k_c$ is determined by approximating a Minkowski Q-norm. Given a value of Q and a number of images N to be brought together, the value $k_c = [N - N^{1/Q}]/[N-1]$ ensures that the approximate measure matches the Q-norm exactly when all the compared entries (at a pixel) are the same, and also when there is only one nonzero entry. In this case, N=28 (number of channels), and Q=2.

As in luminance processing, after these operations the resulting image is half the resolution of the original. It should be noted that each pyramid-level index in this process refers to the pyramid level from which it was originally derived, which is twice the resolution of that associated with that level after filtering/downsampling.

It should also be noted that all images generated by the repeated upsampling/filtering and adding/maxing process above can be added with weights $k_C$ and $1-k_C$ to produce JND images. The level-0 image is used in two fashions, where it is sent directly to summary processing or upsampled to the original image resolution and filtered for display purposes.

In general, the chrominance metric generating section of FIG. 25 is the preferred embodiment, whereas the luminance metric generating section of FIG. 9 is an alternate embodiment. One reason is that the max-sum method is computationally less expensive. Thus, if dynamic range in an integer implementation is desired, then the chrominance metric generating section of FIG. 25 is preferred. Otherwise, if a floating point processor is employed, then the luminance metric generating section of FIG. 9 can also be used as well.

Half-height Chrominance Processing

Figure 26:
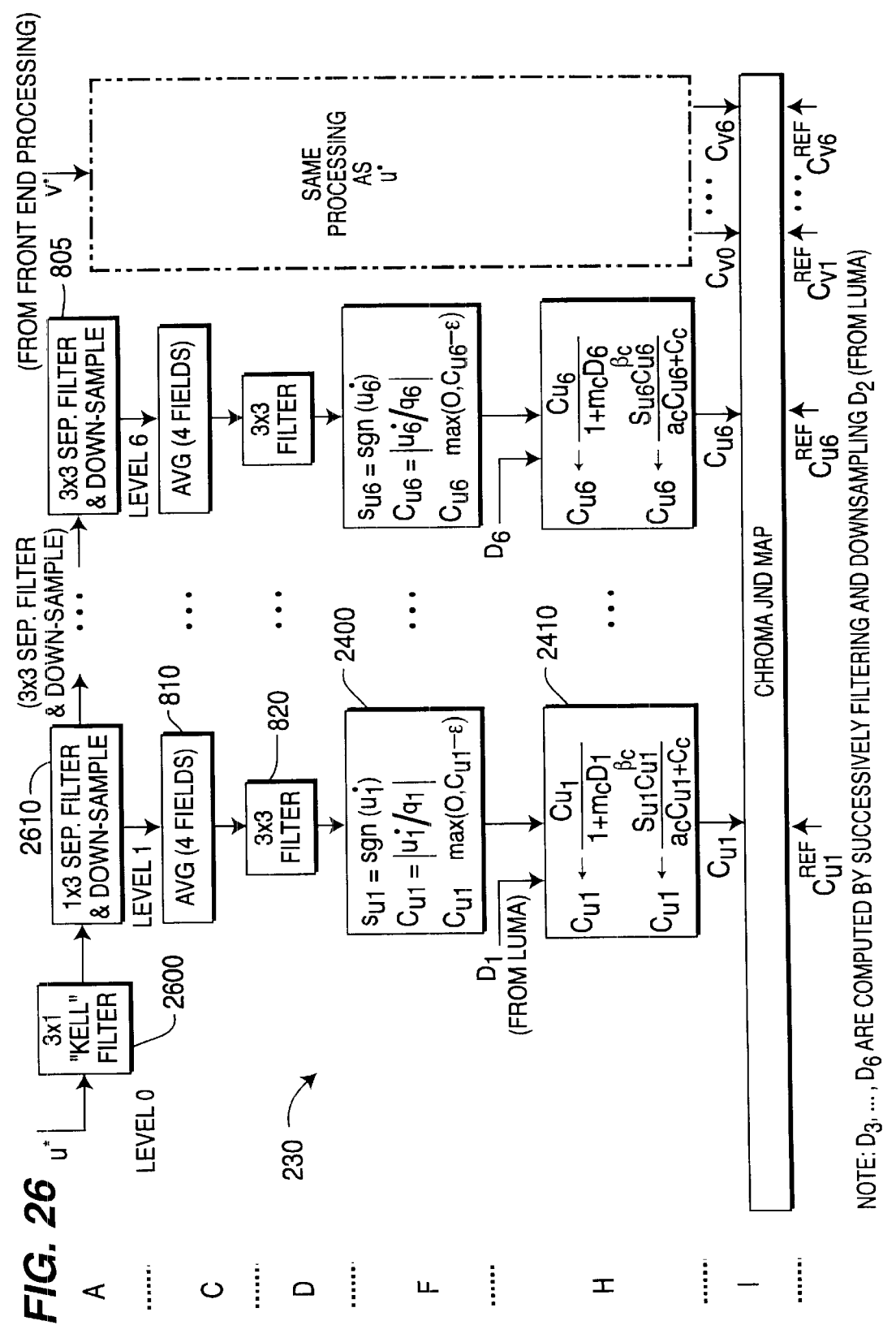
Figure 27:
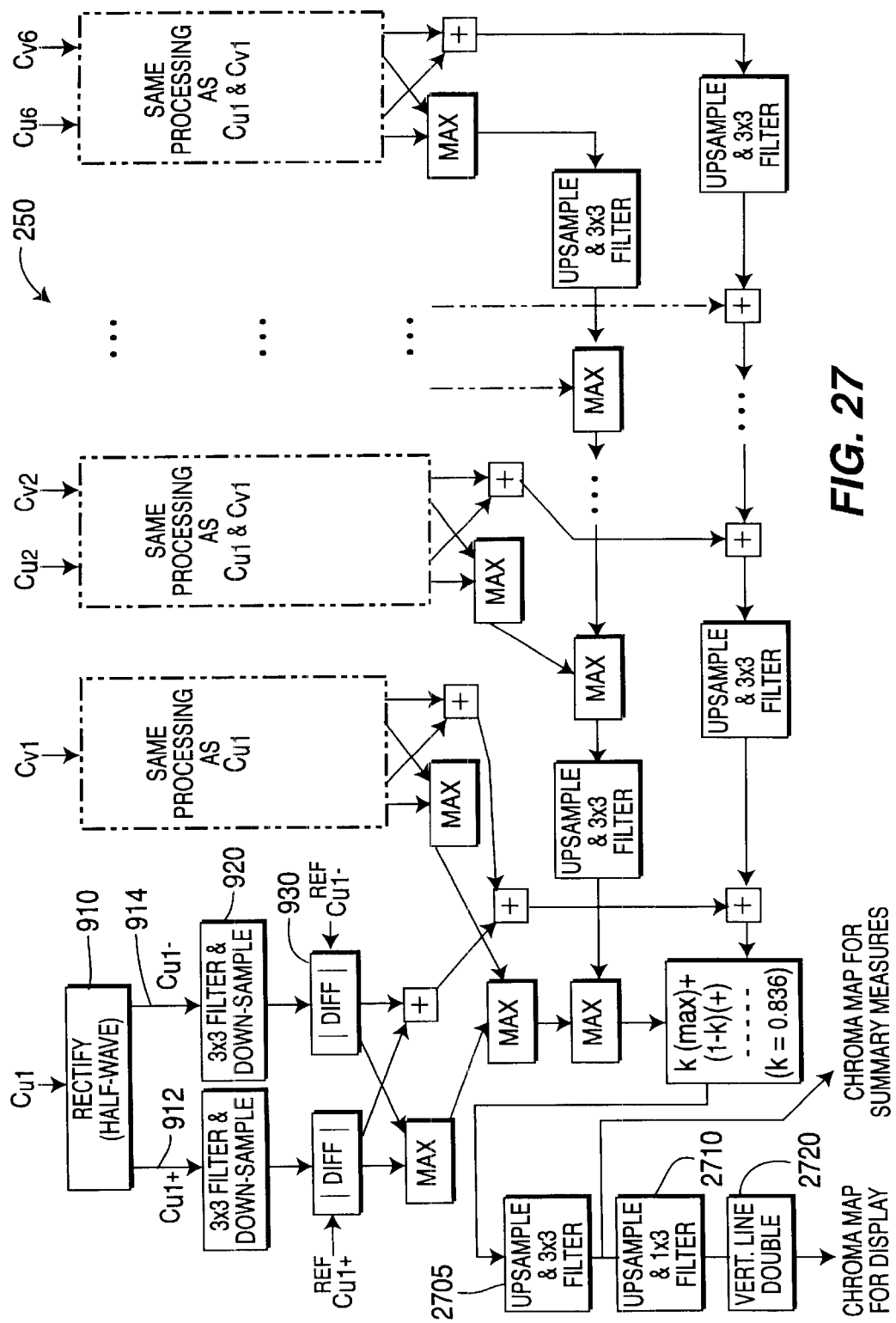
FIG. 27 illustrates a block diagram of a chrominance metric generating section for processing half-height images.

If the half-height images are to be passed through directly without zero-filling to the true image height, then the above chrominance processing section 230 must be modified to reflect that the inherent vertical resolution is only half the inherent horizontal resolution. FIG. 26 and FIG. 27 are block diagrams of chrominance processing section and chrominance metric generating section for processing half-height images.

Comparison between these diagrams (FIG. 26 and FIG. 27) and the corresponding diagrams for full-height interlace (FIG. 24 and FIG. 25) reveal that many stages are identical. As such, the description below for FIG. 26 and FIG. 27 are limited to the differences between the two implementations.

First, the highest-resolution chrominance channels, $u_0^*$ and $v_0^*$, are eliminated. Since chrominance sensitivity is generally low at high spatial frequencies, the loss of these channels is not significant.

Second, to produce the next-highest resolution chrominance images $u_1^*$ and $v_1^*$, a lowpass "Kell" filter 2600 with a kernel of weights (⅛, ¾, ⅛) is applied vertically (i.e., along columns). This operation corresponds to the joint filtering of the assumed de-interlace filter, together with the filtering performed by the vertical components of the 3×3 filters of the full-height embodiment. The resulting vertically filtered images are then horizontally filtered with a 1×3 filter 2610 with a kernel of weights 0.25 (1, 2, 1). This filtering of u* and v* images makes the half-height images isotropic in resolution. The resolution is that of full-height pyramid-level 1.

FIG. 27 illustrates a chrominance metric generating section for processing half-height images. First, the 0-level is not present. As such, various parameters and the "pathway"

of the running-maximum and running-sum are modified. For example, the value of N that determines k is changed to 24 from 28. The same value, k=0.836, is used for both full- and half-height processing and is the average of full- and half-height constants computed from the formula given above.

Since the maximum and sum streams are fully accumulated at pyramid level 1 in the chrominance embodiment, the chrominance JND map for the summary measures is only half the size (both horizontally and vertically) as the fully accumulated luminance map. Thus, prior to combining the chrominance and luminance maps to produce the total-JND map, the chrominance map must first be brought to the same resolution as the luminance map. To achieve this goal, an upsample followed by 3×3 filter 2705 is performed to produce the chrominance JND map for summary measures.

As in the full-height embodiment, the chrominance map for summary measures must be brought to full image resolution before it is displayed. For consistency with the analogous operation in the luminance map, the chrominance map is brought to full resolution in the horizontal direction, by upsampling and followed by 1×3 filtering (kernel 0.5 [1,2,1]) in stage 2710. In the vertical direction, line-doubling is performed in stage 2720.

JND Output Summaries

As discussed above, the luminance and chrominance JND maps passed to the output summary step are JND images, and are represented at half the resolution of the original image. This exploits the redundancy inherent in having performed pooling at each masked-contrast stage.

Next, the luminance and chrominance JND maps $JND_L$ and $JND_C$ are combined into a total-field JND map, $JND_T$. The combination is accomplished with an approximate Minkowski addition, in analogy with the combination of channels to produce the maps $JND_L$ and $JND_C$:

$$JND_T(i,j)=k_T\max[JND_L(i,j), JND_C(i,j)]+(1-k_T)[JND_L(i,j)+JND_C(i,j)] \quad (30b)$$

where $k_T$=0.586. The selection for $k_T$ is determined by approximating a Minkowski Q-norm. In this case, there are two (2) terms in the max/sum, and Q=2.

In turn, each of the half-resolution JND images (three for each field: luma, chrominance, and total-field ) is reduced to a single JND performance measure called a JAM by the following histogram process:

First, a histogram of JND values (with bin-size ⅛ JND) is created, but values less than a threshold level $t_c$=½ are not included. All values greater than 100 JND's are recorded as 100 JND's.

Second, the JAM is adopted as the 90$^{th}$ percentile of the JND scores from the above abbreviated histogram. In this fashion, three values $JAM_{luma}$, $JAM_{chroma}$, and $JAM_{total}$ are computed for the summary measures corresponding respectively to $JND_L$, $JND_C$, and $JND_T$. This is accomplished for each field in a video sequence.

From N single-field $JAM_{field}$ values in a video sequence, a single performance measure $JAM_N$ is computed in one of two fashions, depending on the length of the sequence.

For N>10

$JAM_N$ equals the 90th percentile of the histogram of $JAM_{field}$ values.

For N≤10

$JAM_N$ is determined by the following process that provides a degree of continuity as N increases. More specifically, a histogram of $JAM_{field}$ values is initially created. Second, this histogram is approximated by a "faux histogram" that has the same minimum, maximum, and mean as the true histogram, but consists of a constant with a single-bin peak at either the minimum or maximum value.

Third, the N-field JAM is adopted as the 90$^{th}$ percentile of the $JAM_{field}$ scores from the above faux histogram.

It should be noted that subjective rating data are noisy and unreliable for short video sequences (e.g., less than ½ second, or 15 frames). Thus, JAM estimates may correlate poorly with subjective ratings for short sequences.

Image Border Processing

In the present perceptual metric generator, it has been observed that border-reflection at each stage can propagated artifacts into the luminance and chrominance JND maps, thereby necessitating cropping to keep the JND maps from being contaminated by these artifacts. To address this criticality, a method was developed to replace the screen border by a gray bezel of infinite extent, but operates without enhancing the real image size by more than six pixels on a side. Use of this "virtual-bezel" eliminates the need to crop the JND map to avoid border artifacts. The infinite gray bezel models viewing conditions and hence can be considered non-artifactual. With this interpretation, the entire JND map is uncontaminated by artifacts, and can be exhibited by a Picture Quality Analyzer.

In the following description, an image that has been padded with 6 pixels on all sides is referred to as a "padded image", and an unpadded image or its locus within a padded image is referred to as the "image proper".

Since image operations are local, the virtually infinite bezel can be implemented efficiently. Sufficiently far outside the image proper, an infinite bezel results in a set of identical, constant values at any given stage. The effect of image operations, e.g., filtering, performed in this constant region can be computed a priori. Thus, a narrow border (6 pixels in the current implementation) can provide the proper transition from the image proper to the infinite bezel.

At the input, the bezel is given the values Y'=90, U'=V'=0. (The value of Y'=90 corresponds to half the Rec 500 background value of 15% of the maximum screen luminance.) However, the bezel is not needed until after front-end processing, since spatial interactions that extend beyond the image borders do not occur until after this stage. In the luminance channel, no borders (and hence no bezel values) are appended to images until after luminance compression. In the chrominance channel, borders are appended after front end processing.

In the luminance channel, the first bezel value after luma compression is $$\text{first\_luma\_bezel} = \left[L_{\max}\left(\frac{90}{255}\right)^\gamma\right]^m + L_d^m, \quad (30c)$$

In the u* and v* channels, the first bezel values are both 0.

These values are propagated through subsequent stages of the processing in three ways:

1) Pixel-by-pixel functions operate on old bezel values to produce new bezel values. For example, the bezel value resulting from the 1.4 power function is:

$$\text{bezel\_out}=(\text{bezel\_in})^{1.4} \quad (30d)$$

2) 3×3 spatial filters whose rows and columns sum to P, set the output bezel value to the input bezel times P.

3) Contrast function numerators and four-field time filters (which have tap sums of zero), set the output bezel value to 0.

At the contrast stage and subsequently, the bezel is given the value 0 in luminance and chrominance channels, i.e., the logical consequence of operating with a zero-sum linear kernel on a spatially constant array.

The present method for generating the virtual bezel is disclosed in U.S. patent application Ser. No. 08/997,267 filed on Dec. 23, 1997 and is entitled "Method for Generating Image Pyramid Borders". This U.S. patent application Ser. No. 08/997,267 is hereby incorporated by reference.

Integrating Image and Bezel

Starting with the pyramid stages of the model, borders need to be supplied. The first border operation on an N-by-M input image is to pad the image with 6 pixels (on all sides) with the appropriate bezel value (first_luma_bezel for the compressed luma image, and 0 for u* and v* images). The padded image has dimensions (N+12)×(M+12). For the $k^{th}$ pyramid level (where k can range from 0 to 7) the padded image has dimensions ($[N/2^k]$+12)×($[M/2^k]$+12), where "[x]" denotes the greatest integer in x.

Images at all pyramid levels are registered to each other at the upper left hand corner of the image proper. Indices of the image proper run from $0 \leq y \leq$ height, $0 \leq x \leq$ width. The upper left hand corner of the image proper always has indices (0,0). Indices of bezel pixels take on height and width values less than 0. For example, the upper left hand bezel pixel is (−6,−6). If we look along the x-dimension starting at the left hand edge for an image of width w (image plus bezel width w+12), the bezel pixels are indexed by x=(−6,−5, . . . ,−1) the real image is indexed (0,1, . . . ,w−1) and the right hand bezel indices span (w,w+1, . . . ,w+5).

Given a padded image, there are four things that can happen depending on the subsequent stage of processing. In describing these operations below, we use single image lines to summarize spatial processing (with the understanding that the analogous events take place in the vertical direction).

(a) For pixel-by-pixel operations. When the next operation is to operate pixel-by-pixel (e.g., with a nonlinearity), the padded image is simply passed through the operation, and the output-image dimensions are the same as the input-image dimensions The same occurs when the operation is between corresponding pixels in different fields or different color-bands.

(b) For 3×3 spatial filters. Suppose (in one dimension) the unpadded input image has dimension $N_k$. Then the padded input image has dimension $N_k$+12, and the padded output image has dimension $N_k$+12 as well. The output bezel value is first computed and written into at least those bezel pixels not otherwise filled by the subsequent image operation. Then, starting 1 pixel away from the left edge of the padded input image, the 3×3 kernel starts operating on the input image and over-writing the bezel values of the output image, stopping 1 pixel away from the right (or bottom) edge of the image (where the original bezel value survives). The pre-written bezel value makes it unnecessary for the kernel operation ever to go outside the original (padded) image to compute these values.

(c) For filtering and down-sampling in REDUCE. Given an input padded image with dimension $N_k$+12, an output array is allocated with dimension $[N_k/2]$+12. The bezel value is written into at least those bezel pixels not otherwise filled by the subsequent filter and downsample operation. Then, the input image is filtered according to (b) above, but the filter is applied at pixels −4, −2, 0, 2, 4, until the input image is exhausted, and the output values are written into consecutive pixels −2, −1, 0, 1, 2, . . . , until there is no further place for them in the output image. Note that the position of pixel 0 in the new image is 7 pixels from the left end of the new image. The last-pixel application of the filter takes input pixel $N_k$+3 to output pixel $[N_k/2]$+2 if $N_k$ is odd, and it takes input pixel $N_k$+4 to output pixel $[N_k/2]$+2 if $N_k$ is even. (Here, we refer to the filter's input pixel as the pixel corresponding to the center of the 3-pixel kernel.)

Luminance Calibration and Prediction

Psychophysical data were used for two purposes: 1) to calibrate the luminance processing section (i.e., to determine values for certain processing parameters), and 2) to confirm the predictive value of the luminance processing section once it was calibrated. In all cases, the stimuli were injected into the perceptual metric generator as Y-value images immediately prior to the luminance processing.

Calibration

The luminance processing section 220 can be calibrated iteratively, using two sets of data. One data set is used to adjust the pre-masking constants ($w_i$, $t_e$, and $t_l$) in steps 640, 642 and 650 of the luminance processing section. The other set of data is used to adjust the masking-stage constants σ, β, a and c in step 660 of the luminance processing section. Since the JND values are always evaluated after step 660, the adjustment of the constants in step 660 with the second data set necessitated readjustment of the steps 640, 642 and 650 constants with the first data set. The readjustment of the these constants was continued until no further change was observed from one iteration to the next. It should be noted that, although the above iterative process starts out by interpreting a unit value of unmasked contrast (steps 640, 642 and 650) as one JND of visual output, the process of masking perturbs this interpretation. The details of the adjustments are described in the subsections below.

Adjustment of Contrast-normalization Constants (Steps 640, 642 and 650)

The perceptual metric generator predictions for spatial and temporal contrast sensitivities prior to masking were matched to contrast-sensitivity data for sine waves presented by Koenderink and Van Doorn (1979). To generate points on the perceptual metric generator-based curve, a low-amplitude sine wave was presented as a test image to the perceptual metric generator (either in space or in time), and the contrast threshold for 1 JND output was assessed. In each case the reference image implicitly had a uniform field with the same average luminance as the test field.

The fit of spatial contrast sensitivity to data (see FIG. 10 for final fit) was used to adjust the contrast-pyramid sensitivity parameters $w_0$, $w_1$, and $w_2$ in steps 640, 642 and 650 of the perceptual metric generator. The dashed lines in FIG. 10 represent the sensitivities of the separate pyramid channels that comprise the total sensitivity (solid line). It should be noted that the spatial model fit in FIG. 10 was not extended beyond 15 cycles/deg, consistent with the viewing-distance constraint discussed above: a viewing distance of four screen-heights. Similar adjustment of $w_0$, $w_1$, and $w_2$ can be performed to accommodate slightly different viewing distances; much greater viewing distances might require lower-resolution pyramid levels, and these could be easily incorporated at low computational expense.

The fit of temporal contrast-sensitivity to data (see FIG. 11 for final fits) was used to adjust the temporal filter-tap parameters $t_e$ and $t_l$, as well as the contrast-pyramid sensitivity parameter $w_3$. The method used to fit these parameters is analogous to the spatial-contrast calibration. The lowest-spatial-frequency data of Van Doorn and Koenderink at various temporal frequencies were matched against the sensitivities computed for spatially uniform temporal sine waves. In each case, the vision-model field rate sampled the temporal sine wave at 50 and 60 Hz, and this gave rise to the distinct parameter values noted above.

Adjustment of Masking Constants (Step 660)

The masking-parameter values σ, β, a and c (in step 660 of the perceptual metric generator) were fit by comparing predictions for masked contrast discrimination with data acquired by Carlson and Cohen (1978). The results of the final-fit comparison appear in FIG. 12. From the Carlson-Cohen study, a single observer's data was chosen subject to the criteria of being representative and also of having sufficient data points. In this case, the perceptual metric generator stimulus consisted of a spatial sine wave of given pedestal contrast in both test and reference fields, and additionally a contrast increment of the test-field sine wave. The contrast-increment necessary to achieve 1 JND was determined from the perceptual metric generator for each contrast-pedestal value, and then plotted in FIG. 12.

Predictions

After perceptual metric generator calibration, perceptual metric generator predictions were compared with detection and discrimination data from stimuli that were not sine waves. This was done in order to check the transferability of the sine-wave results to more general stimuli. It will be seen from FIGS. 13, 14, and 15 that the predictions were not applied to patterns with nominal spatial frequencies above 10 cycles/deg. Such patterns would have had appreciable energies at spatial frequencies above 15 cycles/deg, and would have aliased with the pixel sampling rate (30 samples per degree—see discussion above).

In the first study (FIG. 13), low-contrast disks in the test field were detected against a uniform reference field. The experimental data are from Blackwell and Blackwell (1971). In running the perceptual metric generator for this particular study, it was necessary to replace the spatial Q-norm summary measure with a maximum. Otherwise the JND result was sensitive to the size of the background of the disk (i.e., to image size).

In the second study (FIG. 14), the detection of a low-amplitude checkerboard, the data was acquired in an unpublished study at Sarnoff.

The third study (data from Carlson and Cohen, 1980) was somewhat different from the first two. A blurred edge given by erf(ax) was presented in the reference image, and discrimination was attempted against an edge given by erf(a'x) in the test image. Here, x is retinal distance in visual degrees, $a=\pi f/[\ln(2)]^{0.5}$, $a'=\pi(f+\Delta f)/[\ln(2)]^{0.5}$, and f is in cycles/deg. Here, $\Delta f$ is the change in f required for one JND. The plot in FIG. 15 is $\Delta f/f$ versus f.

It can be seen that the perceptual metric generator predictions are well fitted to the data, for the range of spatial frequencies characteristic of the display at the four-screen-height viewing distance.

Chrominance Calibration

As in luminance-parameter calibration, psychophysical data were used to calibrate chrominance parameters (i.e., to adjust their values for best model fits). In all cases, the stimuli were four equal fields, injected into the perceptual metric generator as images in CIE X, Y, and Z just prior to conversion to CIELUV.

Adjustment of Contrast-normalization Constants (Step 830)

The perceptual metric generator predictions for chromatic contrast sensitivities prior to masking were matched to contrast-sensitivity data presented by Mullen (1985). The test sequences used were four equal fields, each with a horizontally varying spatial sine-wave grating injected as (X, Y, Z) values. The data used for calibration were from Mullen's FIG. 6, corresponding to which each test image was a red-green isoluminous sine-wave. At pixel i, the test-image sine wave had tristimulus values given by $$X(i)=(Y_o/2)\{(x_r/y_r+x_g/y_g)+\cos(2\pi fai)\Delta m(x_r/y_r-x_g/y_g)\}$$

$$Y(i)=Y_o, \quad (31)$$

$$Z(i)=(Yo/2)\{(zr/yr+zg/yg)+\cos(2\pi fai)\Delta m(zr/yr-zg/yg)\}$$

Here $\Delta m$ is the threshold incremental discrimination contrast, $(x_r, y_r)=(0.636, 0.364)$ is the chromaticity of the red interference filter (at 602 nm), $(x_g, y_g)=(0.122, 0.823)$ is the chromaticity of the green interference filter (at 526 nm), $z_r=1-x_r-y_r$, $z_g=1-x_g-y_g$, and a=0.03deg/pixel. The reference-image is a uniform field represented by Equation (28) but with $\Delta m=0$. For purposes of the perceptual metric generator, it is sufficient to set $Y_o=1$.

To generate points on the model-based curve, the above stimulus was presented at various values of f, and the contrast threshold $\Delta m$ for 1 JND output was assessed. The fit of modeled chromatic-contrast sensitivity to data (see FIG. 16 for final fit) was used to adjust the parameters $q_i$ (i=0, . . . ,6) in the perceptual metric generator.

Adjustment of Masking Constants (Step 840)

The perceptual metric generator predictions for chrominance masking were matched to data presented by Switkes. et al. (1988). The test sequences used were four equal fields, each with a horizontally varying spatial sine-wave grating injected as (X, Y, Z) values. To correspond with FIG. 4 of that work (chrominance masking of chrominance), at pixel i, the test-image sine wave had tristimulus values given by $$X(i)=(Y_o/2)\{(x_r/y_r+x_g/y_g)+\cos(2\pi fai)[(m+\Delta m)(x_r/y_r-x_g/y_g)]\}$$

$$Y(i)=Y_o \quad (32)$$

$$Z(i)=(Y_o/2)\{(z_r/y_r+z_g/y_g)+\cos(2\pi fai)[(m+\Delta m)(z_r/y_r-z_g/y_g)]\}$$

where $\Delta m$ is the threshold incremental discrimination contrast, $(x_r, y_r)=(0.580, 0.362)$ is the chromaticity of the red phosphor, $(x_g, y_g)=(0.301, 0.589)$ is the chromaticity of the green phosphor, $z_r=1-x_r-y_r$, $z_g=1-x_g-y_g$, and f a=2 c/deg*0.03 deg/pixel=0.06. The reference-image sine wave is the same as the test-image sine wave but with $\Delta m=0$. For purposes of the perceptual metric generator, it is sufficient to set $Y_o=1$.

To generate points on the model-based curve, the above stimulus was presented at various values of mask contrast m, and the contrast threshold $\Delta m$ for 1 JND output was assessed. The fit of modeled chromatic-contrast sensitivity to data (see FIG. 17 for final fit) was used to adjust the parameters $\sigma_c$, $\beta_c$, $a_c$, $c_c$, and k in the perceptual metric generator.

Comparisons with Rating Data

Figure 18:
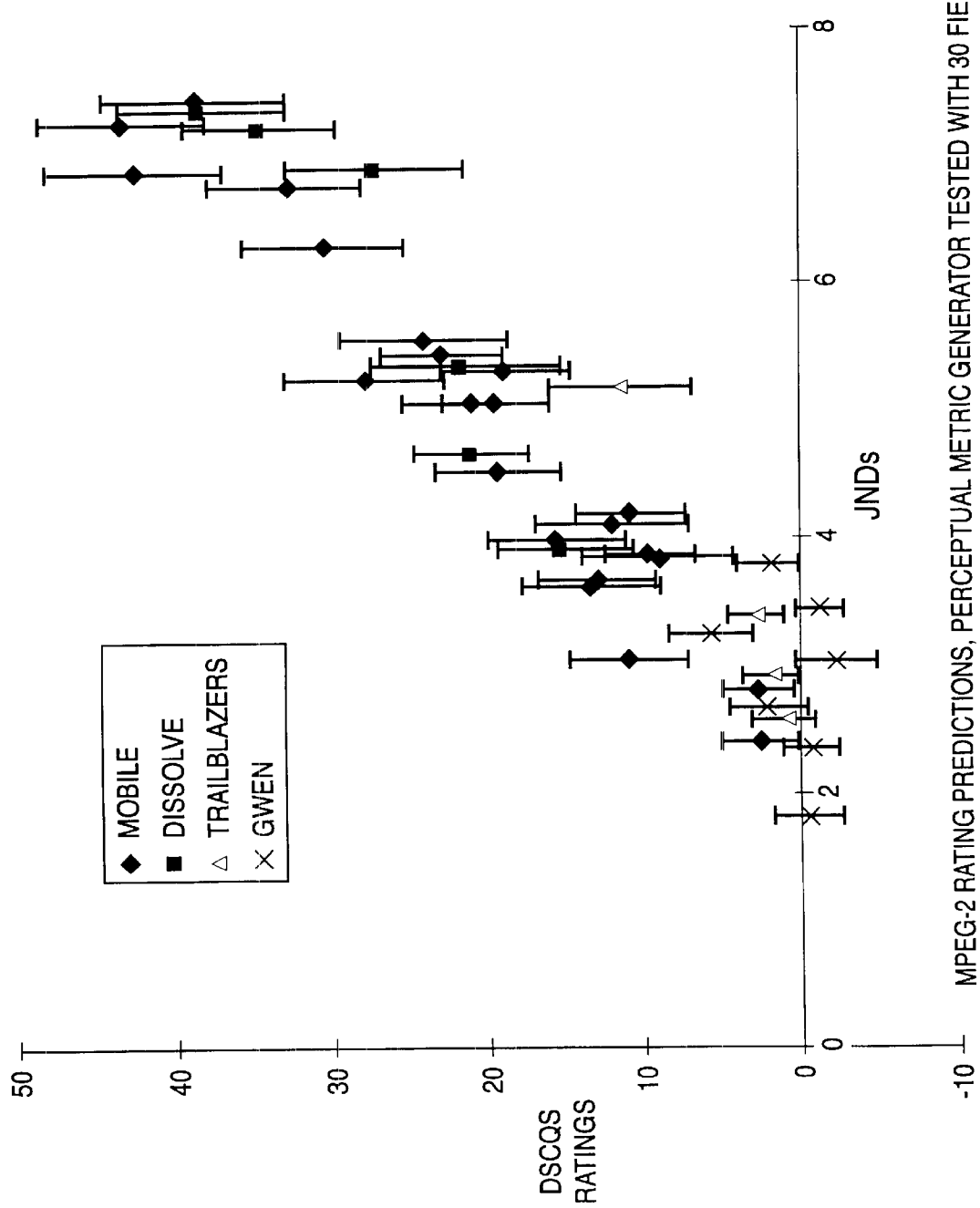
FIG. 18 is a graph illustrating Rating Predictions data.

Four image sequences, each with various degrees of distortion, were used to compare the present perceptual metric generator with DSCQS rating data. The results are plotted in FIG. 18, and reveal a correlation 0.9474 between the perceptual metric generator and the data. For each of the sequences, the perceptual metric generator processed 30 fields (as opposed to the four fields used to test previous releases).

Several data points were removed from the plot that were present in the previous releases. These points were deleted for two reasons:

(1) Five points were deleted that corresponded to "warm-up" tests on all the subjects. The Rec 500 suggests that the first five tests in a sequence should be deleted because they represent a stabilization of the subject's judgment.

(2) For one of the "Gwen" sequences, there are small shifts of the test sequence with respect to the reference sequence occurring between the images of the trees in the background, even when the foreground is exactly aligned between test and reference. The blue-screen video was introduced separately for test and reference, with a temporal alignment error in this particular case.

JND Map Interpretation

The JND Maps are in a form suitable for subsequent processing to determine JNDs within any spatial or temporal window. As noted above, the values in the maps are in units of JNDs raised to the Qth power, rather than in simple JND units. To obtain a single JND value for any spatio-temporal region of the video stream, it is only necessary to sum up the values from the JND Map within that region, and then take the Qth root.

A couple of examples will clarify this processing. To retrieve 1 JND value for each pixel (probably the most typical desired output), take the Qth root of each pixel in the JND Map.

However, for typical MPEG-2 encoder analysis applications, it may be useful to have a single JND value for each 16×16 pixel macroblock, rather than for each pixel. To obtain 1 JND per macroblock, first sum all the JND Map outputs within each macroblock, and then take the Qth root. The result will be a macroblock-resolution map of JND values.

Pyramid Construction: Image Size & Border Requirements

The current implementation of the pyramid method will not encounter image-dimension problems if the greater image dimension N and the lesser image dimension M satisfy the following conditions.

1) M must be at least 128
2) M must be divisible by 2 as many times (P) as it takes to retrieve a quotient less than 64
3) N must also be P times divisible by 2.

The perceptual metric generator identifies as illegal any images that do not satisfy these conditions. As an example of how these rules work, consider image dimensions N=720, M=480. Condition (a) is satisfied because M>128. Condition (b) is met because M can be divided three times by 2, and encounters the less-than-64 criterion at division 3 (hence P=3). Finally, condition (c) is satisfied because N can also be divided by 2 three times to yield an integer.

Interlace Considerations

The purpose of the following discussion is to clarify the handling of field interlace (and, specifically, inter-line spaces) in the present perceptual metric generator. Inter-line spaces are not visible by humans viewing displays, but do produce pronounced effects in the perceptual metric generator if they are modeled by black values. As a result of visibility of the lines by the perceptual metric generator, vertical image distortions at any spatial frequencies are masked by the high-frequency line structure. Furthermore, the visibility of the line structure would be a primary cause of JND artifacts when an interlaced sequence is compared to a non-interlaced sequence.

A solution to this criticality is to change the display model to incorporate the known averaging in space and time that takes place in the display itself. Such averaging renders the inter-line spaces less visible. The first step is to define the magnitudes of these effects to determine the appropriate model.

Temporal averaging occurs in the display because phosphors have a finite decay time. So there will always be, e.g., a decaying remnant of the odd lines from field N−1 at the time of primary emission from the even lines from field N. However, compared to the inter-field interval (16500 microseconds), the phosphor decay times are typically quite short, e.g., 70 microseconds for the blue phosphor, 100 microseconds for the green phosphor, and 700 microseconds for the red phosphor. Hence, temporal averaging in the display model does not contribute appreciably to inter-line smoothing.

Spatial averaging occurs in the display because the emission from a pixel spreads beyond the nominal pixel boundary. In interlaced displays, the electron-beam spot structure was designed conjointly with the interlace architecture. As a result, the pixel spread was engineered to be more pronounced in the vertical direction, so as to fill in the inter-line spaces and hence to make them less visible. The spread is particularly pronounced at high beam currents, which correspond to high luminance values and hence to the most noticeable parts of an image. Hence, from a display perspective, spatial averaging is a good physical model for inter-line smoothing.

Alternatively, some temporal averaging can be used to effect inter-line smoothing. The visual system itself would appear to perform enough temporal averaging to render the inter-line spaces invisible. However, as will be clear from the following discussion, the lack of eye movements in the present perceptual metric generator has rendered the perceptual metric generator to depart from the temporal-averaging behavior that should otherwise be present.

It has been observed that human vision is subserved by mechanisms with two distinct classes of spatio-temporal responses: "sustained", with high spatial but low temporal resolution and "transient", with high temporal but low spatial resolution.

One implementation of this perceptual metric generator uses separable space/time filters to shape the responses of the two channels. An immediate consequence of this modeling choice is a temporal filter on the sustained channels that is quite lowpass in time compared with the 60-Hz temporal sampling rate typical of a display. Even the transient response is insensitive to the 60-Hz sampling rate. However, one element that does not enter the sustained/transient model is the effect of eye movements, and particularly of the ability of the eye to track moving objects in an image. This tracking enhances visual sensitivity to details in the attended object, in a way that is not captured by perceptual metric generator filters that are faithful to psychophysical experiments with constrained stimuli.

The effect of motion on distortion measures in an image sequence can be considerable. If the eye did not track objects moving in an image, the blurring in the image that results from the sustained temporal response would be accurately reflected in a perceptual metric generator with much temporal averaging in one channel. However, the eye does track moving objects, so the image is not motion-blurred. Without the ability to track moving objects, a perceptual metric generator purporting to quantify temporal visual response should display motion blur. However, such blur hampers the generation of an accurate JND map.

To resolve this difficulty without a tracking model, a compromise was made of representing the spatial channel (which acquires the role of the "sustained" channel in being sensitive to spatial detail) as operating on the last field, rather than on some time average of fields. As a result of this approach, the spatial channel reveals a well-focused JND map, as would be the case for an eye that tracked the motions of attended objects in an image sequence.

In keeping with the spirit of the above compromise, one could still relax the "specious-present" nature of the spatial channel so that it averages over two fields, hence over one frame. This measure would decrease the visibility of the blank lines in an interlaced field, and is more physically and physiologically plausible than the "specious-present" solution. However, one artifact survives the temporal averaging of two fields, and that is the appearance of a "comb" where a smooth moving edge should be.

To understand why the comb appears in a model with two-field averaging, it is suffice to visualize an object moving in the time interval between an even field (call it field N) and an odd field (call it field N+1). Assuming the object has a vertical edge that moves 5 pixels horizontally between fields. Also, suppose the object edge is at pixel n of the even lines at field N. Then this edge will show up at pixel n+5 of the odd lines at field N+1. If there is no "filling in" between the raster lines of a particular field, then averaging field N and field N+1 produces an edge that is no longer vertical, but alternates between pixels n and n+5. This is the "comb" effect.

To understand why the actual visual system does not see this comb effect, imagine that the object is interesting enough so the eye tracks it faithfully. That means the object is stationary on the retina, because the retina anticipates the motion of the object into the next field. If the edge of the object is at pixel n of the even lines of field N, it will also be at pixel n of the odd lines of field N+1, simply because the eye's tracking of the object has been nearly perfect.

To avoid both the comb and other interlace artifacts, the perceptual metric generator may perform a spatial filling-in between the lines of each field in the display. This vertical averaging avoids the comb effect because it provides a rendition of the instantaneous spatial edge (which any temporal averaging would not). Also, the vertical averaging solves the original problem of the visibility of the interlace line structure, in a way that is compatible with the known spatial spread of the electron-beam spot structure.

There has thus been shown and described a novel method and apparatus for assessing the visibility of differences between two input image sequences for improving image fidelity and visual task applications. Many changes, modifications, variations and other uses and applications of the subject invention will, however, become apparent to those skilled in the art after considering this specification and the accompanying drawings which disclose the embodiments thereof.

What is claimed is:

1. An apparatus for assessing visibility of differences between two input image sequences, said apparatus comprising:
   a luminance processing section, for filtering a luminance component of said input image sequences, wherein said luminance processing section comprises a pyramid decomposer for decomposing an image of said input image sequence into a plurality of pyramid levels of different resolution;
   a chrominance processing section, coupled to said luminance processing section, for filtering a chrominance component of said input image sequences; and
   a perceptual metric generating section, coupled said processing sections, for generating an image metric of perceptual differences between the two input image sequences.

2. The apparatus of claim 1, wherein said pyramid decomposer comprises a three-tap low-pass filter.

3. The apparatus of claim 1, wherein said luminance processing section further comprises a normalizer for performing a normalization operation on said plurality of pyramid levels of different resolution.

4. The apparatus of claim 3, wherein said luminance processing section further comprises a temporal and contrast filter for performing temporal filtering and contrast computation on a lowest resolution image of said plurality of pyramid levels of different resolution.

5. The apparatus of claim 4, wherein said luminance processing section further comprises a spatial and contrast filter for performing spatial filtering and contrast computation on said plurality of pyramid levels of different resolution except for said lowest resolution image.

6. The apparatus of claim 5, wherein said spatial and contrast filter comprises center and surround filters.

7. The apparatus of claim 5, wherein said luminance processing section further comprises at least one contrast energy masking section for receiving input signals from said spatial and contrast filter and said temporal and contrast filter for performing contrast energy masking.

8. The apparatus of claim 7, wherein said at least one contrast energy masking section performs said contrast energy masking using a nonlinear function.

9. The apparatus of claim 7, wherein said at least one contrast energy masking section performs said contrast energy masking in a cross masking stage and a self masking stage.

10. The apparatus of claim 7, wherein said at least one contrast energy masking section provides a masked output signal for said chrominance processing section.

11. The apparatus of claim 7, wherein said luminance processing section further comprises a luminance compression section for compressing luminance values of an image of said input image sequence before said image of said input image sequence is forwarded to said pyramid decomposer.

12. The apparatus of claim 1, further comprises a luminance metric generating section for providing a luminance Just Noticeable Difference (JND) map to said perceptual metric generating section.

13. The apparatus of claim 1, further comprises a chrominance metric generating section for providing a chrominance Just Noticeable Difference (JND) map to said perceptual metric generating section.

14. An apparatus for assessing visibility of differences between two input image sequences, said apparatus comprising:
   a luminance processing section, for filtering a luminance component of said input image sequences;
   a chrominance processing section, coupled to said luminance processing section, for filtering a chrominance component of said input image sequences, wherein said chrominance processing section comprises a pyramid decomposer for decomposing an image of said input image sequence into a plurality of pyramid levels of different resolution; and
   a perceptual metric generating section, coupled said processing sections, for generating an image metric of perceptual differences between the two input image sequences.

15. The apparatus of claim 14, wherein said chrominance processing section further comprises a temporal filter for performing temporal filtering on said plurality of pyramid levels of different resolution.

16. The apparatus of claim 15, wherein said chrominance processing section further comprises a spatial and contrast filter for performing spatial filtering and contrast computation on said plurality of pyramid levels of different resolution.

17. The apparatus of claim 16, wherein said chrominance processing section further comprises a contrast energy masking section for receiving input signals from said spatial and contrast filter and said luminance processing section for performing contrast energy masking.

18. A method for assessing visibility of differences between two input image sequences, said method comprising the steps of:
  (a) filtering a luminance component of said input image sequences, wherein said filtering step (a) comprises the step of decomposing an image of said input image sequence into a plurality of pyramid levels of different resolution;
  (b) filtering a chrominance component of said input image sequences; and
  (c) generating an image metric of perceptual differences between the two input image sequences from said filtered luminance and chrominance components.

19. The method of claim 18, wherein said filtering step (a) further comprises the step of performing a normalization operation on said plurality of pyramid levels of different resolution.

20. The method of claim 19, wherein said filtering step (a) further comprises the step of performing temporal filtering and contrast computation on a lowest resolution image of said plurality of pyramid levels of different resolution.

21. The method of claim 20, wherein said filtering step (a) further comprises the step of performing spatial filtering and contrast computation on said plurality of pyramid levels of different resolution except for said lowest resolution image.

22. The method of claim 21, wherein said filtering step (a) further comprises the step of performing contrast energy masking.

23. The method of claim 22, wherein said contrast energy masking step performs said contrast energy masking in a cross masking stage and a self masking stage.

24. The method of claim 22, wherein said filtering step (a) further comprises the step of providing a masked output signal for said filtering step (b).

25. The method of claim 18, wherein said filtering step (a) further comprises the step of compressing luminance values of an image of said input image sequence before said decomposing step.

26. The method of claim 18, further comprises the step of providing a luminance Just Noticeable Difference (JND) map to said image metric generating step (c).

27. The method of claim 18, further comprises the step of providing a chrominance Just Noticeable Difference (JND) map to said image metric generating step (c).

28. A method for assessing visibility of differences between two input image sequences, said method comprising the steps of:
  (a) filtering a luminance component of said input image sequences;
  (b) filtering a chrominance component of said input image sequences, wherein said filtering step (a) comprises the step of decomposing an image of said input image sequence into a plurality of pyramid levels of different resolution: and
  (c) generating an image metric of perceptual differences between the two input image sequences from said filtered luminance and chrominance components.

29. The method of claim 28, wherein said filtering step (b) comprises the step of performing temporal filtering on said plurality of pyramid levels of different resolution.

30. The method of claim 29, wherein said filtering step (b) further comprises the step of performing spatial filtering and contrast computation on said plurality of pyramid levels of different resolution.

31. The method of claim 30, wherein said filtering step (b) further comprises the step of performing contrast energy masking.

* * * * *